(12) United States Patent
Lim et al.

(10) Patent No.: US 12,407,028 B2
(45) Date of Patent: Sep. 2, 2025

(54) ELECTRODE ASSEMBLY, BATTERY, AND BATTERY PACK AND VEHICLE INCLUDING THE SAME

(71) Applicant: LG ENERGY SOLUTION, LTD., Seoul (KR)

(72) Inventors: Hae-Jin Lim, Daejeon (KR); Jin-Hak Kong, Daejeon (KR); Soon-O Lee, Daejeon (KR); Kyu-Hyun Choi, Daejeon (KR); Do-Gyun Kim, Daejeon (KR); Su-Ji Choi, Daejeon (KR); Kwang-Su Hwangbo, Daejeon (KR); Geon-Woo Min, Daejeon (KR); Min-Ki Jo, Daejeon (KR); Jae-Won Lim, Daejeon (KR); Hak-Kyun Kim, Daejeon (KR); Je-Jun Lee, Daejeon (KR); Ji-Min Jung, Daejeon (KR); Jae-Woong Kim, Daejeon (KR); Jong-Sik Park, Daejeon (KR); Yu-Sung Choe, Daejeon (KR); Byoung-Gu Lee, Daejeon (KR); Duk-Hyun Ryu, Daejeon (KR); Kwan-Hee Lee, Daejeon (KR); Jae-Eun Lee, Daejeon (KR); Bo-Hyun Kang, Daejeon (KR); Pil-Kyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 682 days.

(21) Appl. No.: 17/592,608

(22) Filed: Feb. 4, 2022

(65) Prior Publication Data
US 2022/0271345 A1   Aug. 25, 2022

(30) Foreign Application Priority Data

Feb. 19, 2021  (KR) .................. 10-2021-0022881
Feb. 19, 2021  (KR) .................. 10-2021-0022891

(Continued)

(51) Int. Cl.
*H01M 10/0587* (2010.01)
*H01M 4/64* (2006.01)
(Continued)

(52) U.S. Cl.
CPC ......... *H01M 10/0587* (2013.01); *H01M 4/64* (2013.01); *H01M 4/70* (2013.01);
(Continued)

(58) Field of Classification Search
CPC ........... H01M 10/0587; H01M 50/107; H01M 50/567; H01M 50/559; H01M 50/531;
(Continued)

(56) References Cited

U.S. PATENT DOCUMENTS 3,503,806 A   3/1970  Sugalski
3,761,314 A   9/1973  Cailley
(Continued)

FOREIGN PATENT DOCUMENTS

CN   1170782 A   1/1998
CN   1407642 A   4/2003
(Continued)

OTHER PUBLICATIONS

Nigel, "Tesla 4680 Cell," Battery Design, Nov. 18, 2022, URL: <https://www.batterydesign.net/tesla-4680-cell/>.
(Continued)

*Primary Examiner* — Brian R Ohara
*Assistant Examiner* — Emily Elizabeth Freeman
(74) *Attorney, Agent, or Firm* — Birch, Stewart, Kolasch & Birch, LLP

(57) ABSTRACT

An electrode assembly, a battery, and a battery pack and a vehicle including the same are provided. In the electrode assembly, a first electrode, a second electrode, and a separator interposed therebetween are wound based on an axis to define a core and an outer circumference. The first electrode includes a first portion coated with an active material and a second portion at a first side and adjacent the first portion, the second portion being exposed beyond the separator (Continued)

along a first axial direction of the electrode assembly. A part of the second portion is bent in a radial direction of the electrode assembly forming a first surface region including stacked layers of the second portion, and in a partial region of the first surface region, a number of the stacked layers of the second portion is 10 or more in the in the first axial direction.

79 Claims, 18 Drawing Sheets

(30) Foreign Application Priority Data

| Feb. 19, 2021 | (KR) | 10-2021-0022894 |
|---|---|---|
| Feb. 19, 2021 | (KR) | 10-2021-0022897 |
| Feb. 23, 2021 | (KR) | 10-2021-0024424 |
| Mar. 8, 2021 | (KR) | 10-2021-0030291 |
| Mar. 8, 2021 | (KR) | 10-2021-0030300 |
| Apr. 9, 2021 | (KR) | 10-2021-0046798 |
| May 4, 2021 | (KR) | 10-2021-0058183 |
| Jun. 14, 2021 | (KR) | 10-2021-0077046 |
| Jun. 28, 2021 | (KR) | 10-2021-0084326 |
| Oct. 1, 2021 | (KR) | 10-2021-0131205 |
| Oct. 1, 2021 | (KR) | 10-2021-0131207 |
| Oct. 1, 2021 | (KR) | 10-2021-0131208 |
| Oct. 1, 2021 | (KR) | 10-2021-0131215 |
| Oct. 1, 2021 | (KR) | 10-2021-0131225 |
| Oct. 14, 2021 | (KR) | 10-2021-0137001 |
| Oct. 15, 2021 | (KR) | 10-2021-0137856 |
| Oct. 22, 2021 | (KR) | 10-2021-0142196 |
| Nov. 9, 2021 | (KR) | 10-2021-0153472 |
| Nov. 19, 2021 | (KR) | 10-2021-0160823 |
| Nov. 24, 2021 | (KR) | 10-2021-0163809 |
| Nov. 26, 2021 | (KR) | 10-2021-0165866 |
| Dec. 3, 2021 | (KR) | 10-2021-0172446 |
| Dec. 10, 2021 | (KR) | 10-2021-0177091 |
| Dec. 31, 2021 | (KR) | 10-2021-0194572 |
| Dec. 31, 2021 | (KR) | 10-2021-0194593 |
| Dec. 31, 2021 | (KR) | 10-2021-0194610 |
| Dec. 31, 2021 | (KR) | 10-2021-0194611 |
| Dec. 31, 2021 | (KR) | 10-2021-0194612 |
| Jan. 5, 2022 | (KR) | 10-2022-0001802 |

(51) Int. Cl.

| *H01M 4/70* | (2006.01) |
|---|---|
| *H01M 50/107* | (2021.01) |
| *H01M 50/152* | (2021.01) |
| *H01M 50/179* | (2021.01) |
| *H01M 50/183* | (2021.01) |
| *H01M 50/188* | (2021.01) |
| *H01M 50/213* | (2021.01) |
| *H01M 50/242* | (2021.01) |
| *H01M 50/507* | (2021.01) |
| *H01M 50/509* | (2021.01) |
| *H01M 50/531* | (2021.01) |
| *H01M 50/533* | (2021.01) |
| *H01M 50/536* | (2021.01) |
| *H01M 50/55* | (2021.01) |
| *H01M 50/559* | (2021.01) |
| *H01M 50/567* | (2021.01) |

(52) U.S. Cl.
CPC ........ *H01M 50/107* (2021.01); *H01M 50/152* (2021.01); *H01M 50/179* (2021.01); *H01M 50/183* (2021.01); *H01M 50/188* (2021.01); *H01M 50/213* (2021.01); *H01M 50/242* (2021.01); *H01M 50/507* (2021.01); *H01M 50/509* (2021.01); *H01M 50/531* (2021.01); *H01M 50/533* (2021.01); *H01M 50/536* (2021.01); *H01M 50/55* (2021.01); *H01M 50/559* (2021.01); *H01M 50/567* (2021.01); *H01M 2220/20* (2013.01)

(58) Field of Classification Search
CPC ............. H01M 50/152; H01M 50/242; H01M 50/533; H01M 50/509; H01M 50/507; H01M 50/183; H01M 50/179; H01M 50/213; H01M 50/536; H01M 4/64; H01M 4/70; H01M 2220/20
See application file for complete search history.

(56) References Cited

U.S. PATENT DOCUMENTS

| 4,049,883 | A | 9/1977 | Schenk et al. |
|---|---|---|---|
| 4,053,687 | A | 10/1977 | Coibion et al. |
| 4,322,484 | A | 3/1982 | Sugalski |
| 4,563,551 | A | 1/1986 | Black, III et al. |
| 5,576,113 | A | 11/1996 | Hirofumi et al. |
| 5,665,483 | A | 9/1997 | Saito et al. |
| 5,770,332 | A | 6/1998 | Narukawa et al. |
| 5,849,431 | A | 12/1998 | Kita et al. |
| 6,132,900 | A | 10/2000 | Yoshizawa et al. |
| 6,399,237 | B1 | 6/2002 | Souliac et al. |
| 6,451,473 | B1 | 9/2002 | Saito et al. |
| 6,653,017 | B2 | 11/2003 | Satoh et al. |
| 6,677,082 | B2 | 1/2004 | Thackeray et al. |
| 6,680,143 | B2 | 1/2004 | Thackeray et al. |
| 7,273,678 | B2 | 9/2007 | Akita et al. |
| 7,351,496 | B2 | 4/2008 | Nakanishi et al. |
| 7,364,817 | B2 | 4/2008 | Lee |
| 8,007,549 | B2 | 8/2011 | Ligeois et al. |
| 8,580,425 | B2 | 11/2013 | Kim |
| 9,496,539 | B2 | 11/2016 | Tyler et al. |
| 9,496,557 | B2 | 11/2016 | Fuhr et al. |
| 10,840,555 | B2 | 11/2020 | Iwama et al. |
| 2001/0004505 | A1 | 6/2001 | Kim et al. |
| 2001/0051297 | A1 | 12/2001 | Nemoto et al. |
| 2001/0053477 | A1 | 12/2001 | Kitoh et al. |
| 2002/0061435 | A1 | 5/2002 | Hisai |
| 2002/0110729 | A1 | 8/2002 | Hozumi et al. |
| 2003/0035993 | A1 | 2/2003 | Enomoto et al. |
| 2003/0049536 | A1 | 3/2003 | Wiepen |
| 2003/0064285 | A1 | 4/2003 | Kawamura et al. |
| 2003/0104276 | A1 | 6/2003 | Mizuno et al. |
| 2004/0023108 | A1 | 2/2004 | Nakanishi et al. |
| 2004/0131930 | A1 | 7/2004 | Nakanishi et al. |
| 2005/0048365 | A1 | 3/2005 | Miyahisa et al. |
| 2005/0058184 | A1 | 3/2005 | Paul et al. |
| 2005/0118499 | A1 | 6/2005 | Kim |
| 2005/0142436 | A1 | 6/2005 | Aral et al. |
| 2005/0158620 | A1 | 7/2005 | Kim et al. |
| 2005/0181272 | A1 | 8/2005 | Kim |
| 2005/0214640 | A1 | 9/2005 | Kim |
| 2005/0238951 | A1 | 10/2005 | Yoo et al. |
| 2005/0260487 | A1 | 11/2005 | Kim et al. |
| 2005/0260489 | A1 | 11/2005 | Kim |
| 2005/0287428 | A1 | 12/2005 | Cheon et al. |
| 2005/0287432 | A1* | 12/2005 | Cheon ............... H01M 10/0431 429/211 |
| 2006/0024574 | A1 | 2/2006 | Yim et al. |
| 2006/0063063 | A1 | 3/2006 | Mori et al. |
| 2006/0204841 | A1 | 9/2006 | Satoh et al. |
| 2008/0026293 | A1 | 1/2008 | Marple et al. |
| 2008/0038629 | A1 | 2/2008 | Okabe et al. |
| 2008/0057394 | A1 | 3/2008 | Rigobert et al. |
| 2008/0145756 | A1 | 6/2008 | Taniguichi |
| 2008/0182159 | A1 | 7/2008 | Mitani et al. |
| 2008/0254354 | A1 | 10/2008 | Adams |
| 2009/0011329 | A1 | 1/2009 | Yoon |
| 2009/0104520 | A1 | 4/2009 | Marple |

(56) References Cited

U.S. PATENT DOCUMENTS

| | | |
|---|---|---|
| 2009/0208830 A1 | 8/2009 | Okabe et al. |
| 2009/0208836 A1 | 8/2009 | Fuhr et al. |
| 2009/0239133 A1 | 9/2009 | Kosugi |
| 2009/0280406 A1 | 11/2009 | Kozuki |
| 2009/0311583 A1 | 12/2009 | Wu |
| 2010/0035140 A1 | 2/2010 | Miyahisa et al. |
| 2010/0081052 A1 | 4/2010 | Morishima et al. |
| 2010/0129716 A1 | 5/2010 | Kato et al. |
| 2010/0151317 A1 | 6/2010 | Kim et al. |
| 2010/0216001 A1 | 8/2010 | Byun et al. |
| 2010/0255358 A1 | 10/2010 | Yoneyama |
| 2010/0266893 A1 | 10/2010 | Martin et al. |
| 2010/0316897 A1 | 12/2010 | Kozuki et al. |
| 2010/0330414 A1 | 12/2010 | Mori |
| 2011/0027644 A1 | 2/2011 | Kiyama |
| 2011/0067227 A1 | 3/2011 | Sohn |
| 2011/0086610 A1 | 4/2011 | Baldwin et al. |
| 2011/0171508 A1 | 7/2011 | Kim |
| 2011/0256433 A1 | 10/2011 | Fuhr et al. |
| 2011/0274953 A1 | 11/2011 | Hato et al. |
| 2011/0281155 A1 | 11/2011 | Ito et al. |
| 2011/0300444 A1* | 12/2011 | Nakamura .......... H01M 4/136 |
| | | 429/218.1 |
| 2012/0058375 A1 | 3/2012 | Tanaka et al. |
| 2012/0094169 A1 | 4/2012 | Kim et al. |
| 2012/0231641 A1 | 9/2012 | Sugai et al. |
| 2012/0297611 A1 | 11/2012 | Ma |
| 2012/0328932 A1 | 12/2012 | Guen et al. |
| 2013/0136977 A1 | 5/2013 | Masuda |
| 2013/0183556 A1 | 7/2013 | Kim |
| 2013/0209849 A1 | 8/2013 | Hattori et al. |
| 2013/0273401 A1 | 10/2013 | Lee et al. |
| 2013/0323574 A1 | 12/2013 | Tsunaki et al. |
| 2014/0079971 A1 | 3/2014 | Huang |
| 2014/0113185 A1 | 4/2014 | Mori et al. |
| 2014/0162097 A1 | 6/2014 | Fuhr et al. |
| 2014/0205868 A1 | 7/2014 | Phillips |
| 2014/0212695 A1 | 7/2014 | Lane et al. |
| 2014/0234676 A1 | 8/2014 | Tyler et al. |
| 2014/0255748 A1 | 9/2014 | Jan et al. |
| 2015/0104694 A1 | 4/2015 | Okuda et al. |
| 2015/0140379 A1 | 5/2015 | Yau |
| 2015/0155532 A1 | 6/2015 | Harayama et al. |
| 2016/0043373 A1 | 2/2016 | Arishima et al. |
| 2016/0099451 A1 | 4/2016 | Murai et al. |
| 2016/0141589 A1 | 5/2016 | Kang et al. |
| 2016/0155998 A1 | 6/2016 | Wakimoto et al. |
| 2016/0156037 A1 | 6/2016 | Mizuno |
| 2016/0181577 A1 | 6/2016 | Kajiwara et al. |
| 2016/0226056 A1 | 8/2016 | Masson et al. |
| 2016/0329542 A1* | 11/2016 | Tyler .................. B23K 26/323 |
| 2017/0018750 A1 | 1/2017 | Wintner |
| 2017/0047575 A1 | 2/2017 | Tsuji et al. |
| 2017/0062789 A1 | 3/2017 | Sim et al. |
| 2017/0149042 A1 | 5/2017 | Koo et al. |
| 2017/0187068 A1 | 6/2017 | Morisawa et al. |
| 2017/0200935 A1 | 7/2017 | Hong et al. |
| 2017/0256769 A1 | 9/2017 | Wynn et al. |
| 2017/0338462 A1 | 11/2017 | Imre |
| 2017/0372848 A1 | 12/2017 | Yoon et al. |
| 2018/0062123 A1 | 3/2018 | Ikeda et al. |
| 2018/0123143 A1 | 5/2018 | Sato et al. |
| 2018/0130995 A1 | 5/2018 | Nemoto et al. |
| 2018/0182560 A1 | 6/2018 | Khakhalev |
| 2018/0205044 A1 | 7/2018 | Urushihara |
| 2018/0219208 A1 | 8/2018 | Dewulf et al. |
| 2018/0247773 A1 | 8/2018 | Lee |
| 2018/0375162 A1 | 12/2018 | Wakimoto et al. |
| 2019/0006639 A1 | 1/2019 | Ito |
| 2019/0081294 A1 | 3/2019 | Capati et al. |
| 2019/0148683 A1 | 5/2019 | Kwon et al. |
| 2019/0221791 A1 | 7/2019 | Wakimoto |
| 2019/0252667 A1* | 8/2019 | Moriyama .......... H01M 50/536 |
| 2019/0280256 A1 | 9/2019 | Baik et al. |
| 2019/0296283 A1 | 9/2019 | Chen et al. |
| 2019/0341201 A1 | 11/2019 | Chami et al. |
| 2019/0379019 A1 | 12/2019 | Fukuda et al. |
| 2019/0379028 A1 | 12/2019 | Lim et al. |
| 2019/0386272 A1 | 12/2019 | Shin et al. |
| 2020/0044289 A1 | 2/2020 | Pasma et al. |
| 2020/0083492 A1 | 3/2020 | Koshiol et al. |
| 2020/0119328 A1 | 4/2020 | Zheng et al. |
| 2020/0127249 A1 | 4/2020 | Yoon et al. |
| 2020/0144581 A1 | 5/2020 | Thunot |
| 2020/0144676 A1 | 5/2020 | Tsuruta et al. |
| 2020/0203773 A1 | 6/2020 | Fujita et al. |
| 2020/0212374 A1 | 7/2020 | Gaugler |
| 2020/0235369 A1 | 7/2020 | Jeong et al. |
| 2020/0295341 A1* | 9/2020 | Kim .................. H01M 10/0587 |
| 2020/0365838 A1 | 11/2020 | Chen |
| 2020/0373546 A1 | 11/2020 | Li et al. |
| 2020/0388856 A1 | 12/2020 | Hayashi |
| 2021/0039195 A1 | 2/2021 | Jost et al. |
| 2021/0075051 A1 | 3/2021 | Zhou |
| 2021/0167467 A1 | 6/2021 | Yang et al. |
| 2021/0210792 A1 | 7/2021 | Mukai et al. |
| 2021/0257652 A1 | 8/2021 | Ko et al. |
| 2021/0273298 A1 | 9/2021 | Babinot et al. |
| 2021/0278479 A1 | 9/2021 | Park et al. |
| 2021/0280835 A1 | 9/2021 | Peng et al. |
| 2021/0344033 A1 | 11/2021 | Park et al. |
| 2021/0376333 A1 | 12/2021 | Shiozaki et al. |
| 2022/0037712 A1 | 2/2022 | Kritzer et al. |
| 2022/0069335 A1 | 3/2022 | Kim |
| 2022/0123373 A1 | 4/2022 | Takahashi |
| 2022/0123444 A1 | 4/2022 | Liu et al. |
| 2022/0271344 A1 | 8/2022 | Choi et al. |
| 2022/0271402 A1 | 8/2022 | Lim et al. |
| 2023/0091100 A1* | 3/2023 | Tsushima ............ H01M 50/55 |
| | | 429/179 |
| 2023/0123195 A1 | 4/2023 | Fang et al. |
| 2024/0356123 A1 | 10/2024 | Ko et al. |

FOREIGN PATENT DOCUMENTS

| | | |
|---|---|---|
| CN | 1426609 A | 6/2003 |
| CN | 1444303 A | 9/2003 |
| CN | 1495943 A | 5/2004 |
| CN | 2681364 Y | 2/2005 |
| CN | 1700495 A | 11/2005 |
| CN | 1832228 A | 9/2006 |
| CN | 1309105 C | 4/2007 |
| CN | 101010818 A | 7/2007 |
| CN | 101026248 A | 8/2007 |
| CN | 100349321 C | 11/2007 |
| CN | 101083317 A | 12/2007 |
| CN | 200990393 Y | 12/2007 |
| CN | 201066701 Y | 5/2008 |
| CN | 201117731 Y | 9/2008 |
| CN | 101286572 A | 10/2008 |
| CN | 100468827 C | 3/2009 |
| CN | 101404338 A | 4/2009 |
| CN | 101501884 A | 8/2009 |
| CN | 201466087 U | 5/2010 |
| CN | 201638890 U | 11/2010 |
| CN | 201725845 U | 1/2011 |
| CN | 201781028 U | 3/2011 |
| CN | 202423400 U | 9/2012 |
| CN | 103155222 A | 6/2013 |
| CN | 103280543 A | 9/2013 |
| CN | 103427063 A | 12/2013 |
| CN | 203553261 U | 4/2014 |
| CN | 103797611 A | 5/2014 |
| CN | 203967145 U | 11/2014 |
| CN | 104396044 A | 3/2015 |
| CN | 204230370 U | 3/2015 |
| CN | 204596910 U | 8/2015 |
| CN | 204885267 U | 12/2015 |
| CN | 105449291 A | 3/2016 |
| CN | 105655623 A | 6/2016 |
| CN | 106030855 A | 10/2016 |
| CN | 106159350 A | 11/2016 |
| CN | 205863251 U | 1/2017 |
| CN | 106463654 A | 2/2017 |

(56) References Cited

FOREIGN PATENT DOCUMENTS

| | | |
|---|---|---|
| CN | 206250283 U | 6/2017 |
| CN | 106935746 A | 7/2017 |
| CN | 107112597 A | 8/2017 |
| CN | 206461019 U | 9/2017 |
| CN | 206461044 U | 9/2017 |
| CN | 206471426 U | 9/2017 |
| CN | 104488113 B | 10/2017 |
| CN | 107275524 A | 10/2017 |
| CN | 206619636 U | 11/2017 |
| CN | 107431215 A | 12/2017 |
| CN | 107482156 A | 12/2017 |
| CN | 107851769 A | 3/2018 |
| CN | 207217654 U | 4/2018 |
| CN | 108063192 A | 5/2018 |
| CN | 207381468 U | 5/2018 |
| CN | 108496269 A | 9/2018 |
| CN | 108695451 A | 10/2018 |
| CN | 208400966 U | 1/2019 |
| CN | 110048065 A | 7/2019 |
| CN | 209133626 U | 7/2019 |
| CN | 209328958 U | 8/2019 |
| CN | 110247058 A | 9/2019 |
| CN | 110459705 A | 11/2019 |
| CN | 110476273 A | 11/2019 |
| CN | 110581235 A | 12/2019 |
| CN | 209822778 U | 12/2019 |
| CN | 209912959 U | 1/2020 |
| CN | 110870099 A | 3/2020 |
| CN | 111033807 A | 4/2020 |
| CN | 111446386 A | 7/2020 |
| CN | 211208547 U | 8/2020 |
| CN | 111668534 A | 9/2020 |
| CN | 111952525 A | 11/2020 |
| CN | 211879534 U | 11/2020 |
| CN | 212182379 U | 12/2020 |
| CN | 112310574 A | 2/2021 |
| CN | 112335075 A | 2/2021 |
| CN | 212907981 U | 4/2021 |
| CN | 112909445 A | 6/2021 |
| CN | 113193165 A | 7/2021 |
| CN | 214378637 U | 10/2021 |
| CN | 215342666 U | 12/2021 |
| CN | 114865242 A | 8/2022 |
| CN | 217239523 U | 8/2022 |
| CN | 217239536 U | 8/2022 |
| CN | 109119674 B | 7/2024 |
| EP | 1 596 450 A2 | 11/2005 |
| EP | 2 677 592 A1 | 12/2013 |
| EP | 2 728 647 A1 | 5/2014 |
| EP | 2 876 338 A1 | 5/2015 |
| EP | 2 924 762 A2 | 9/2015 |
| EP | 2 160 777 B1 | 3/2019 |
| EP | 3 739 669 A1 | 11/2020 |
| EP | 3 748 728 A1 | 12/2020 |
| EP | 4 087 034 A1 | 11/2022 |
| EP | 4 290 630 A1 | 12/2023 |
| EP | 3 739 652 B1 | 3/2024 |
| EP | 4 336 649 A1 | 3/2024 |
| EP | 4 418 379 A1 | 8/2024 |
| EP | 4 421 970 A1 | 8/2024 |
| GB | 1191105 A | 5/1970 |
| GB | 1 332 944 A | 10/1973 |
| GB | 2564670 A | 1/2019 |
| JP | 62-7157 U | 1/1987 |
| JP | 6-124696 A | 5/1994 |
| JP | 7-201309 A | 8/1995 |
| JP | 8-22818 A | 1/1996 |
| JP | 8-102313 A | 4/1996 |
| JP | 8-180849 A | 7/1996 |
| JP | 9-92338 A | 4/1997 |
| JP | 10-83833 A | 3/1998 |
| JP | 10-106532 A | 4/1998 |
| JP | 10-214609 A | 8/1998 |
| JP | 10-228908 A | 8/1998 |
| JP | 11-67279 A | 3/1999 |
| JP | 11-144690 A | 5/1999 |
| JP | 11-176447 A | 7/1999 |
| JP | 11-219720 A | 8/1999 |
| JP | 11-297301 A | 10/1999 |
| JP | 2955135 B2 | 10/1999 |
| JP | 11-329398 A | 11/1999 |
| JP | 2000-77054 A | 3/2000 |
| JP | 2000-243433 A | 9/2000 |
| JP | 2000-260417 A | 9/2000 |
| JP | 2001-28274 A | 1/2001 |
| JP | 2001-43844 A | 2/2001 |
| JP | 2001-52756 A | 2/2001 |
| JP | 2001-93579 A | 4/2001 |
| JP | 2001-148238 A | 5/2001 |
| JP | 2001-256954 A | 9/2001 |
| JP | 3252846 B2 | 2/2002 |
| JP | 2002-157991 A | 5/2002 |
| JP | 2002-289170 A | 10/2002 |
| JP | 2003-115285 A | 4/2003 |
| JP | 2004-14173 A | 1/2004 |
| JP | 2004-95487 A | 3/2004 |
| JP | 2004-253253 A | 9/2004 |
| JP | 2004-319311 A | 11/2004 |
| JP | 3588264 B2 | 11/2004 |
| JP | 3632586 B2 | 3/2005 |
| JP | 2005-100927 A | 4/2005 |
| JP | 2005-129433 A | 5/2005 |
| JP | 2005-166664 A | 6/2005 |
| JP | 2005-276840 A | 10/2005 |
| JP | 3718872 B2 | 11/2005 |
| JP | 3751782 B2 | 3/2006 |
| JP | 2006-120606 A | 5/2006 |
| JP | 2006-278016 A | 10/2006 |
| JP | 3906519 B2 | 1/2007 |
| JP | 2007-234486 A | 9/2007 |
| JP | 2007-335156 A | 12/2007 |
| JP | 2008-66302 A | 3/2008 |
| JP | 2008-123848 A | 5/2008 |
| JP | 2008-192552 A | 8/2008 |
| JP | 2008-243811 A | 10/2008 |
| JP | 2009-104925 A | 5/2009 |
| JP | 2009-110885 A | 5/2009 |
| JP | 2009-176449 A | 8/2009 |
| JP | 4346637 B2 | 10/2009 |
| JP | 2009-259452 A | 11/2009 |
| JP | 4356209 B2 | 11/2009 |
| JP | 2009-289672 A | 12/2009 |
| JP | 2010-10117 A | 1/2010 |
| JP | 4401634 B2 | 1/2010 |
| JP | 2010-33940 A | 2/2010 |
| JP | 4430587 B2 | 3/2010 |
| JP | 2010-80392 A | 4/2010 |
| JP | 2010-529624 A | 8/2010 |
| JP | 2011-113845 A | 6/2011 |
| JP | 2011-159582 A | 8/2011 |
| JP | 2012-74359 A | 4/2012 |
| JP | 2012-510143 A | 4/2012 |
| JP | 2012-160658 A | 8/2012 |
| JP | 5019557 B2 | 9/2012 |
| JP | 5030379 B2 | 9/2012 |
| JP | 2012-190739 A | 10/2012 |
| JP | 5051410 B2 | 10/2012 |
| JP | 5206242 B2 | 6/2013 |
| JP | 2013-246966 A | 12/2013 |
| JP | 2014-222683 A | 11/2014 |
| JP | 5651536 B2 | 1/2015 |
| JP | 2015-106613 A | 6/2015 |
| JP | 2015-185517 A | 10/2015 |
| JP | 5796623 B2 | 10/2015 |
| JP | 2015-222685 A | 12/2015 |
| JP | 5877724 B2 | 3/2016 |
| JP | 2016-100323 A | 5/2016 |
| JP | 2016-115422 A | 6/2016 |
| JP | 5935878 B2 | 6/2016 |
| JP | 2016-195036 A | 11/2016 |
| JP | 2016-225014 A | 12/2016 |
| JP | 2017-143004 A | 8/2017 |
| JP | 2018-507544 A | 3/2018 |
| JP | 2018-092776 A | 6/2018 |

(56) References Cited

FOREIGN PATENT DOCUMENTS

| | | |
|---|---|---|
| JP | 2018-163765 A | 10/2018 |
| JP | 6406836 B2 | 10/2018 |
| JP | 2019-46639 A | 3/2019 |
| JP | WO2019/194182 A1 | 10/2019 |
| JP | 2020-71898 A | 5/2020 |
| JP | 6735445 B2 | 8/2020 |
| JP | 2020-527841 A | 9/2020 |
| JP | 2020-202038 A | 12/2020 |
| KR | 2001-0017098 A | 3/2001 |
| KR | 10-2001-0038811 A | 5/2001 |
| KR | 2001-0056363 A | 7/2001 |
| KR | 10-0490526 B1 | 8/2005 |
| KR | 10-2005-0110460 A | 11/2005 |
| KR | 10-2005-0121904 A | 12/2005 |
| KR | 10-2005-0121914 A | 12/2005 |
| KR | 10-0551885 B1 | 2/2006 |
| KR | 10-2006-0022128 A | 3/2006 |
| KR | 10-2006-0022358 A | 3/2006 |
| KR | 10-0599710 B1 | 7/2006 |
| KR | 10-0612238 B1 | 8/2006 |
| KR | 10-2007-0033762 A | 3/2007 |
| KR | 10-2008-0047165 A | 5/2008 |
| KR | 10-2009-0003702 A | 1/2009 |
| KR | 10-2010-0068080 A | 6/2010 |
| KR | 10-2010-0089092 A | 8/2010 |
| KR | 10-2010-0096100 A | 9/2010 |
| KR | 10-2013-0084086 A | 7/2013 |
| KR | 10-1320581 B1 | 10/2013 |
| KR | 10-1446151 B1 | 10/2014 |
| KR | 10-2015-0134566 A | 12/2015 |
| KR | 10-2016-0043725 A | 4/2016 |
| KR | 10-2016-0092748 A | 8/2016 |
| KR | 10-1679413 B1 | 11/2016 |
| KR | 10-2017-0025074 A | 3/2017 |
| KR | 10-2017-0033543 A | 3/2017 |
| KR | 10-1743136 B1 | 6/2017 |
| KR | 10-1807353 B1 | 12/2017 |
| KR | 10-2018-0026910 A | 3/2018 |
| KR | 10-1839158 B1 | 3/2018 |
| KR | 10-2018-0106367 A | 10/2018 |
| KR | 10-2018-0116004 A | 10/2018 |
| KR | 10-2018-0116156 A | 10/2018 |
| KR | 10-2018-0129115 A | 12/2018 |
| KR | 10-2019-0030016 A | 3/2019 |
| KR | 10-2019-0040699 A | 4/2019 |
| KR | 10-2019-0078094 A | 7/2019 |
| KR | 10-2042999 B1 | 11/2019 |
| KR | 10-2020-0007561 A | 1/2020 |
| KR | 10-2020-0020173 A | 2/2020 |
| KR | 10-2020-0037599 A | 4/2020 |
| KR | 10-2020-0039214 A | 4/2020 |
| KR | 10-2020-0041625 A | 4/2020 |
| KR | 10-2021-0006203 A | 1/2021 |
| TW | I679311 B | 12/2019 |
| WO | WO 01/59856 A1 | 8/2001 |
| WO | WO 2006/035980 A1 | 4/2006 |
| WO | WO 2006/085437 A1 | 8/2006 |
| WO | WO 2010/146154 A2 | 12/2010 |
| WO | WO 2012/090599 A1 | 7/2012 |
| WO | WO 2013/024774 A1 | 2/2013 |
| WO | WO 2015/025388 A1 | 2/2015 |
| WO | WO 2016/088287 A1 | 6/2016 |
| WO | WO 2016/203708 A1 | 12/2016 |
| WO | WO 2017/223429 A1 | 12/2017 |
| WO | WO 2018/117457 A1 | 6/2018 |
| WO | WO 2018/134704 A1 | 7/2018 |
| WO | WO 2019/151662 A1 | 8/2019 |
| WO | WO 2020/060069 A1 | 3/2020 |
| WO | WO 2020/083278 A1 | 4/2020 |
| WO | WO 2020/110888 A1 | 6/2020 |
| WO | WO 2020/149350 A1 | 7/2020 |
| WO | WO 2020/159071 A1 | 8/2020 |
| WO | WO 2020/171426 A1 | 8/2020 |
| WO | WO 2021/020119 A1 | 2/2021 |
| WO | WO 2021/020237 A1 | 2/2021 |
| WO | WO 2022/061187 A1 | 3/2022 |
| WO | WO 2022/163482 A1 | 8/2022 |

OTHER PUBLICATIONS

U.S. Notice of Allowance for U.S. Appl. No. 18/131,751, dated Jan. 16, 2024.
U.S. Office Action for U.S. Appl. No. 18/132,085, dated Jun. 14, 2023.
Full English Translation of Japanese Publication No. 2002-289170-A dated Oct. 4, 2002.
Full English Translation of WO 2021/020119-A1 dated Feb. 4, 2021.
Third Party Observation dated Apr. 9, 2024 for European Application No. 22742833.1.
Third Party Observation dated Apr. 17, 2024 for European Application No. 22742840.6.
Third Party Observation dated Apr. 18, 2024 for European Application No. 23214922.9.
Third Party Observation dated Apr. 19, 2024 for European Application No. 22742838.0.
Third Party Observation dated Apr. 25, 2024 for European Application No. 22742834.9.
Third Party Observation dated Apr. 4, 2024 for U.S. Appl. No. 17/592,576.
Third Party Observation dated Mar. 22, 2024 for U.S. Appl. No. 17/592,672.
Automotive & Accessories Magazine, "The core topic of Tesla's "Battery Day": reducing battery manufacturing costs," Sep. 23, 2020, 6 pages.
Third Party Observation dated Feb. 26, 2024 for European Application No. 22152256.8.
Third Party Observation dated Feb. 26, 2024 for European Application No. 22152262.6.
Partial Supplementary European Search Report dated Jul. 15, 2024, for European Application No. 22742840.6.
Third Party Observation dated Jul. 22, 2024 for European Application No. 22881172.5.
U.S. Office Action for U.S. Appl. No. 18/086,402 dated Jun. 12, 2024.
U.S. Office Action for U.S. Appl. No. 18/086,410, dated Jul. 24, 2023.
U.S. Office Action for U.S. Appl. No. 18/086,485, dated Aug. 15, 2023.
ASM Aerospace Specification Metals Inc., "Aluminum 5052-H19 Foil", 2001, https://asm.matweb.com/search/SpecificMaterial.asp?bassnum=ma5052h19, 2 pages.
Iowa State University, Center for Nondestructive Evaluation, NDE-Ed.org, Physics of Nondestructive Evaluation>Electricity, 2021, https://www.nde-ed.org/Physics/Electricity/voltage.xhtml, 14 pages.
Third Party Observation dated Feb. 13, 2024 for European Application No. 22742834.9.
U.S. Notice of Allowance for U.S. Appl. No. 17/579,380, dated Feb. 14, 2024.
U.S. Office Action for U.S. Appl. No. 17/665,896, dated Feb. 12, 2024.
Youtube, "Tesla Battery Day", Sep. 22, 2020, https://www.youtube.com/watch?v=l6T9xleZTds, 2 pages.
European Communication pursuant to Rule 114(2) EPC for European Application No. 22756569.4, dated Jun. 6, 2024.
European Communication pursuant to Rule 114(2) EPC for European Application No. 22756569.4, dated May 27, 2024.
European Communication pursuant to Rule 114(2) EPC for European Application No. 22756574.4, dated May 3, 2024.
European Communication pursuant to Rule 114(2) EPC for European Application No. 22756576.9, dated Apr. 16, 2024.
European Communication pursuant to Rule 114(2) EPC for European Application No. 22856151.0, dated Apr. 30, 2024.
European Communication pursuant to Rule 114(2) EPC for European Application No. 22881171.7, dated May 3, 2024.

(56) References Cited

OTHER PUBLICATIONS

European Communication pursuant to Rule 114(2) EPC for European Application No. 22883724.1, dated May 8, 2024.
European Communication pursuant to Rule 114(2) EPC for European Application No. 22895785.8, dated Apr. 16, 2024.
U.S. Advisory Action for U.S. Appl. No. 18/086,485, dated Nov. 3, 2023.
U.S. Office Action for U.S. Appl. No. 18/132,166, dated Oct. 2, 2023.
U.S. Office Action for U.S. Appl. No. 17/592,597, dated Jun. 21, 2023.
European Search Report mailed in EP 22 15 2207 on Jul. 22, 2022 (9 pages).
U.S. Office Action for U.S. Appl. No. 17/592,594, dated Nov. 24, 2023.
U.S. Office Action for U.S. Appl. No. 18/132,140, dated Nov. 28, 2023.
European Search Report mailed in EP 22152237 on Aug. 2, 2022 (11 pages).
European Search Report mailed in EP 22152250 on Aug. 5, 2022 (12 pages).
European Search Report mailed in EP 22152223 on Jul. 29, 2022 (10 pages).
European Search Report mailed in EP 22152245 on Jul. 28, 2022 (11 pages).
European Communication pursuant to Rule 114(2) EPC for European Application No. 22742840.6, dated Feb. 5, 2024.
"Laser Welding vs. Arc (Tig) Welding of Medical Instruments," Accumet, Oct. 22, 2014, 2 pages total.
Ma et al., "Electro-Thermal Modeling of a Lithium-ion Battery System," Sae International, vol. 3, Issue 2, Oct. 25, 2010, p. 306.
U.S. Office Action for U.S. Appl. No. 17/579,380, dated Jul. 20, 2023.
Third Party Observation for European Application No. 23215163.9, dated Jan. 17, 2025.
Third Party Observation for U.S. Appl. No. 18/273,010, dated Oct. 22, 2024.
Third Party Observation for U.S. Appl. No. 18/277,848, dated Oct. 25, 2024.
U.S. Office Action for U.S. Appl. No. 18/086,402, dated Oct. 28, 2024.
"Tesla battery production", https:/Avww.youtube.com/watch?v=zB8_HbrxUi8, Video, dated Jan. 18, 2021.
Notice of Opposition for European Application No. 22152223.8, dated Oct. 16, 2024.
U.S. Office Action for U.S. Appl. No. 17/592,576, dated Oct. 17, 2024.
European Communication of a Notice of Opposition for European Application No. 22152245.1, dated Dec. 10, 2024.
European Communication pursuant to Article 94(3) EPC for European Application No. 23 215 214.0, dated Nov. 21, 2024.
U.S. Office Action for U.S. Appl. No. 17/592,672, dated Dec. 23, 2024.
Third Party Observations for European Application No. 23218081.0, dated Jan. 9, 2025.
Extended European Search Report for European Application No. 22742833.1, dated Feb. 28, 2025.
Notice of Opposition for European Application No. 22152207.1, dated Mar. 11, 2025.
U.S. Appl. No. 63/081,244, filed Sep. 21, 2020.
U.S. Appl. No. 63/167,565, filed Mar. 29, 2021.
Extended European Search Report for European Application No. 22742838.0, dated Jun. 18, 2025.
U.S. Office Action for U.S. Appl. No. 17/592,576, dated Mar. 31, 2025.
U.S. Office Action for U.S. Appl. No. 18/132,140, dated May 9, 2025.

\* cited by examiner

FIG. 6
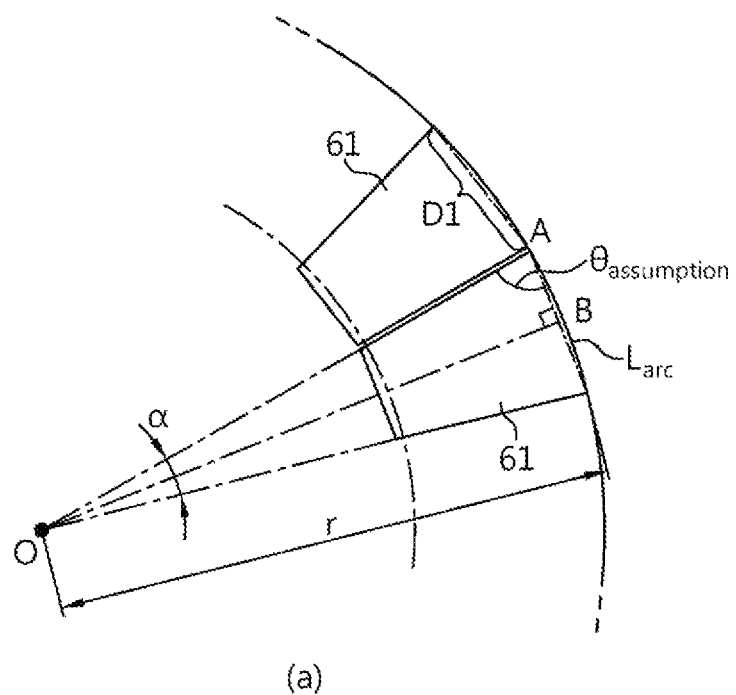
(a)
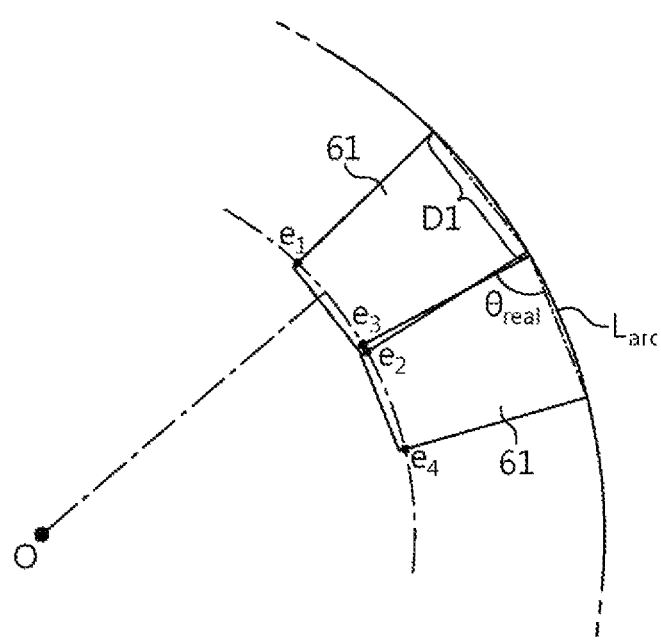
(b)

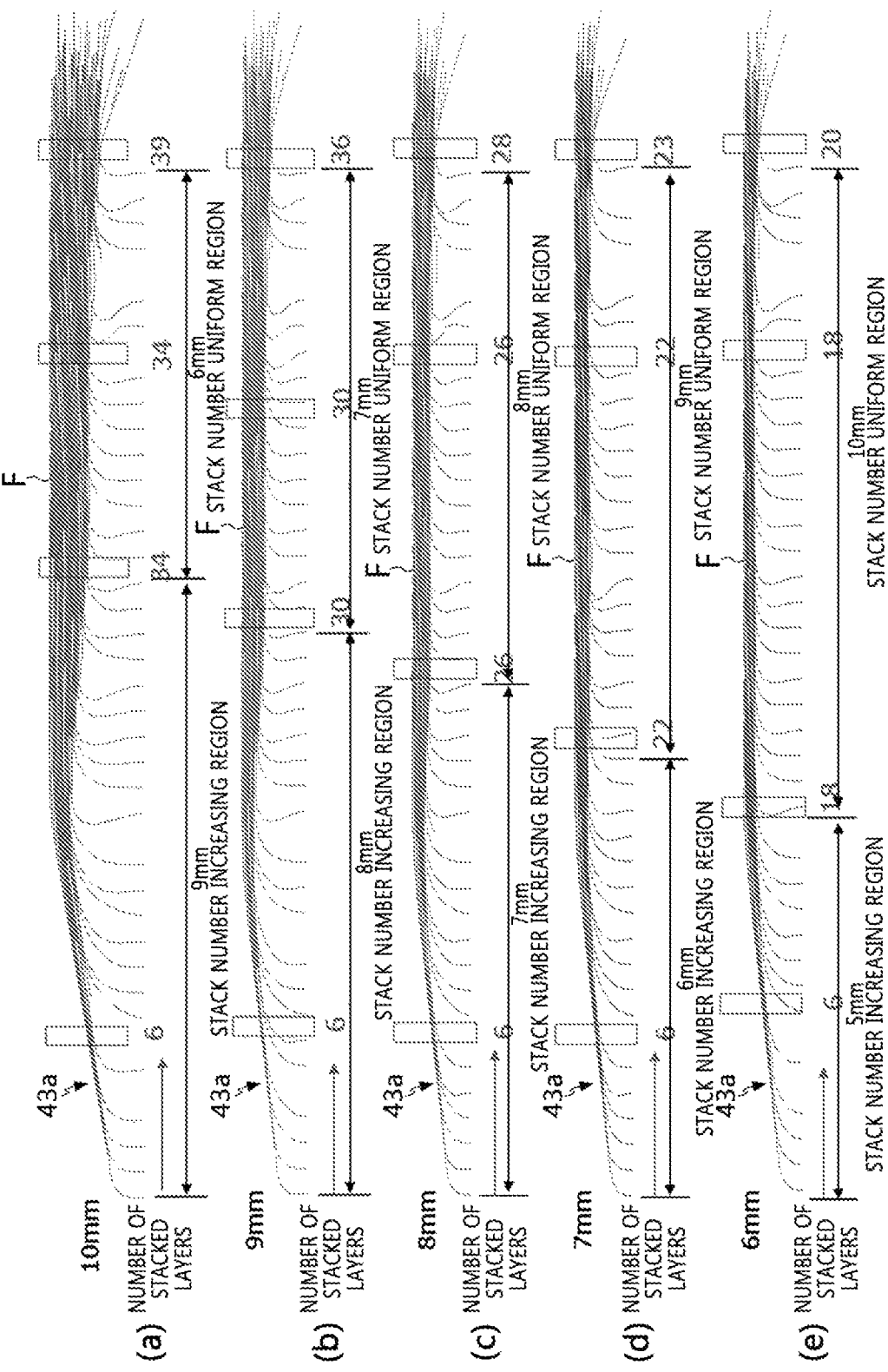

ELECTRODE ASSEMBLY, BATTERY, AND BATTERY PACK AND VEHICLE INCLUDING THE SAME

CROSS-REFERENCE TO RELATED APPLICATIONS

This non-provisional application claims the benefit under 35 U.S.C. § 119(a) to Patent Application No. 10-2021-0022881, filed in the Republic of Korea on Feb. 19, 2021, Patent Application No. 10-2021-0022891, filed in the Republic of Korea on Feb. 19, 2021, Patent Application No. 10-2021-0022894, filed in the Republic of Korea on Feb. 19, 2021, Patent Application No. 10-2021-0022897, filed in the Republic of Korea on Feb. 19, 2021, Patent Application No. 10-2021-0024424, filed in the Republic of Korea on Feb. 23, 2021, Patent Application No. 10-2021-0030291, filed in the Republic of Korea on Mar. 8, 2021, Patent Application No. 10-2021-0030300, filed in the Republic of Korea on Mar. 8, 2021, Patent Application No. 10-2021-0046798, filed in the Republic of Korea on Apr. 9, 2021, Patent Application No. 10-2021-0058183, filed in the Republic of Korea on May 4, 2021, Patent Application No. 10-2021-0077046, filed in the Republic of Korea on Jun. 14, 2021, Patent Application No. 10-2021-0084326, filed in the Republic of Korea on Jun. 28, 2021, Patent Application No. 10-2021-0131205, filed in the Republic of Korea on Oct. 1, 2021, Patent Application No. 10-2021-0131207, filed in the Republic of Korea on Oct. 1, 2021, Patent Application No. 10-2021-0131208, filed in the Republic of Korea on Oct. 1, 2021, Patent Application No. 10-2021-0131215, filed in the Republic of Korea on Oct. 1, 2021, Patent Application No. 10-2021-0131225, filed in the Republic of Korea on Oct. 1, 2021, Patent Application No. 10-2021-0137001, filed in the Republic of Korea on Oct. 14, 2021, Patent Application No. 10-2021-0137856, filed in the Republic of Korea on Oct. 15, 2021, Patent Application No. 10-2021-0142196, filed in the Republic of Korea on Oct. 22, 2021, Patent Application No. 10-2021-0153472, filed in the Republic of Korea on Nov. 9, 2021, Patent Application No. 10-2021-0160823, filed in the Republic of Korea on Nov. 19, 2021, Patent Application No. 10-2021-0163809, filed in the Republic of Korea on Nov. 24, 2021, Patent Application No. 10-2021-0165866, filed in the Republic of Korea on Nov. 26, 2021, Patent Application No. 10-2021-0172446, filed in the Republic of Korea on Dec. 3, 2021, Patent Application No. 10-2021-0177091, filed in the Republic of Korea on Dec. 10, 2021, Patent Application No. 10-2021-0194572, filed in the Republic of Korea on Dec. 31, 2021, Patent Application No. 10-2021-0194593, filed in the Republic of Korea on Dec. 31, 2021, Patent Application No. 10-2021-0194610, filed in the Republic of Korea on Dec. 31, 2021, Patent Application No. 10-2021-0194611, filed in the Republic of Korea on Dec. 31, 2021, Patent Application No. 10-2021-0194612, filed in the Republic of Korea on Dec. 31, 2021, and Patent Application No. 10-2022-0001802, filed in the Republic of Korea on Jan. 5, 2022, all of which are hereby expressly incorporated by reference in their entireties into the present application.

Also, Patent Application No. 10-2021-0007278, filed in the Republic of Korea on Jan. 19, 2021, is hereby expressly incorporated by reference in its entirety into the present application.

TECHNICAL FIELD

The present disclosure relates to an electrode assembly, a battery, and a battery pack and a vehicle including the same.

BACKGROUND ART

Secondary batteries that are easily applicable to various product groups and have electrical characteristics such as high energy density are universally applied not only to portable devices but also to electric vehicles (EVs) or hybrid electric vehicles (HEVs) driven by an electric drive source.

These secondary batteries are attracting attention as a new energy source to improve eco-friendliness and energy efficiency because they have the primary advantage that they can dramatically reduce the use of fossil fuels as well as the secondary advantage that no by-products are generated from the use of energy.

Secondary batteries currently widely used in the art include lithium ion batteries, lithium polymer batteries, nickel cadmium batteries, nickel hydrogen batteries, nickel zinc batteries, and the like. A unit secondary battery, namely a unit battery, has an operating voltage of about 2.5V to 4.5V. Therefore, when a higher output voltage is required, a battery pack may be configured by connecting a plurality of batteries in series. In addition, a plurality of batteries may be connected in parallel to form a battery pack according to the charge/discharge capacity required for the battery pack. Accordingly, the number of batteries included in the battery pack and the form of electrical connection may be variously set according to the required output voltage and/or charge/discharge capacity.

Meanwhile, as a kind of unit secondary battery, there are known cylindrical, rectangular, and pouch-type batteries. In the case of a cylindrical battery, a separator serving as an insulator is interposed between a positive electrode and a negative electrode, and they are wound to form an electrode assembly in the form of a jelly roll, which is inserted into a battery housing to configure a battery. In addition, a strip-shaped electrode tab may be connected to an uncoated portion of each of the positive electrode and the negative electrode, and the electrode tab electrically connects the electrode assembly and an electrode terminal exposed to the outside. For reference, the positive electrode terminal is a cap of a sealing body that seals the opening of the battery housing, and the negative electrode terminal is the battery housing. However, according to the conventional cylindrical battery having such a structure, since current is concentrated in the strip-shaped electrode tab coupled to the uncoated portion of the positive electrode and/or the uncoated portion of the negative electrode, the current collection efficiency is not good due to large resistance and large heat generation.

For small cylindrical batteries with a form factor 1865 (diameter: 18 mm, height: 65 mm) or a form factor 2170 (diameter: 21 mm, height: 70 mm), resistance and heat are not a major issue. However, when the form factor is increased to apply the cylindrical battery to an electric vehicle, the cylindrical battery may ignite while a lot of heat is generated around the electrode tab during the rapid charging process.

In order to solve this problem, there is provided a cylindrical battery (so-called tab-less cylindrical battery) in which the uncoated portion of the positive electrode and the uncoated portion of the negative electrode are designed to be positioned at the top and bottom of the jelly-roll type electrode assembly, respectively, and the current collector is welded to the uncoated portion to improve the current collecting efficiency.

FIGS. 1 to 3 are diagrams showing a process of manufacturing a tab-less cylindrical battery. FIG. 1 shows the structure of an electrode, FIG. 2 shows a process of winding the electrode, and FIG. 3 shows a process of welding a current collector to a bending surface region of an uncoated portion.

Referring to FIGS. 1 to 3, a positive electrode 10 and a negative electrode 11 have a structure in which a sheet-shaped current collector 20 is coated with an active material 21, and include an uncoated portion 22 at one long side along the winding direction X.

An electrode assembly A is manufactured by sequentially stacking the positive electrode 10 and the negative electrode 11 together with two sheets of separators 12 as shown in FIG. 2 and then winding them in one direction X. At this time, the uncoated portions of the positive electrode 10 and the negative electrode 11 are arranged in opposite directions. The positions of the positive electrode 10 and the negative electrode 11 may be changed opposite to those shown in the figures.

After the winding process, the uncoated portion 10a of the positive electrode 10 and the uncoated portion 11a of the negative electrode 11 are bent toward the core to form a bending surface region. After that, current collectors 30, 31 are welded and coupled to the uncoated portions 10a, 11a, respectively.

An electrode tab is not separately coupled to the positive electrode uncoated portion 10a and the negative electrode uncoated portion 11a, the current collectors 30, 31 are connected to external electrode terminals, and a current path is formed with a large cross-sectional area along the winding axis direction of electrode assembly A (see arrow, which has an advantage of lowering the resistance of the battery. This is because resistance is inversely proportional to the cross-sectional area of the path through which the current flows.

In the tab-less cylindrical battery, in order to improve the welding characteristics between the uncoated portions 10a, 11a and the current collectors 30, 31, a strong pressure should be applied to the welding regions of the uncoated portions 10a, 11a to bend the uncoated portions 10a, 11a as flat as possible.

When the uncoated portions 10a, 11a are bent, as the uncoated portion 32 adjacent to the core of the electrode assembly A is bent, all or a significant portion of the cavity 33 in the core of the electrode assembly A is blocked. In this case, it causes a problem in the electrolyte injection process. That is, the cavity 33 in the core of the electrode assembly A is used as a passage through which an electrolyte is injected. However, if the corresponding passage is blocked, electrolyte injection is difficult. In addition, while an electrolyte injector is being inserted into the cavity 33, the electrolyte injector may interfere with the uncoated portion 32 bent near the core, which may cause the uncoated portion 32 to tear.

In addition, the bent portions of the uncoated portions 10a, 11a to which the current collectors 30, 31 are welded should be overlapped in multiple layers and there should not be any empty spaces (gaps). In this way, sufficient welding strength may be obtained, and even with the latest technology such as laser welding, it is possible to prevent laser from penetrating into the electrode assembly A and melting the separator or the active material.

In order for the uncoated portions 10a, 11a to be overlapped with the same number of layers, the uncoated portions 10a, 11a at the corresponding positions based on the position of each winding turn should be bent toward the core and cover the top surface of the uncoated portion bent at an inner winding turn. In addition, assuming that the interval between winding turns is d and the bending length of the uncoated portions 10a, 11a of each winding turn is e, the bending length e should have a length greater than d*n (n is a natural number greater than or equal to 2). Only in this case, an area where the uncoated portions 10a, 11a are overlapped in multiple layers with the same amount is formed. In addition, in order to sufficiently obtain a region in which the uncoated portions 10a, 11a are overlapped in substantially the same number in the radial direction of the electrode assembly, the uncoated portions 10a, 11a should have a sufficient length. However, since the electrode assembly included in a small cylindrical battery has a small radius, it is difficult to conceive of a motivation for deriving the concept of designing the uncoated portions 10a, 11a having a sufficiently long bending length.

DISCLOSURE

Technical Problem

The present disclosure is designed to solve the problems of the related art, and therefore the present disclosure is directed to providing an electrode assembly having an uncoated portion bent structure that may prevent a separator or an active material layer from being damaged when welding a current collector by sufficiently securing a region in which uncoated portions are overlapped into 10 or more layers in a radial direction of an electrode assembly when the uncoated portions exposed at both ends of the electrode assembly are bent.

The present disclosure is also directed to providing an electrode assembly in which an electrolyte injection passage is not blocked even if the uncoated portion is bent.

The present disclosure is also directed to providing an electrode assembly with improved energy density and reduced resistance.

The present disclosure is also directed to providing a battery including the electrode assembly having an improved structure, a battery pack including the battery, and a vehicle including the battery pack.

The technical objects to be solved by the present disclosure are not limited to the above, and other objects not mentioned herein will be clearly understood by those skilled in the art from the following disclosure.

Technical Solution

In one aspect of the present disclosure, there is provided an electrode assembly including a first electrode; a second electrode; and a separator between the first electrode and the second electrode, the first electrode, the second electrode, and the separator wound about an axis defining a core and an outer circumference of the electrode assembly, wherein the first electrode includes a first portion coated with an active material and a second portion at a first side and adjacent the first portion, the second portion being exposed beyond the separator along a first axial direction of the electrode assembly, wherein a part of the second portion is bent in a radial direction of the electrode assembly forming a first surface region including stacked layers of the second portion, and wherein, in a partial region of the first surface region, a number of the stacked layers of the second portion may be 10 or more in the first axial direction.

A number of total winding turns of the first electrode may be defined as $n_1$, a relative radial position $R_{1,k}$ may be defined by dividing a winding turn index k at a $k^{th}$ winding turn location of the first electrode by the number of total winding turns $n_1$, k being a natural number of 1 to $n_1$, and a ratio between a length of a radial region including the relative radial position $R_{1,k}$ having 10 or more stacked layers of the second portion and a length of the first surface region may be 30% or more.

The ratio may be 30% to 85%.

The second electrode may include a third portion coated with an active material and a fourth portion at a second side and adjacent the third portion, the fourth portion being exposed beyond the separator along a second axial direction of the electrode assembly, a part of the fourth portion may be bent in the radial direction of the electrode assembly forming a second surface region including stacked layers of the fourth portion, and, in a partial region of the second surface region, a number of the stacked layers of the fourth portion may be 10 or more in the second axial direction of the electrode assembly.

A number of total winding turns of the second electrode may be defined as $n_2$, a relative radial position $R_{2,k}$ may be defined by dividing a winding turn index k at a $k^{th}$ winding turn location of the second electrode by the number of total winding turns $n_2$, k being a natural number of 1 to $n_2$, and a ratio between a length of a radial region including the relative radial position $R_{2,k}$ having 10 or more stacked layers of the fourth portion and a length of the second surface region may be 30% or more The ratio may be 30% to 85%.

A region of the second portion from a relative radial position $R_{1,1}$ of a $1^{st}$ winding turn of the first electrode to a relative radial position $R_{1,k*}$ of a $k^{*th}$ winding turn of the first electrode may have a smaller height than a region of the second portion from a relative radial position $R_{1,k*+1}$ of a $k*+1^{th}$ winding turn of the first electrode to a relative radial position of a $n_1^{th}$ winding turn of the first electrode.

A region of the second portion from a relative radial position $R_{1,1}$ of $1^{st}$ winding turn of the first electrode to a relative radial position $R_{1,k*}$ of a $k^{*th}$ winding turn of the first electrode may have a smaller height than the first surface region.

A region of the second portion from a relative radial position $R_{1,1}$ of a $1^{st}$ winding turn of the first electrode to a relative radial position $R_{1,k*}$ of a $k^{*th}$ winding turn may include one or more layers of the second portion not bent toward the core of the electrode assembly.

A region of the fourth portion from a relative radial position $R_{2,1}$ of $1^{st}$ winding turn of the second electrode to a relative radial position $R_{2,k*}$ of a $k^{*th}$ winding turn of the second electrode may have a smaller height than a region of the fourth portion from a relative radial position $R_{2,k*+1}$ of a $k*+1^{th}$ winding turn of the second electrode to a relative radial position of a $n_2^{th}$ winding turn of the second electrode.

A region of the fourth portion from a relative radial position $R_{2,1}$ of a $1^{st}$ winding turn of the second electrode to a relative radial position $R_{2,k*}$ of a t $k^{*th}$ winding turn of the second electrode may have a smaller height than the second surface region.

A region of the fourth portion from a relative radial position $R_{2,1}$ of a 1st winding turn of the second electrode to a relative radial position $R_{2,k*}$ of a $k^{*th}$ winding turn of the second electrode may include one or more layers of the fourth portion not bent toward the core of the electrode assembly.

The second portion or the fourth portion may include a plurality of segments, and each of the plurality of segments may be bendable.

Each of the plurality of segments may have a geometric shape including a base at a bending line of each of the plurality of the segments, and the geometric shape may include one or more straight lines, one or more curves, or a combination thereof.

The geometric shape may have a width decreasing stepwise or gradually from the base to a top of the geometric shape.

A lower internal angle of the geometric shape between the base and a side of at least one of the plurality of segments intersecting the base may be 60 degrees to 85 degrees.

The plurality of segments may have a plurality of lower internal angles, and the plurality of lower internal angles may increase stepwise or gradually along a direction parallel to a winding direction of the electrode assembly.

Each of the plurality of segments may have a geometric shape having a base at a bending line of each of the plurality of segments, and a lower internal angle θassumption and a lower internal angle $θ_{real}$ of each of the plurality of segments may satisfy the following formula:

$$θ_{real} > θ_{assumption};\text{ and}$$

$$θ_{assumption} = 90° - 360° * (L_{arc}/2πr)*0.5,$$

wherein $θ_{assumption}$ may be a lower internal angle of each of the plurality of segments at a winding turn based on adjacent sides of a pair of the plurality of segments being parallel, wherein $θ_{real}$ may be an actual lower internal angle at the winding turn, wherein r may be a radius of the winding turn from a core center of the electrode assembly to each of the plurality of segments at the winding turn, and wherein $L_{arc}$ may be an arc length corresponding to a lower portion of each of the plurality of segments at the winding turn.

A circumferential angle corresponding to the $L_{arc}$ may be 45 degrees or less.

An overlapping ratio of the adjacent sides of the pair of the plurality of segments at the winding turn may satisfy the following formula:

$$θ_{real}/θ_{assumption} - 1,$$

wherein the overlapping ratio of the pair of the plurality of segments may be greater than 0 and less than 0.05.

A virtual circle passing through an adjacent pair of the plurality of segments at a winding turn having a radius from a core center of the electrode may include a pair of arcs passing through each segment of the adjacent pair of the plurality of segments overlapping with each other.

A ratio between a length of an overlapping arc of the pair of arcs to a length of each arc of the pair of arcs passing through each of the pair of the plurality segments may be defined as an overlapping ratio, and the overlapping ratio may be greater than 0 and less than 0.05.

A region of the second portion from a relative radial position $R_{1,1}$ of a $1^{st}$ winding turn of the first electrode to a relative radial position $R_{1,k*}$ of a $k^{*th}$ winding turn of the first electrode may have a smaller height than a region of the second portion from a relative radial position $R_{1,k*+1}$ of a $k*+1^{th}$ winding turn of the first electrode to a relative radial position of a $n_1^{th}$ winding turn of the first electrode, and the region from the relative radial position $R_{1,1}$ of the $1^{st}$ winding turn to the relative radial position $R_{1,k*}$ of the $k^{*th}$ winding turn may not be bent toward the core.

A length of the first electrode corresponding to the region from the relative radial position $R_{1,1}$ to the relative radial position $R_{1,k*}$ may be 1% to 30% compared to a length of the first electrode corresponding to the region from the relative radial position $R_{1,k*+1}$ to the relative radial position of the $n_1^{th}$ winding turn of the first electrode.

A bending length $fd_{1,k*+1}$ of the second portion at a relative radial position $R_{1,k*+1}$ of a $k*+1^{th}$ winding turn of the first electrode may be shorter than a radial length from a relative radial position $R_{1,1}$ of $1^{st}$ winding turn of the first electrode to a relative radial position $R_{1,k*}$ of a $k*^{th}$ winding turn of the first electrode.

A radius of the core of the electrode assembly may be defined as $r_c$, and a region from a center of the core to $0.90r_c$ may not be blocked by a bent portion of the second portion located in a region from a relative radial position $R_{1,k*+1}$ of a $k*+1^{th}$ winding turn of the first electrode to a relative radial position of a $n_1^{th}$ winding turn of the first electrode.

A bending length $fd_{1,k*+1}$ of the second portion at the relative radial position $R_{1,k*+1}$ of the $k*+1^{th}$ winding turn, the radius $r_c$ of the core, and a distance $d_{1,k*+1}$ from a center of the electrode assembly to the relative radial position $R_{1,k*+1}$ may satisfy the following formula:

$$fd_{1,k*+1}+0.90*r_c \leq d_{1,k*+1}.$$

A region of the fourth portion from a relative radial position $R_{2,1}$ of a $1^{st}$ winding turn of the second electrode to a relative radial position $R_{2,k*}$ of a $k*^{th}$ winding turn may have a smaller height than a region of the fourth portion from a relative radial position $R_{2,k*+1}$ of a $k*+1^{th}$ winding turn of the second electrode to a relative radial position of $n_2^{th}$ winding turn of the second electrode, and the region from the relative radial position $R_{2,1}$ of the $1^{st}$ winding turn to the relative radial position $R_{2,k*}$ of a $k*^{th}$ winding turn may not be bent toward the core.

A length of the second electrode corresponding to the region from the relative radial position $R_{2,1}$ to the relative radial position $R_{2,k*}$ may be 1% to 30% compared to a length of the second electrode corresponding to the region from the relative radial position $R_{2,k*+1}$ to the relative radial position of $n_2^{th}$ winding turn of the second electrode.

A bending length $fd_{2,k*+1}$ of the fourth portion at a relative radial position $R_{2,k*+1}$ of a $k*+1^{th}$ winding turn of the second electrode may be shorter than a radial length from a relative radial position $R_{2,1}$ of a $1^{st}$ winding turn of the second electrode to a relative radial position $R_{1,k*}$ of a $k*^{th}$ winding turn of the second electrode.

A radius of the core of the electrode assembly may be defined as $r_c$, and a region from a center of the core to $0.90r_c$ may not be blocked by a bent portion of the fourth portion of the second electrode located in a region from a relative radial position $R_{2,k*+1}$ of a $k*+1^{th}$ winding turn of the second electrode to a relative radial position of a $n_2^{th}$ winding turn of the first electrode.

A bending length $fd_{2,k*+1}$ of the fourth portion at the relative radial position $R_{2,k*+1}$ of a $k*+1^{th}$ winding turn, the radius $r_c$ of the core, and a distance $d_{2,k*+1}$ from a center of the electrode assembly to the relative radial position $R_{2,k*+1}$ may satisfy the following formula:

$$fd_{2,k*+1}+0.90*r_c \leq d_{2,k*+1}.$$

A region of the second portion from a relative radial position $R_{1,k*+1}$ of a $k*+1^{th}$ winding turn of the first electrode to a relative radial position $R_{1,k@}$ of a $k@^{th}$ winding turn of the first electrode may be divided into a plurality of segments, and heights of the plurality of segments may increase gradually or stepwise along a direction parallel to a winding direction of the first electrode.

A radial length of the region from the relative radial position $R_{1,k*+1}$ to the relative radial position $R_{1,k@}$ may be 1% to 56% compared to a radial length of a region from a relative radial position $R_{1,1}$ of a $1^{st}$ winding turn of the first electrode to a relative radial position of a $n_1^{th}$ turn of the first electrode.

A region of the second portion from a relative radial position $R_{1,k@+1}$ of a $k@+1^{th}$ winding turn of the first electrode to a relative radial position of a $n_1^{th}$ turn of the first electrode may be divided into a plurality of segments, the plurality of segments having substantially a same height from the relative radial position $R_{1,k@+1}$ to the relative radial position of the $n_1^{th}$ turn of the first electrode.

A region of the fourth portion from a relative radial position $R_{2,k*+1}$ of a $k*+1^{th}$ winding turn of the second electrode to a relative radial position $R_{2,k@}$ of a $k@^{th}$ winding turn of the second electrode may be divided into a plurality of segments, and heights of the plurality of segments may increase stepwise or gradually along a direction parallel to a winding direction of the second electrode.

A radial length of the region from the relative radial position $R_{2,k*+1}$ to the relative radial position $R_{2,k@}$ may be 1% to 56% compared to a radial length of a region from a relative radial position $R_{2,1}$ of a $1^{st}$ winding turn of the second electrode to a relative radial position of a $n_2^{th}$ turn of the second electrode.

A region of the fourth portion from a relative radial position $R_{2,k@+1}$ of a $k@+1^{th}$ winding turn of the second electrode to a relative radial position of a $n_2^{th}$ turn of the second electrode may be divided into a plurality of segments, and the plurality of segments may have substantially a same height from the relative radial position $R_{2,k@+1}$ to the relative radial position of the $n_2^{th}$ turn of the second electrode.

A region of the second portion may be divided into a plurality of segments that are independently bendable, and one or more heights of the plurality of segments in the first axial direction or one or more widths of the plurality of segments in a winding direction of the first electrode may increase gradually or stepwise along a direction parallel to the winding direction of the first electrode individually or in groups.

A region of the fourth portion is divided into a plurality of segments that are independently bendable, and one or more heights of the plurality of segments in the second axial direction or one or more widths of the plurality of segments in a winding direction of the second electrode may increase gradually or stepwise along a direction parallel to the winding direction of the second electrode individually or in groups.

Each of the plurality of segments of the second portion or the fourth portion may have a width condition of 1 to 11 mm in the radial direction, a height condition of 2 to 10 mm in the first axial direction or the second axial direction, or a separation pitch condition of 0.05 mm to 1 mm in the winding direction.

The electrode assembly may further include a cut groove between the plurality of segments of the second portion or the fourth portion; and a predetermined gap between a bottom of the cut groove.

The predetermined gap may have a length of 0.2 mm to 4 mm.

The plurality of segments of the second portion or the fourth portion may include a plurality of segment groups along a winding direction of the first electrode or the second electrode, and segments belonging to a same segment group of the plurality of segment groups may have a substantially the same width in the winding direction, height in the first axial direction or the second axial direction, or separation pitch in the winding direction.

The segments belonging to the same segment group may be formed with the width in the winding direction, the height in the first axial direction or the second axial direction, or the separation pitch in the winding direction increasing gradually or stepwise along a direction parallel to the winding direction of the first electrode or the second electrode.

At least a part of the plurality of segment groups may be disposed at a same winding turn of the electrode assembly.

The first surface region may include a stack number increasing region and a stack number uniform region from the outer circumference of the electrode assembly to the core, the stack number increasing region may be a region having an increasing number of the stacked layers of the second portion toward to the core of the electrode assembly, the stack number uniform region may be a region from a radial position where the increasing number of the stacked layers of the second portion stops to a radial position where the second portion starts to bend, and a radial length of the stack number uniform region may be 30% or more compared to a radial length from a winding turn where the second portion starts bending to a winding turn where the second portion stops bending.

The second surface region may include a stack number increasing region and a stack number uniform region from the outer circumference of the electrode assembly to the core, the stack number increasing region may be a region having an increasing number of stacked layers of the fourth portion toward to the core of the electrode assembly, the stack number uniform region may be a region from a radial position where the increasing number of the stacked layers of the fourth portion stops to a radial position where a number of stacked layers of the fourth portion starts to bend, and a radial length of the stack number uniform region may be 30% or more compared to a radial length from a winding turn where the fourth portion starts bending to a winding turn where the fourth portion stops bending.

The first electrode and the second electrode may have a thickness of 80 μm to 250 μm, and an interval of the second portion and the fourth portion at adjacent winding turns in the radial direction of the electrode assembly may be 200 μm to 500 μm.

The second portion of the first electrode may have a thickness of 10 μm to 25 μm.

The fourth portion of the second electrode may have a thickness of 5 μm to 20 μm.

In the partial region of the first surface region, a total stack thickness of the stacked layers of the second portion may be 100 μm to 975 μm.

The second portion may include a plurality of segments that are independently bendable, the first electrode may include a height variable region having the plurality of segments with variable heights and a height uniform region having the plurality of segments with a substantially uniform height, and a ratio of a stack thickness of the second portion in the first surface region to the substantially uniform height of the plurality of segments in the height uniform region may be 1.0% to 16.3%.

In the partial region of the second surface region, a total stack thickness of stacked layers of the fourth portion may be 50 μm to 780 μm.

The fourth portion may include a plurality of segments that are independently bendable, the second electrode may include a height variable region having the plurality of segments with variable heights and a height uniform region having the plurality of segments with a substantially uniform height, and a ratio of a stack thickness of the fourth portion of the second surface region to the substantially uniform height of the plurality of segments in the height uniform region may be 0.5% to 13.0%.

A ratio between a length of a radial region having 10 or more stacked layers of the second portion and a length of the first surface region may be 30% or more.

In another aspect of the present disclosure, there is also provide an electrode assembly that includes a first electrode; a second electrode; and a separator between the first electrode and the second electrode, the first electrode, the second electrode, and the separator wound about an axis defining a core and an outer circumference, wherein the first electrode includes a first portion coated with an active material and a second portion at a first side and adjacent to the first portion, the second portion being exposed beyond the separator along a first axial direction of the electrode assembly, wherein a part of the second portion is bent in a radial direction of the electrode assembly forming a first surface region, and wherein, in a partial region of the first surface region, a stack thickness of the second portion may be 100 μm to 975 μm.

The first portion of the first electrode may include a plurality of segments that are independently bendable, the first electrode may include a height variable region having the plurality of segments with variable heights and a height uniform region with the plurality of segments having a substantially uniform height, and a ratio of a stack thickness of the second portion in the first surface region to the substantially uniform height of the plurality of segments in the height uniform region may be 1.0% to 16.3%.

The second electrode may include a third portion coated with an active material and a fourth portion at a second side and adjacent to the third portion, and the fourth portion being exposed beyond the separator along a second axial direction of the electrode assembly, a part of the fourth portion is bent in the radial direction of the electrode assembly forming a second surface region, and wherein, in a partial region of the second surface region, a stack thickness of the fourth portion may be 50 μm to 780 μm.

The fourth portion may include a plurality of segments that are independently bendable, the second electrode may include a height variable region having the plurality of segments with variable heights and a height uniform region having the plurality of segments with a substantially uniform height, and a ratio of a stack thickness of the fourth portion of the second surface region to the substantially uniform height of the segment may be 0.5% to 13.0%

In another aspect of the present disclosure, there is also provided a battery including an electrode assembly having a first electrode, a second electrode, and a separator between the first electrode and the second electrode, the first electrode, the second electrode, and the separator wound about an axis defining a core and an outer circumference, wherein at least one of the first electrode or the second electrode may include a first portion coated with an active material and a second portion at a first side and adjacent to the first portion, the second portion being exposed beyond the separator along a first axial direction of the electrode assembly, and wherein at least a part of the second portion may be bent in a radial direction of the electrode assembly forming a first surface region including stacked layers of the second portion, and wherein, in a partial region of the first surface region, a number of the stacked layers of the second portion may be 10 or more; a battery housing may accommodate the electrode assembly and may be electrically connected to one of the first electrode or the second electrode to have a first polarity; a sealing body may seal a first opening of the battery housing; a terminal may be electrically connected to the other one of the first electrode or the second electrode to have a second polarity, the terminal having a surface exposed to an outside of the battery housing; and a current collector may be welded to the first surface region and electrically connected to one of the battery housing or the terminal, and a welding region of the current collector overlaps with the first surface region having 10 or more of the stacked layers of the second portion.

A number of total winding turns of the first electrode may be defined as $n_1$, a relative radial position $R_{1,k}$ may be defined by dividing a winding turn index k at a $k^{th}$ winding turn location of the first electrode by the number of total winding turns $n_1$, k being a natural number of 1 to $n_1$, and a ratio between a length of a radial region including the relative radial position $R_{1,k}$ having 10 or more stacked layers of the second portion and a length of the first surface region may be 30% or more.

The second electrode may include a third portion coated with an active material and a fourth portion at a second side and adjacent to the third portion, and the fourth portion may be exposed beyond the separator along a second axis direction of the electrode assembly, a number of total winding turns of the second electrode may be defined as $n_2$, a relative radial position $R_{2,k}$ may be defined by dividing a winding turn index k at a $k^{th}$ winding turn location of the first electrode by the number of total winding turns $n_2$, k being a natural number of 1 to $n_2$, and a ratio between a length of a radial region including the relative radial position $R_{2,k}$ having 10 or more stacked layers of the fourth portion and a length of the second surface region may be 30% or more. 50% or more of the welding region of the current collector may overlap with the first surface region having 10 or more stacked layers of the second portion.

A welding strength of the current collector may be 2 $kgf/cm^2$ or more.

In yet another aspect of the present disclosure, there is also provided a battery including an electrode assembly including a first electrode, a second electrode, and a separator between the first electrode and the second electrode, wherein the first electrode, the second electrode, and the separator are wound about an axis to define a core and an outer circumference, wherein the first electrode includes a first portion coated with an active material and a second portion at a first side and adjacent to the first portion, the second portion being exposed beyond the separator along a first axial direction of the electrode assembly, wherein a part of the second portion is bent in a radial direction of the electrode assembly to form a first surface region, and wherein, in a partial region of the first surface region, a stack thickness of the second portion is 100 µm to 975 µm; a battery housing accommodating the electrode assembly and electrically connected to one of the first electrode or the second electrode to have a first polarity; a sealing body sealing a first end of the battery housing; a terminal electrically connected to the other of the first electrode or the second electrode to have a second polarity and configured to have a surface exposed to the outside of the battery housing; and a first current collector welded to the first surface region and electrically connected to one of the battery housing or the terminal, wherein a welding region of the first current collector overlaps with the partial region of the first surface region having the stack thickness of the second portion may be 100 µm to 975 µm.

The second portion of the first electrode may be divided into a plurality of segments that are independently bendable, the first electrode may include a height variable region having the plurality of segments with variable heights and a height uniform region having the plurality of segments with a substantially uniform height, and a ratio of a stack thickness of the second portion in the first surface region to the substantially uniform height of the plurality of segment in the height uniform may be 1.0% to 16.3%.

A welding strength of the first current collector may be 2 $kgf/cm^2$ or more.

The second electrode may include a third portion coated with an active material and a fourth portion at a second side and adjacent to the third portion, and the fourth portion being exposed beyond the separator along a second axial direction of the electrode assembly, a part of the fourth portion may be bent in the radial direction of the electrode assembly forming a second surface region, in a partial region of the second surface region, a stack thickness of the fourth portion may be 50 µm to 780 µm, the battery further includes a second current collector welded to the second surface region and electrically connected to the other of the battery housing or the terminal, and a welding region of the second current collector may overlap with the partial region of the second surface region in which the stack thickness of the fourth portion may be 50 µm to 780 µm.

The fourth portion of the second electrode may be divided into a plurality of segments that are independently bendable, the second electrode may include a height variable region having the plurality of segments with variable heights and a height uniform region having the plurality of segments with a substantially uniform height, and a ratio of a stack thickness of the fourth portion in the second surface region to the substantially uniform height of the plurality of segments in the height uniform region may be 0.5% to 13.0%

A welding strength of the second current collector is 2 $kgf/cm^2$ or more.

The welding region of the first current collector may overlap with the partial region of the first surface region in which the stack thickness of the second portion is 100 µm to 975 µm by 50% or more.

The welding region of the second current collector may overlap with the partial region of the second bending surface region in which the stack thickness of the fourth portion may be 50 µm to 780 µm by 50% or more.

In another aspect of the present disclosure, there is also provided a battery pack comprising the battery described above, and a vehicle comprising the battery pack.

Finally, in another aspect of the present disclosure, a method of making an electrode assembly for a battery includes providing a first electrode; providing a second electrode; providing a separator between the first electrode and the second electrode, winding the first electrode, the second electrode, and the separator about an axis to define a core and an outer circumference of the electrode assembly; coating a first portion on the first electrode with an active material; exposing a second portion on the first electrode beyond the separator along a first axial direction of the electrode assembly; bending a part of the second portion in a radial direction of the electrode assembly to form a first surface region including stacked layers of the second portion; and forming in a partial region of the first surface region, 10 or more stacked layers of the second portion in the first axial direction.

The method further includes coating a third portion on the second electrode with the active material; exposing a fourth portion on the first electrode beyond the separator along a second axial direction of the electrode assembly; bending a part of the fourth portion in a radial direction of the electrode assembly to form a second surface region including stacked layers of the fourth portion; and forming in a partial region of the second surface region, 10 or more stacked layers of the fourth portion in the second axial direction.

Advantageous Effects

According to an embodiment of the present disclosure, when bending the uncoated portions exposed at both ends of the electrode assembly, it is possible to prevent the separator or the active material layer from being damaged even if the welding power is increased by sufficiently securing an area where the uncoated portion is overlapped into 10 or more layers in the radial direction of the electrode assembly.

According to still another embodiment of the present disclosure, since the structure of the uncoated portion adjacent to the core of the electrode assembly is improved, it is possible to prevent the cavity in the core of the electrode assembly from being blocked when the uncoated portion is bent. Thus, the electrolyte injection process and the process of welding the battery housing and the current collector may be carried out easily.

According to still another embodiment of the present disclosure, since the bending surface region of the uncoated portion is directly welded to the current collector instead of a strip-shaped electrode tab, it is possible to provide an electrode assembly with improved energy density and reduced resistance.

According to still another embodiment of the present disclosure, it is possible to provide a battery having a structure that has a low internal resistance and improves welding strength between the current collector and the uncoated portion, and a battery pack and a vehicle including the battery.

In addition, the present disclosure may have several other effects, and such effects will be described in each embodiment, or any description that can be easily inferred by a person skilled in the art will be omitted for an effect.

DESCRIPTION OF DRAWINGS

The accompanying drawings illustrate embodiments of the present disclosure and together with the foregoing disclosure, serve to provide further understanding of the technical features of the present disclosure, and thus, the present disclosure is not construed as being limited to the drawing.

FIG. 6 is a diagram for explaining the overlapping condition of segments according to an embodiment of the present disclosure.

FIG. 9b is a sectional view showing an electrode assembly with a radius of 22 mm included in the cylindrical battery with a form factor of 4680, in which the segments of the first electrode are overlapped in the radial direction and in the circumferential direction to form a bending surface region, when the segments are bent from the outer circumference toward the core while being overlapped in the circumferential direction.

BEST MODE

Hereinafter, embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description provided herein are just examples for the purpose of illustrations only, not intended to limit the scope of the disclosure, so it should be understood that other equivalents and modifications could be made thereto without departing from the scope of the disclosure.

First, an electrode assembly according to an embodiment of the present disclosure will be described. The electrode assembly is a jelly-roll type electrode assembly in which a first electrode and a second electrode having a sheet shape and a separator interposed therebetween are wound based on one axis. However, the present disclosure is not limited to the specific type of the electrode assembly and thus the electrode assembly may have any rolled structure known in the art.

Preferably, at least one of the first electrode and the second electrode includes an uncoated portion not coated with an active material at a long side end in the winding direction. At least a part of the uncoated portion is used as an electrode tab by itself.

Figure 4:
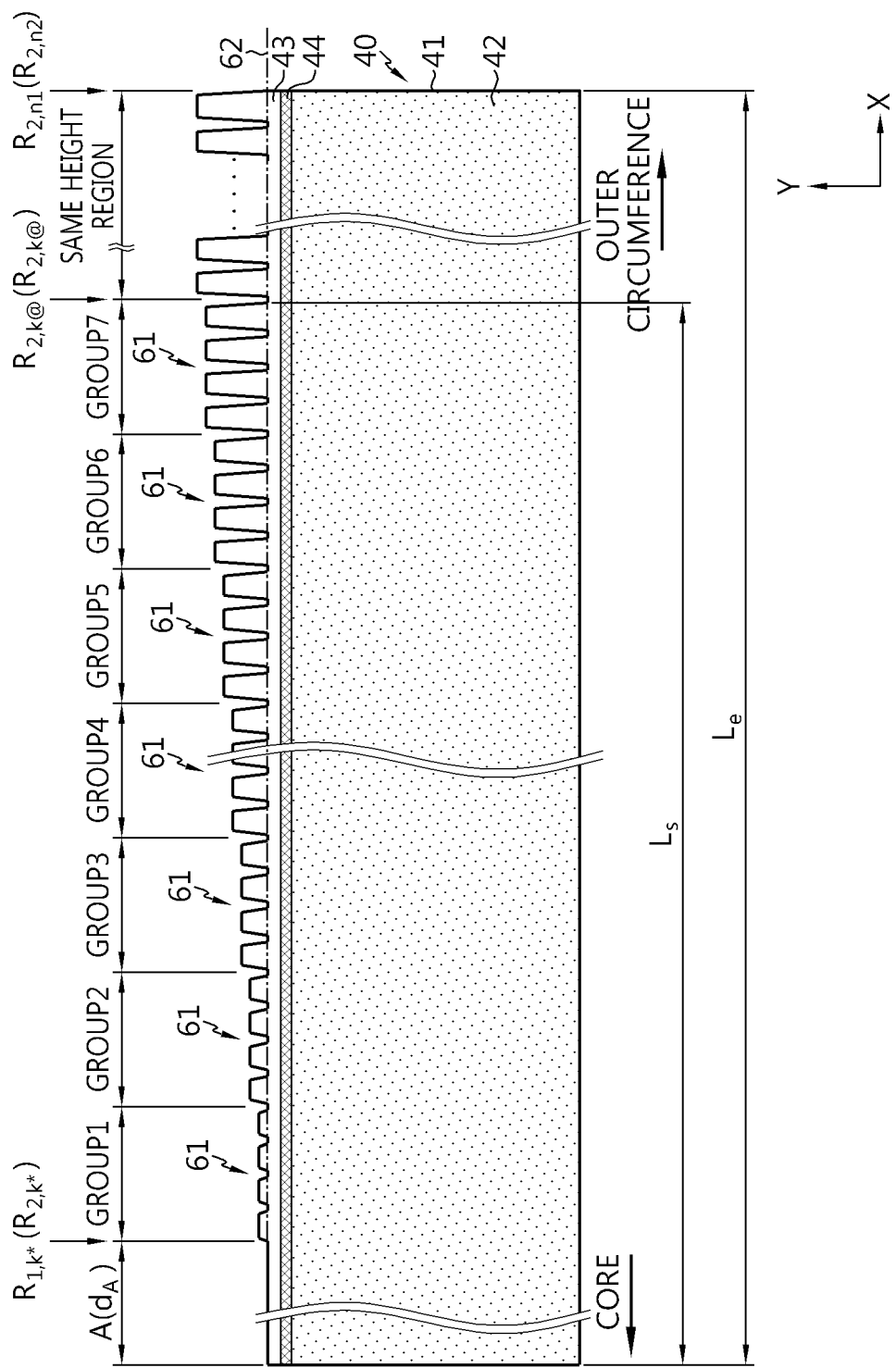
FIG. 4 is a plan view showing a structure of an electrode according to an embodiment of the present disclosure.

FIG. 4 is a plan view showing a structure of an electrode 40 according to an embodiment of the present disclosure.

Referring to FIG. 4, the electrode 40 includes a current collector 41 made of metal foil and an active material layer 42. The metal foil may be aluminum or copper, and is appropriately selected according to the polarity of the electrode 40. The active material layer 42 is formed on at least one surface of the current collector 41, and includes an uncoated portion 43 at the long side end in the winding direction X. The uncoated portion 43 is an area where the active material is not coated. An insulating coating layer 44 may be formed at a boundary between the active material layer 42 and the uncoated portion 43. The insulating coating layer 44 is formed such that at least a part thereof overlaps with the boundary between the active material layer 42 and the uncoated portion 43. The insulating coating layer 44 may include a polymer resin and may include an inorganic filler such as $Al_2O_3$. The region of the uncoated portion 43 in which the insulating coating layer 44 is formed also corresponds to the uncoated portion 43 because there is no active material layer 42.

Preferably, a bending part of the uncoated portion 43 of the electrode 40 may include a plurality of segments 61. The plurality of segments 61 may have a height increasing stepwise from the core toward the outer circumference. The region in which the height increases stepwise is the remaining region except for the uncoated portion adjacent to the core of the electrode assembly (a core-side uncoated portion A). Preferably, the core-side uncoated portion A has a relatively lower height than the other portions.

The segment 61 may be formed by laser notching. The segment 61 may be formed by a known metal foil cutting process such as ultrasonic cutting or punching.

When the electrode 40 is wound, each segment 61 may be bent in the radial direction of the electrode assembly, for example, toward the core, at a bending line 62. The core refers to the cavity at the winding center of the electrode assembly. Each segment 61 has a geometric shape using the bending line 62 as a base. In the geometric shape, the width of a lower portion thereof may be greater than the width of an upper portion thereof. Also, in the geometric shape, the width of the lower portion may increase gradually or stepwise toward the upper portion. Preferably, the geometric shape may have a trapezoidal shape.

In a modified example, the geometric shape may be formed by connecting one or more straight lines, one or more curves, or a combination thereof. In one example, the geometric shape may be a polygon such as a triangle, a rectangle, or a parallelogram. In another example, the geometric shape may have an arc shape such as a semicircle, semi-ellipse, or the like.

In order to prevent the active material layer 42 and/or insulating coating layer 44 from being damaged during bending of the segment 61, it may be preferable to provide a predetermined gap between the bottom (a portion indicated by D4 in FIG. 5) of the cut groove between the segments 61 and the active material layer 42. This is because stress is concentrated near the bottom of the cut groove when the uncoated portion 43 is bent. The gap may be 0.2 mm to 4 mm. If the gap is adjusted within the corresponding numerical range, it is possible to prevent the active material layer 42 and/or the insulating coating layer 44 from being damaged near the bottom of the cut groove by the stress generated during bending of the segment 61. In addition, the gap prevents the active material layer 42 and/or the insulating coating layer 44 from being damaged due to tolerances during notching or cutting of the segments 61.

The plurality of segments 61 may form a plurality of segment groups from the core to the outer circumference. The width, height and separation pitch of segments belonging to the same segment group may be substantially the same.

Figure 5:
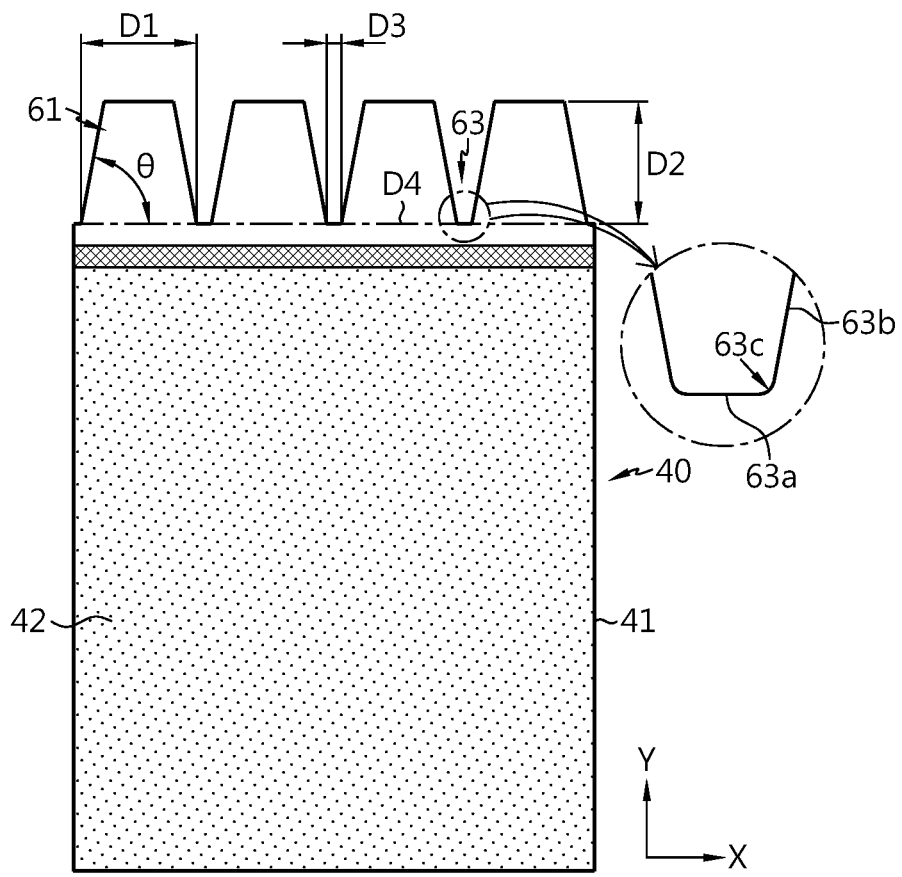
FIG. 5 is a diagram showing the definitions of width, height and separation pitch of a segment according to an embodiment of the present disclosure.

FIG. 5 is a diagram showing the definitions of width, height and separation pitch of the segment 61 according to an embodiment of the present disclosure.

Referring to FIG. 5, a cut groove 63 is formed between the segments 61. An edge of the lower portion of the cut groove 63 has a round shape. That is, the cut groove 63 includes a substantially flat bottom portion 63a and a round portion 63c. The round portion 63c connects the bottom portion 63a and the side 63b of the segment 61. In a modified example, the bottom portion 63a of the cut groove 63 may be replaced with an arc shape. In this case, the sides 63b of the segments 61 may be smoothly connected by the arc shape of the bottom portion 63a.

The curvature radius of the round portion 63c may be greater than 0 and less than or equal to 0.5 mm, more particularly, greater than 0 and less than or equal to 0.1 mm. The round portion 63c may have a curvature radius of 0.01 mm to 0.05 mm. When the curvature radius of the round portion 63c meets the above numerical range, it is possible to prevent cracks from occurring in the lower portion of the cut groove 63 while the electrode 40 is traveling in the winding process or the like.

The width (D1), height (D2) and separation pitch (D3) of the segment 61 are designed to prevent abnormal deformation of the uncoated portion 43 as much as possible while sufficiently increasing the number of stacked layers of the uncoated portion 43 in order to prevent the uncoated portion 43 from being torn during bending of the uncoated portion 43 and improve welding strength of the uncoated portion 43. Abnormal deformation means that the uncoated portion below the bending point does not maintain a straight state but sinks down to be deformed irregularly. The bending point may be a point spaced apart by 2 mm or less, preferably 1 mm or less, from the bottom of the cut groove 63 indicated by D4.

The width (D1) of the segment 61 is defined as a length between two points where two straight lines extending from both sides 63b of the segment 61 meet a straight line extending from the bottom portion 63a of the cut groove 63. The height of the segment 61 is defined as the shortest distance between the uppermost side of the segment 61 and a straight line extending from the bottom portion 63a of the cut groove 63. The separation pitch (D3) of the segment 61 is defined as a length between two points where a straight line extending from the bottom portion 63a of the cut groove 63 meets straight lines extending from two sidewalls 63b connected to the bottom portion 63a. When the side 63b and/or the bottom portion 63a is curved, the straight line may be replaced with a tangent line extending from the side 63b and/or the bottom portion 63a.

Preferably, the width (D1) of the segment 61 may be adjusted in the range of 1 mm to 11 mm. If D1 is less than 1 mm, a non-overlapping area or an empty space (gap) is generated, thereby not to sufficiently secure welding strength when the segment 61 is bent toward the core. Meanwhile, if D1 exceeds 11 mm, there is a possibility that the uncoated portion 43 near the bending point (D4) is torn due to stress when the segment 61 is bent. The bending point D4 may be spaced apart from the bottom portion 63a of the cut groove 63. The separation distance may be 2 mm or less, preferably 1 mm or less. Also, the height of the segment 61 may be adjusted in the range of 2 mm to 10 mm. If D2 is less than 2 mm, a non-overlapping area or an empty space (gap) may be generated, thereby not to sufficiently secure welding strength when the segment 61 is bent toward the core. Meanwhile, if D2 exceeds 10 mm, it is difficult to manufacture an electrode while uniformly maintaining the flatness of the uncoated portion in the winding direction X. That is, the over-height of the uncoated portion causes cambered surface in the uncoated portion. In addition, the separation pitch (D3) of the segment 61 may be adjusted in the range of 0.05 mm to 1 mm. If D3 is less than 0.05 mm, a crack may occur at the uncoated portion 43 near the bottom of the cut groove 63 due to stress when the electrode 40 travels in the winding process or the like. Meanwhile, if D3 exceeds 1 mm, a non-overlapping area where the segments 61 do not overlap each other or an empty space (gap) may be generated, thereby not to sufficiently secure welding strength when the segment 61 is bent.

Meanwhile, when the current collector 41 of the electrode 40 is made of aluminum, it is preferable to set the separation pitch D3 as 0.5 mm or more. When D3 is 0.5 mm or more, cracks may be prevented from occurring in the lower portion of the cut groove 63 even if the electrode 40 travels at a speed of 100 mm/sec or more under a tension of 300 gf or more in the winding process or the like.

According to the experimental results, when the current collector 41 of the electrode 40 is an aluminum foil with a thickness of 15 μm and D3 is 0.5 mm or more, cracks do not occur in the lower portion of the cut groove 63 when the electrode 40 travels under the above traveling conditions.

Referring to FIG. 4 again, the width ($d_A$) of the core-side uncoated portion A is designed by applying a condition that it does not cover the core of the electrode assembly by 90% or more when the segments 61 are bent toward the core.

In one example, the width ($d_A$) of the core-side uncoated portion A may increase in proportion to the bending length of the segment 61 of Group 1. The bending length corresponds to the height of the segment 61 based on the bending point 62 (FIG. 4).

In a specific example, when the electrode 40 is used to manufacture an electrode assembly of a cylindrical battery having a form factor of 4680, the width ($d_A$) of the core-side uncoated portion A may be set to 180 mm to 350 mm according to the diameter of the core of the electrode assembly.

The ratio $d_A/L_e$ of the width ($d_A$) of the core-side uncoated portion (A) to the long side length ($L_e$) of the electrode 40 may be 1% to 30%. In a large-size cylindrical battery with a diameter of 46 mm, the length of the electrode 40 is quite long from 3000 mm to 5000 mm, so the core-side uncoated portion (A) may be designed long enough. In cylindrical batteries with a form factor of 1865 or 2170, the electrode length is in the range of 600 mm to 1200 mm. In a typical cylindrical battery, it is difficult to design the ratio $d_A/L_e$ within the above numerical range.

In an embodiment, the width of each segment group may be designed to constitute the same winding turn of the electrode assembly.

In another embodiment, the width of each segment group may be designed to constitute a plurality of winding turns of the electrode assembly.

In one modification, the width and/or height and/or separation pitch of the segment 61 belonging to the same segment group may be increased or decreased gradually and/or stepwise and/or irregularly within the group or between the groups.

Groups 1 to 7 are only an example of segment groups. The number of groups and the number of segments 61 included in each group may be adjusted to disperse stress as much as possible during the bending process of the uncoated portion 43, to sufficiently secure the welding strength, to minimize the gap between the sides 63b of the segments 61, and to allow the segments 61 to be overlapped into multiple layers along the radial direction of the electrode assembly without interfering with each other.

In one modification, segments of some groups may be removed. In this case, the uncoated portion in a region from which the segments are removed may be the same height as the core-side uncoated portion A.

The electrode 40 may be divided into a height variable region in which the height of the segment 61 changes along the long side direction and a height uniform region in which the height of the segment 61 is uniform.

In the electrode 40, the height variable region is a region corresponding to Groups 1 to 7, and the height uniform region is a region located near the outer circumference rather than Group 7.

In a specific example, the width ($d_A$) of the core-side uncoated portion A may be 180 mm to 350 mm. The width of Group 1 may be 35% to 55% of the width of the core-side uncoated portion A. The width of Group 2 may be 120% to 150% of the width of Group 1. The width of Group 3 may be 110% to 135% of the width of Group 2. The width of group 4 may be 75% to 90% of the width of group 3. The width of Group 5 may be 120% to 150% of the width of Group 4. The width of Group 6 may be 100% to 120% of the width of Group 5. The width of Group 7 may be 90% to 120% of the width of Group 6.

The reason that the widths of Groups 1 to 7 do not show a constant increase or decrease pattern is that the segment width gradually increases from Group 1 to Group 7, but the number of segments included in the group is limited to an integer number and the thickness of the electrode 40 has a deviation along a winding direction X. Accordingly, the number of segments may be reduced in a specific segment group. Therefore, the widths of the groups may show an irregular change pattern as in the above example from the core to the outer circumference.

Assuming that the width in the winding direction for each of the three segment groups consecutively adjacent to each other in the circumferential direction of the electrode assembly is W1, W2, and W3, respectively, it is possible to include a combination of segment groups in which W3/W2 is smaller than W2/W1.

In the specific example, Groups 4 to 6 corresponds to this. The width ratio of Group 5 to Group 4 is 120% to 150%, and the width ratio of Group 6 to Group 5 is 100% to 120%, which is smaller than 120% to 150%.

Preferably, in the plurality of segments 61, the lower internal angle (θ) may increase from the core to the outer circumference. The lower internal angle (θ) corresponds to an angle between the straight line passing through the bending line 62 (FIG. 4) and the straight line (or, the tangent line) extending from the side 63b of the segment 61. When the segment 61 is asymmetrical in the left and right direction, the left internal angle and the right internal angle may be different from each other.

As the radius of the electrode assembly increases, the radius of curvature increases. If the lower internal angle ($\theta$) of the segment 61 increases as the radius of the electrode assembly increases, the stress generated in the radial and circumferential directions when the segment 61 is bent may be relieved. In addition, when the lower internal angle ($\theta$) is increased, when the segment 61 is bent, the area overlapping with the segment 61 at an inner side and the number of stacked layers of the segment 61 also increase, thereby securing uniform welding strength in the radial and circumferential directions and making the bending surface region flat.

Preferably, if the angle of the lower internal angle ($\theta$) is adjusted as the radius of the electrode assembly increases, when the segments 61 are bent, the segments 61 may be overlapped in the circumferential direction as well as in the radial direction of the electrode assembly.

FIG. 6 shows an example in which the sides of the segments 61 bent toward the core of the electrode assembly are spaced apart in parallel in an arbitrary winding turn with a radius of r based on the core center and an example in which the sides of the bent segments 61 intersect each other.

Referring to FIG. 6, a pair of segments 61 adjacent to each other are disposed in a winding turn having a radius of r with respect to the core center O of the electrode assembly. The width and height of the adjacent segments 61 are substantially the same.

In (a) of FIG. 6, the lower internal angle $\theta_{assumption}$ is an angle in the assumption that the sides of the segment 61 are substantially parallel. The lower internal angle $\theta_{assumption}$ is an angle that can be uniquely determined by the arc length $L_{arc}$ corresponding to the lower portion of the segment 61. Meanwhile, $\theta_{real}$ is an actual lower internal angle when the sides of the adjacent segments 61 intersect each other.

Preferably, when the lower internal angles $\theta_{assumption}$ and $\theta_{real}$ satisfy Formula 1 below, the segments 61 disposed in the winding turn located at the radius of r with respect to the core center O may overlap with each other in the circumferential direction.

$$\theta_{real} > \theta_{assumption}$$

$$\theta_{assumption} = 90° - 360° * (L_{arc}/2\pi r) * 0.5$$

$$\theta_{real} > 90° - 360° * (L_{arc}/2\pi r) * 0.5 \qquad \text{<Formula 1>}$$

Here, r is a radius of the winding turn where the segment 61 is disposed based on the core center of the electrode assembly.

$L_{arc}$ is a length of the arc (solid line) corresponding to the lower portion (dotted line) of the segment in a circle with a radius of r, and is uniquely determined from the width (D1) of the segment 61.

'$360° * (L_{arc}/2\pi r)$' is a circumferential angle $\alpha$ of the lower portion (dotted line) of the segment 61.

'$360° * (L_{arc}/2\pi r) * 0.5$' is an angle between the line segment OB and the line segment OA in the right triangle OAB.

'$90° - 360° * (L_{arc}/2\pi r) * 0.5$' is an angle between the line segment OA and the line segment AB in the right triangle OAB, which approximately corresponds to the lower internal angle ($\theta_{assumption}$) of the segment 61.

Preferably, the circumferential angle $\alpha$ of $L_{arc}$ at any winding turn radius r may be less than or equal to 45°. If the circumferential angle $\alpha$ exceeds 45°, the segment 61 is not bent easily. Therefore, at any radius r, $L_{arc}$ is greater than 1 mm, which is the lower limit of D1, and has a length of $(45/360) * (2\pi r)$ or less.

The circumferential angle $\alpha$ may vary depending on a radius (r) of a winding turn at which the segment 61 is located. In one aspect, the circumferential angle $\alpha$ of the segment 61 may increase gradually or stepwise along a radial direction of the electrode assembly within the above numerical range, or vice versa. In other aspect, the circumferential angle $\alpha$ of the segment 61 may increase gradually or stepwise and then decreases gradually or stepwise along a radial direction of the electrode assembly within the above numerical range, or vice versa. In another aspect, the circumferential angle $\alpha$ of the segment 61 may be substantially the same along a radial direction of the electrode assembly within the above numerical range.

Preferably, when a width of each of the plurality of segments 61 varies along a winding direction, the circumferential angle $\alpha$ may be in the range of 45 degrees or less and the width of each of the plurality of segments 61 may be in the range of 1 mm to 11 mm.

In one example, when r is 20 mm and the circumferential angle $\alpha$ is 30°, $L_{arc}$ is 10.5 mm and $\theta_{assumption}$ is about 75 degrees. As another example, if r is 25 mm and the circumferential angle $\alpha$ is 25°, $L_{arc}$ is 10.9 mm and $\theta_{assumption}$ is about 77.5 degrees.

Preferably, at any winding turn radius r, ($\theta_{real}/\theta_{assumption} - 1$) may be defined as an overlapping ratio of the segment 61 in the circumferential direction. The overlapping ratio of the segment 61 may be greater than 0 and equal to or less than 0.05. $\theta_{assumption}$ is the angle uniquely determined by the arc $L_{arc}$ at the winding turn radius r. If the overlapping ratio of the segment 61 is greater than 0.05, when the segments 61 are bent, the sides of the segments 61 may interfere with each other, and thus the segments 61 may not be bent easily.

The degree of overlapping of the segments 61 increases in proportion to the overlapping ratio. If the segments 61 overlap with each other along the circumferential direction of the winding turn, the number of stacked layers of the segments 61 may be further increased when the segments 61 are bent. Embodiments for this will be described later.

Preferably, when the electrode 40 is used to manufacture an electrode assembly of a cylindrical battery having a form factor of 4680, the radius of the core is 4 mm, and the height of the segment closest to the core is 3 mm, when the radius of the electrode assembly increases from 7 mm to 22 mm, the lower internal angle of the segments 61 may increase stepwise in the range of 60° to 85°.

The radius range and the lower internal angle range may be determined from the form factor and the design specifications about the diameter of the core, the height of the segment closest to the core, the width (D1) of the segment 61, and the overlapping ratio.

Meanwhile, the overlapping condition of the segments may be changed as follows. That is, when a virtual circle passing through a pair of segments 61 adjacent to each other based on the core center O of the electrode assembly 40 is drawn as shown in (b) of FIG., if an arc $e_1$-$e_2$ and an arc $e_3$-$e_4$ passing through each segment overlap with each other 61, the pair of adjacent segments may overlap with each other. The overlapping ratio of the segment 61 may be defined as a maximum value for a ratio of the length of the overlapping arc $e_2$-$e_3$ to the length of the arc $e_1$-$e_2$ (or, $e_3$-$e_4$) when a plurality of virtual circles with different radii are drawn. The overlapping ratio of the segment 61 may be greater than 0 and equal to or less than 0.05.

The shapes of the segments 60 may be changed differently depending locations. In one example, a round shape (e.g., semicircle, semi-ellipse, etc.) that is advantageous for stress distribution is applied to a region where the stress is concentrated, and a polygonal shape (e.g., a rectangle, trapezoid, parallelogram, etc.) with the largest area may be applied a region where the stress is relatively low.

The segment structure may also be applied to the core-side uncoated portion A. However, if the segment structure is applied to the core-side uncoated portion A, when the segments are bent according to the radius of curvature of the core, the end of the core-side uncoated portion A may be bent toward the outer circumference, which is called reverse forming. Therefore, the core-side uncoated portion A has no segment, or even if the segment structure is applied to the core-side uncoated portion A, it is desirable to control the width and/or height and/or separation pitch of the segments 61 in consideration of the radius of curvature of the core such that reverse forming does not occur.

The electrode structure of the above embodiments (modifications) may be applied to the first electrode and/or the second electrode having different polarities included in the jelly-roll type electrode assembly. In addition, when the electrode structure of the above embodiments (modifications) is applied to any one of the first electrode and the second electrode, the conventional electrode structure may be applied to the other one. In addition, the electrode structures applied to the first electrode and the second electrode may not be identical but be different from each other.

Figure 1:
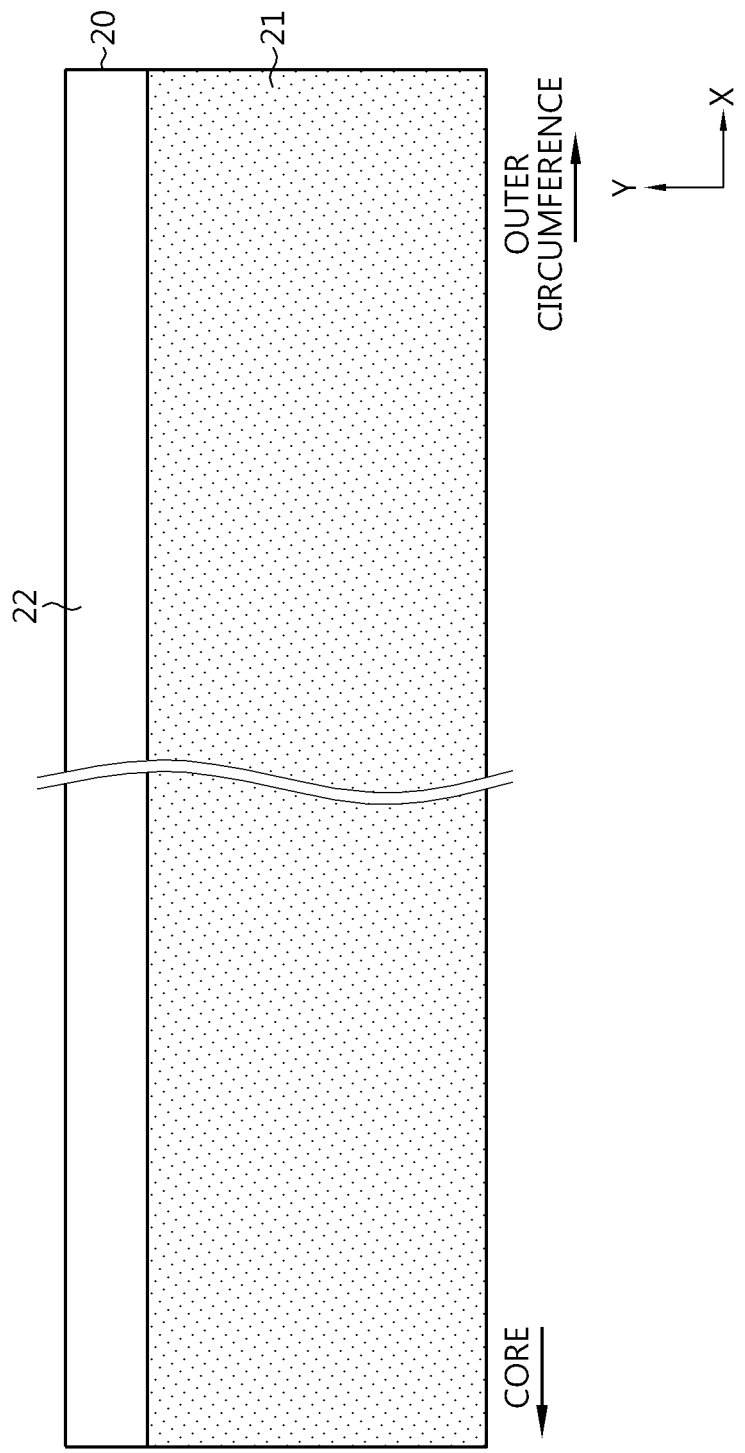
FIG. 1 is a plan view showing a structure of an electrode used for manufacturing a conventional tab-less cylindrical battery.

For example, when the first electrode and the second electrode are a positive electrode and a negative electrode, respectively, any one of the above embodiments (modifications) may be applied to the first electrode and the conventional electrode structure (see FIG. 1) may be applied to the second electrode.

As another example, when the first electrode and the second electrode are a positive electrode and a negative electrode, respectively, any one of the above embodiments (modifications) may be selectively applied to the first electrode and any one of the above embodiments (modifications) may be selectively applied to the second electrode.

In the present disclosure, a positive electrode active material coated on the positive electrode and a negative electrode active material coated on the negative electrode may employ any active material known in the art without limitation.

In one example, the positive electrode active material may include an alkali metal compound expressed by a general formula $A[A_xM_y]O_{2+z}$ (A includes at least one element among Li, Na and K; M includes at least one element selected from is Ni, Co, Mn, Ca, Mg, Al, Ti, Si, Fe, Mo, V, Zr, Zn, Cu, Al, Mo, Sc, Zr, Ru, and Cr; $x \geq 0$, $1 \leq x+y \leq 2$, $-0.1 \leq z \leq 2$; and the stoichiometric coefficients x, y and z are selected so that the compound maintains electrical neutrality).

In another example, the positive electrode active material may be an alkali metal compound $xLiM^1O_2-(1-x)Li_2M^2O_3$ disclosed in U.S. Pat. Nos. 6,677,082, 6,680,143, et al., wherein $M^1$ includes at least one element having an average oxidation state 3; $M^2$ includes at least one element having an average oxidation state 4; and $0 \leq x \leq 1$).

In still another example, the positive electrode active material may be lithium metal phosphate expressed by a general formula $Li_aM^1_xFe_{1-x}M^2_yP_{1-y}M^3_zO_{4-z}$ ($M^1$ includes at least one element selected from the Ti, Si, Mn, Co, Fe, V, Cr, Mo, Ni, Nd, Al, Mg and Al; $M^2$ includes at least one element selected from Ti, Si, Mn, Co, Fe, V, Cr, Mo, Ni, Nd, Al, Mg, Al, As, Sb, Si, Ge, V and S; $M^3$ includes a halogen element optionally including F; $0<a\leq 2$, $0 \leq x \leq 1$, $0 \leq y < 1$, $0 \leq z < 1$; the stoichiometric coefficient a, x, y and z are selected so that the compound maintains electrical neutrality), or $Li_3M_2(PO_4)_3$ (M includes at least one element selected from Ti, Si, Mn, Fe, Co, V, Cr, Mo, Ni, Al, Mg and Al).

Preferably, the positive electrode active material may include primary particles and/or secondary particles in which the primary particles are aggregated.

In one example, the negative electrode active material may employ carbon material, lithium metal or lithium metal compound, silicon or silicon compound, tin or tin compound, or the like. Metal oxides such as $TiO_2$ and $SnO_2$ with a potential of less than 2V may also be used as the negative electrode active material. As the carbon material, low-crystalline carbon, high-crystalline carbon or the like may be used.

The separator may employ a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, or the like, or laminates thereof. As another example, the separator may employ a common porous nonwoven fabric, for example, a nonwoven fabric made of high melting point glass fiber, polyethylene terephthalate fiber, or the like.

A coating layer of inorganic particles may be included in at least one surface of the separator. It is also possible that the separator itself is made of a coating layer of inorganic particles. Particles in the coating layer may be coupled with a binder so that an interstitial volume exists between adjacent particles.

The inorganic particles may be made of an inorganic material having a dielectric constant of 5 or more. As a non-limiting example, the inorganic particles may include at least one material selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO and $Y_2O_3$.

The electrode assembly according to the embodiment is a jelly-roll type electrode assembly 80 in which the electrode 40 of the embodiment is applied to a first electrode (positive electrode) and a second electrode (negative electrode). However, the present disclosure is not limited to specific kind of the electrode assembly.

Figure 7A:
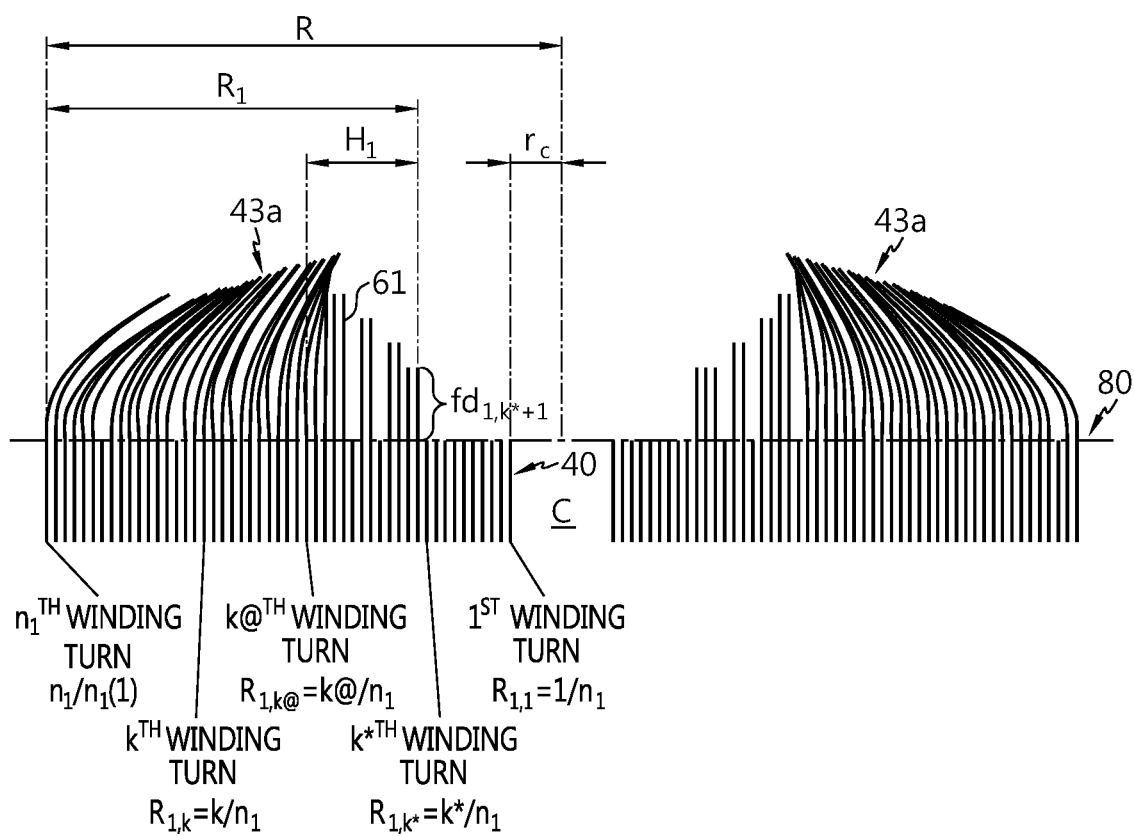
FIGS. 7a and 7b are diagrams showing an upper cross-sectional structure and a lower cross-sectional structure of an electrode assembly before the bent structure of an uncoated portion is formed according to an embodiment of the present disclosure, respectively.
Figure 7B:
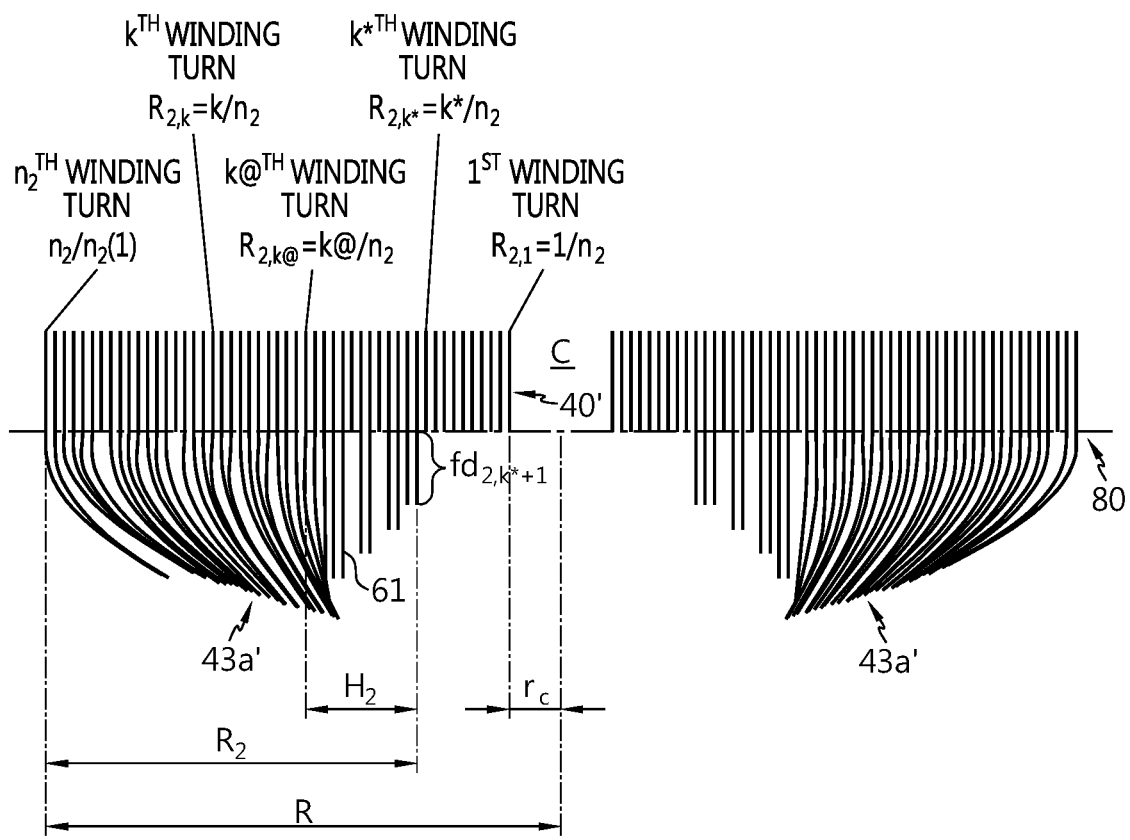
Figure 8A:
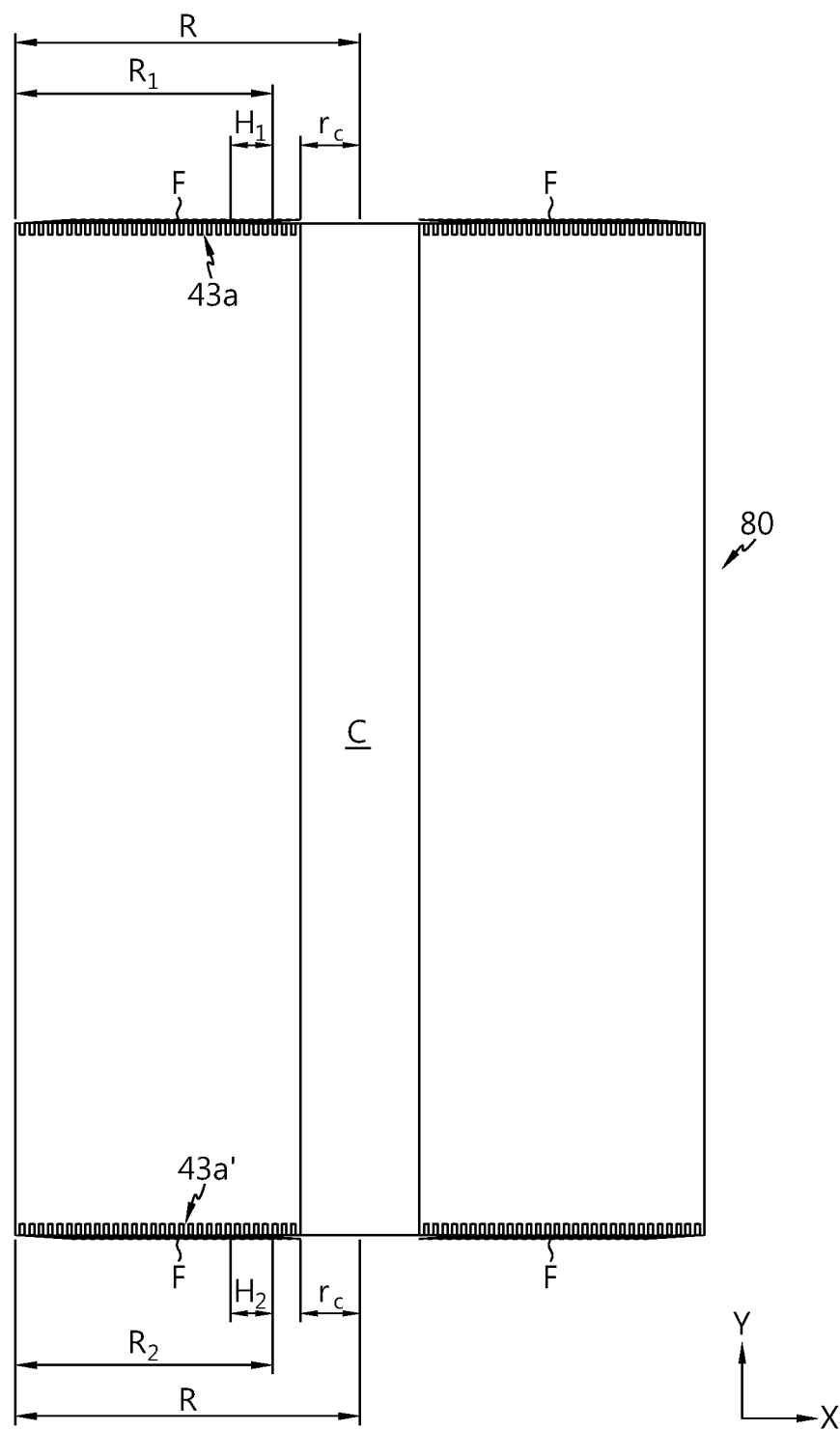
FIGS. 8a and 8b are sectional view and a perspective view showing an electrode assembly in which the uncoated portion is bent to form a bending surface region according to an embodiment of the present disclosure, respectively.
Figure 8B:
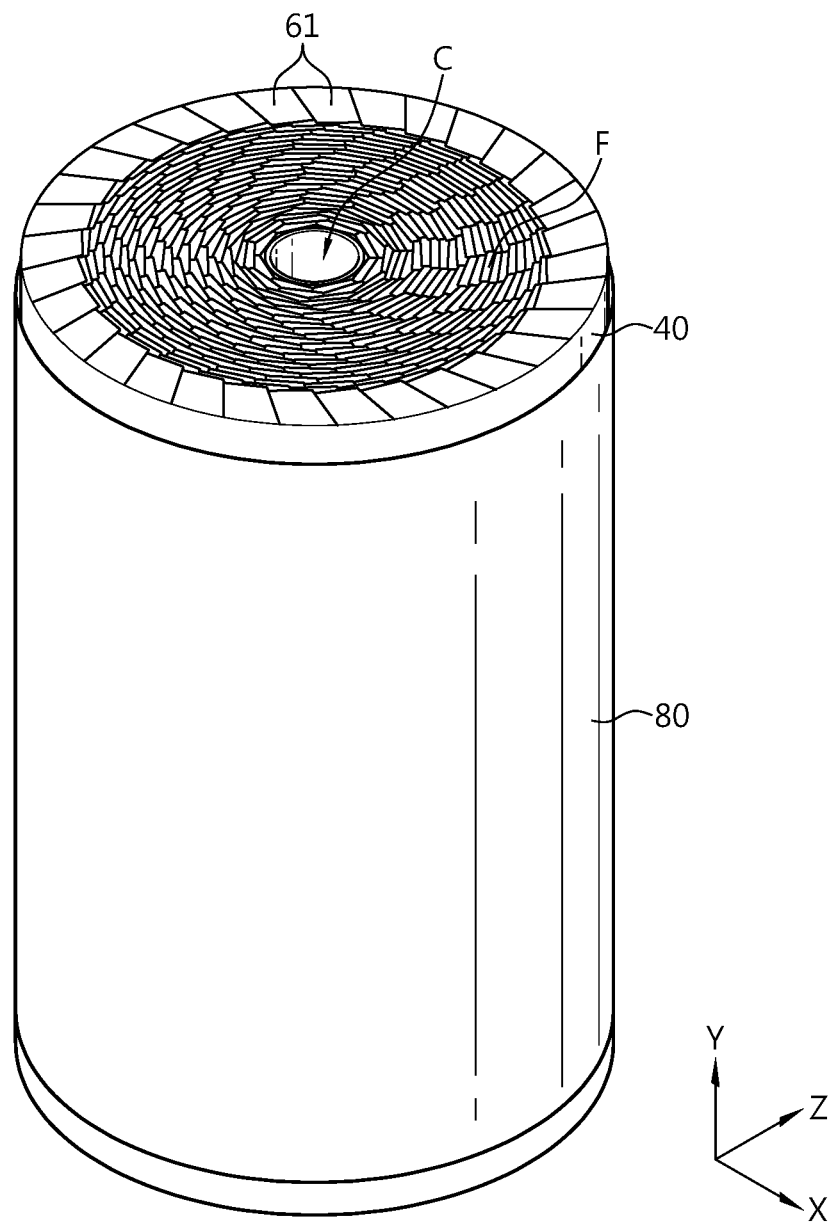

FIGS. 7a and 7b are drawings showing an upper cross-sectional structure and a lower cross-sectional structure of the electrode assembly 80 before the bending structures of the uncoated portions 43a, 43a' are formed according to an embodiment of the present disclosure, respectively. In addition, FIGS. 8a and 8b are a cross-sectional view and a perspective view showing the electrode assembly 80 in which the bending surface region F is formed while the uncoated portions 43a, 43a' are bent according to an embodiment of the present disclosure, respectively.

Figure 2:
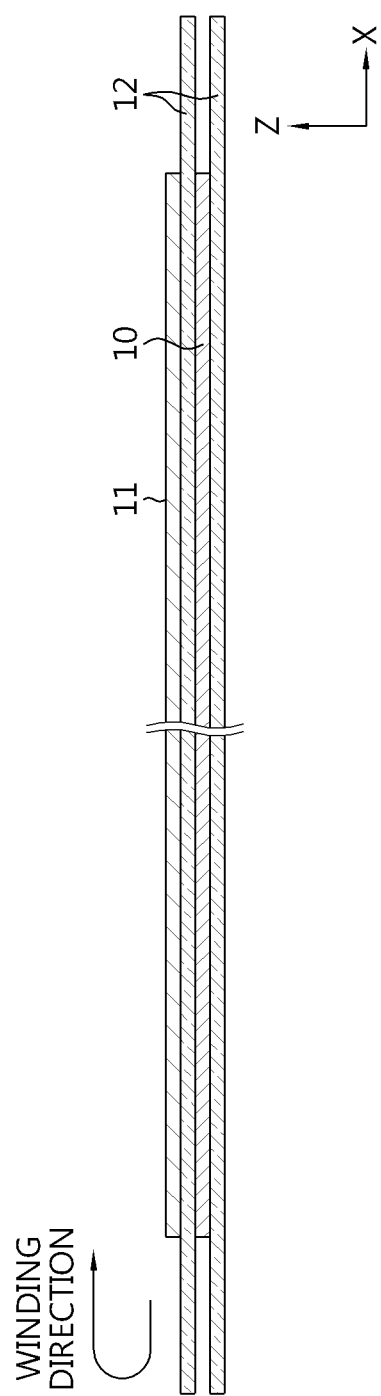
FIG. 2 is a diagram showing an electrode winding process of the conventional tab-less cylindrical battery.
Figure 3:
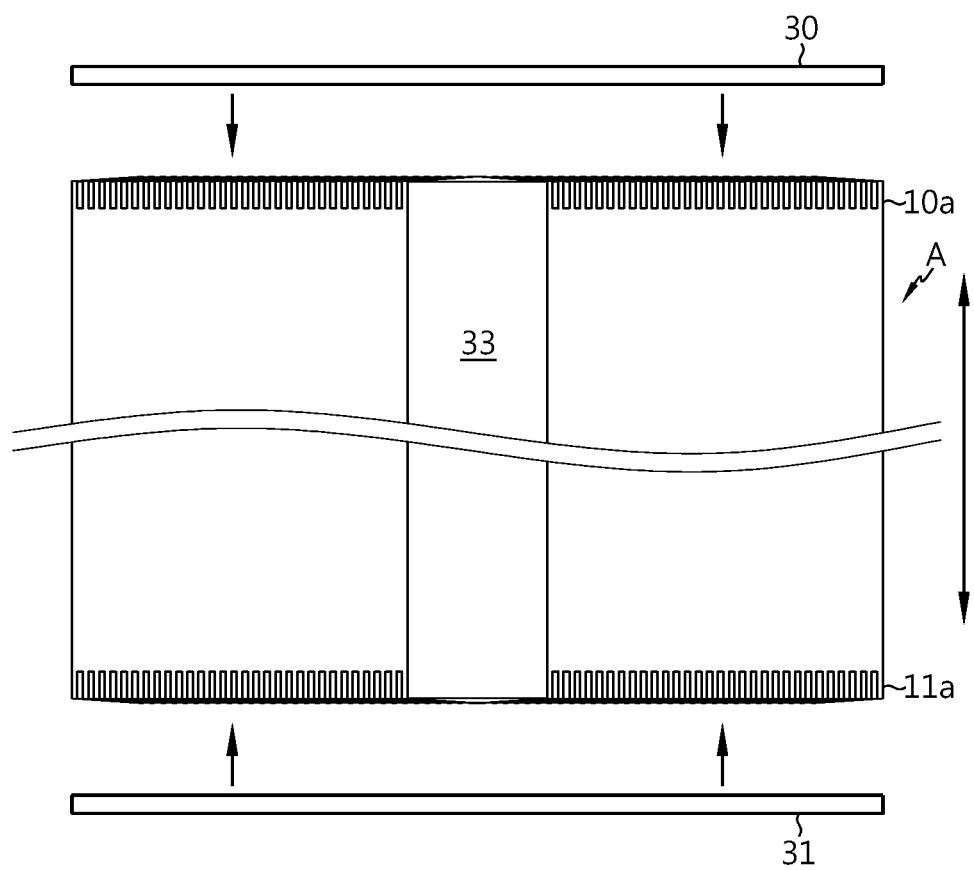
FIG. 3 is a diagram showing a process of welding a current collector to a bending surface region of an uncoated portion in the conventional tab-less cylindrical battery.

The electrode assembly 80 may be manufactured by the winding method described with reference to FIG. 2. For convenience of description, the protruding structures of the uncoated portions 43a, 43a' extending out of the separator are illustrated in detail, and the winding structure of the separator is not depicted. The uncoated portion 43a of the electrode assembly 80 protruding upward extends from the first electrode 40. The uncoated portion 43a' of the electrode assembly 80 protruding downward extends from the second electrode 40'. The end of the separator is marked by a dotted line.

The patterns in which the heights of the uncoated portions 43a, 43a' change are schematically illustrated. That is, the heights of the uncoated portions 43a, 43a' may vary irregularly depending on the position at which the cross-section is cut. For example, when the sides of the segments 61 having a trapezoidal shape are cut, the height of the uncoated portion in the cross section is lower than the height (D2 in FIG. 4) of the segments 61. In addition, the uncoated portions 43a, 43a' are not shown at the point where the cut groove 63 (FIG. 5) is cut.

Hereinafter, the structural features of the uncoated portion 43a of the first electrode 40 will be described in detail with reference to the drawings. Preferably, the uncoated portion 43a' of the second electrode 40' may also have substantially the same characteristics as the uncoated portion 43a of the first electrode 40'.

Referring to FIGS. 7a, 7b, 8a and 8b, the uncoated portions 43a, 43a' of the first electrode 40 and the second electrode 40' are bent in the radial direction to form a bending surface region F.

In the winding structure of the first electrode 40, assuming that the number of total winding turns of the first electrode 40 is $n_1$, when a value obtained by dividing a winding turn index k (a natural number of 1 to $n_1$) of a $k^{th}$ winding turn by the number of total winding turns $n_1$ is defined as a relative radial position $R_{1,k}$ of the $k^{th}$ winding turn, a radial length of the relative radial position $R_{1,k}$ region (e.g., a region from $R_{1,k^*+1}$ to $R_{1,K}$) where the number of stacked layers of the uncoated portion 43a is 10 or more is 30% or more compared to the radial length (e.g., $R_1$) of winding turns including the segments.

For reference, the relative radial position of the $1^{st}$ winding turn is $1/n_1$ because the winding turn index is 1. The relative radial position of the $k^{th}$ winding turn is $k/n_1$. The relative radial position of the last $n_1^{th}$ winding turn is 1. That is, the relative radial position increases from $1/n_1$ to 1 from the core of the electrode assembly 80 to the outer circumference thereof.

In the winding structure of the second electrode 40', assuming that the number of total winding turns of the second electrode 40' is $n_2$, when a value obtained by dividing a winding turn index k (a natural number of 1 to $n_2$) at a $k^{th}$ winding turn location by the number of total winding turns $n_2$ is defined as a relative radial position $R_{2,k}$ of the $k^{th}$ winding turn, a radial length of the relative radial position $R_{2,k}$ region where the number of stacked layers of the uncoated portion is 10 or more is 30% or more compared to the radial length of winding turns in which the segments are disposed.

For reference, the relative radial position of the $1^{st}$ winding turn is $1/n_2$ because the winding turn index is 1. The relative radial position of the $k^{th}$ winding turn is $k/n_2$. The relative radial position of the last $n_2^{th}$ winding turn is 1. That is, the relative radial position increases from $1/n_2$ to 1 from the core of the electrode assembly 80 to the outer circumference thereof.

Preferably, the winding turn indexes k of the first electrode 40 and the second electrode 40' should be understood as variables to which different values can be assigned.

When the uncoated portions 43a, 43a' are bent in the radial direction, the bending surface regions F are formed on the upper and lower portions of the electrode assembly 80 as shown in FIGS. 8a and 8b.

Referring to FIGS. 8a and 8b, a plurality of segments 61 are overlapped into multiple layers along the radial direction while being bent toward the core C of the electrode assembly 80.

The number of stacked layers of the segments 61 may be defined as the number of segments 61 that intersect an imaginary line when the imaginary line is drawn in the winding axis direction (Y) at any radial point on the bending surface region F.

Preferably, the number of stacked layers of the segments 61 may be 10 or more in a radius region of at least 30% based on the radial length ($R_1$) of the winding turns including the segments 61 in order to sufficiently increase the welding strength between the bending surface region F and the current collector and to prevent the separator and the active material layer from being damaged during the welding process.

The current collector may be laser-welded to the bending surface region F of the uncoated portion 43a, 43a'. Alternatively, other known welding techniques such as resistance welding may be used. When laser welding is applied, it is desirable to increase the laser power to sufficiently secure the welding strength. If the laser power is increased, the laser may penetrate through the overlapping regions of the uncoated portions 43a, 43a' into the electrode assembly 80, which may damage the separator and the active material layer. Therefore, in order to prevent laser penetration, it is preferable to increase the number of stacked layers of the uncoated portions 43a, 43a' in the welding region to a certain level or more. In order to increase the number of stacked layers of the uncoated portions 43a, 43a', the height of the segments 61 should be increased. However, if the height of the segments 61 is increased, the uncoated portions 43a, 43a' may be cambered during the manufacturing process of the electrode 40. Therefore, it is desirable to adjust the height of the segments 61 to an appropriate level, such as 2 mm to 10 mm.

If the radius region where the number of stacked layers of the segments 61 is 10 or more is designed to be FIG. 7 compared to $R_1$ in the bending surface region F and the region where the segments 61 are overlapped into 10 or more layers is laser-welded to the current collector, even though the power of laser is increased, the overlapping portion of the uncoated portion sufficiently masks the laser to prevent the separator and the active material layer from being damaged by the laser. In addition, since the number of stacked layers of the segments 61 is large in the area where laser is irradiated, welding beads are formed with sufficient volume and thickness. Accordingly, the welding strength may be sufficiently secured and the resistance of the welding interface may also be lowered.

When welding the current collector, the laser power may be determined by a desired welding strength between the bending surface region F and the current collector. The welding strength increases in proportion to the number of stacked layers of the uncoated portions 43a, 43a'. This is because as the number of stacked layers of the uncoated portions 43a, 43a' increases, the volume of the weld beads formed by the laser increases.

The welding strength may be 2 $kgf/cm^2$ or more, more particularly, 4 $kgf/cm^2$ or more. If the welding strength satisfies the above numerical range, even if severe vibration is applied to the electrode assembly 80 along the winding axis direction and/or the radial direction, the properties of the welding interface do not deteriorate, and the volume of the welding beads is sufficient to reduce the resistance of the welding interface. The power of the laser for realizing the above welding strength condition varies depending on the laser equipment, and may be appropriately adjusted in the range of 250 W to 320 W, or in the range of 40% to 100% of the maximum laser power specification.

The welding strength may be defined as a tensile force per unit area (kgf/cm²) of the current collector when the current collector starts to separate from the bending surface region F. Specifically, after the current collector is completely welded, a tensile force is applied to the current collector, but the magnitude of the tensile force is gradually increased. As the tensile force is increased, the uncoated portions 43a, 43a' begin to separate from the welding interface. At this time, the value obtained by dividing the tensile force applied to the current collector by the area of the current collector is the welding strength.

Preferably, the first electrode 40 may include a current collector (foil) 41 and an active material coating layer 42 formed on at least one surface of the current collector 41. Here, the current collector 41 may have a thickness of 10 μm to 25 μm, and an interval between winding turns adjacent in a radial direction of the electrode assembly 80 may be 200 μm to 500 μm. The current collector 41 may be made of aluminum.

The second electrode 40' may include a current collector (foil) and an active material coating layer formed on at least one surface of the current collector. Here, the current collector may have a thickness of 5 μm to 20 μm, and an interval between winding turns adjacent in the radial direction of the electrode assembly 80 may be 200 μm to 500 μm. The current collector may be made of copper.

Referring to FIGS. 4, 7a and 7b, in the winding structure of the first electrode 40, the uncoated portion of the region from the relative radial position $R_{1,1}$ of the first electrode 40 to a preset first relative radial position $R_{1,k*}$ may have a smaller height than the uncoated portion of the region from a relative radial position $R_{1,k*+1}$ of a $k*+1^{th}$ winding turn to a relative radial position 1. The height of the uncoated portion of the region from the relative radial position $R_{1,1}$ to the preset first relative radial position $R_{1,k*}$ corresponds to the height of the uncoated portion of the core-side uncoated portion A (see FIG. 4).

Preferably, in the winding structure of the first electrode 40, the uncoated portion of the region from the relative radial position $R_{1,1}$ to the first relative radial position $R_{1,k*}$ may have a smaller height than the bending surface region F formed by overlapping the bent uncoated portions.

Preferably, in the winding structure of the first electrode 40, the uncoated portion of the region from the relative radial position $R_{1,1}$ to the first relative radial position $R_{1,k*}$ may not be bent toward the core of the electrode assembly 80.

Similar to the first electrode 40, in the winding structure of the second electrode 40', the uncoated portion of the region from the relative radial position $R_{2,1}$ to the preset first relative radial position $R_{2,k*}$ may have a smaller height than the uncoated portion of the region from the relative radial position $R_{2,k*+1}$ of the $k*+1^{th}$ winding turn to the relative radial position 1.

In addition, in the region from the relative radial position $R_{2,1}$ to the preset first relative radial position $R_{2,k*}$, the uncoated portion may have a smaller height than the bending surface region F formed by overlapping the bent uncoated portions.

Preferably, the uncoated portion of the region from the relative radial position $R_{2,1}$ to the first relative radial position $R_{2,k*}$ may not be bent towards the core of the electrode assembly.

Preferably, in the winding structure of the second electrode 40', the uncoated portion of the region from the relative radial position $R_{2,1}$ to the first relative radial position $R_{2,k*}$ may have a smaller height than the uncoated portion of the region from the relative radial position $R_{2,k*+1}$ to the relative radial position 1 and may not be bent toward the core.

In the winding structure of the first electrode 40, the bending length $fd_{1,k*+1}$ of the uncoated portion of the relative radial position $R_{1,k*+1}$ may be shorter than the radial length from the relative radial position $R_{1,1}$ to the relative radial position $R_{1,k*}$. Therefore, the core C of the electrode assembly 80 may not be blocked by the bending part of the uncoated portion 43a located in the region from the relative radial position $R_{1,k*+1}$ to the relative radial position 1.

Alternatively, the core C of the electrode assembly 80 may not be blocked by the bent portion of the uncoated portion 43a located in the region from the relative radial position $R_{1,k*+1}$ to the relative radial position 1 by 90% or more based on its radius ($r_c$) thereof. That is, a radial region of the core C corresponding to at least 0 to 0.9 $r_c$ may not be blocked by the bent portion of the uncoated portion 43a.

Preferably, the bending length $fd_{1,k*+1}$ of the uncoated portion 43a located at the relative radial position $R_{1,k*+1}$, the radius ($r_c$) of the core, and the distance ($d_{1,k*+1}$) from the center of the core C to the relative radial position $R_{1,k*+1}$ may satisfy Formula 2 below.

$$fd_{1,k*+1} + 0.9 * r_c \leq d_{1,k*+1} \qquad \text{<Formula 2>}$$

Preferably, in the winding structure of the second electrode 40', the uncoated portion of the region from the relative radial position $R_{2,1}$ to the first relative radial position $R_{2,k*}$ may have a smaller height than the uncoated portion of the region from the relative radial position $R_{2,k*+1}$ to the relative radial position 1 and may not be bent toward the core.

In the winding structure of the second electrode 40', the bending length $fd_{2,k*+1}$ of the uncoated portion located at the relative radial position $R_{2,k*+1}$ may be shorter than the length from the relative radial position $R_{2,1}$ to the first relative radial position $R_{2,k}*$. Therefore, the core C of the electrode assembly 80 may not be blocked by the bending part of the uncoated portion located in the region from the relative radial position $R_{2,k*+1}$ to the relative radial position 1.

Alternatively, the core C of the electrode assembly 80 may not be blocked by the bent portion of the uncoated portion 43a' located at the relative radial position $R_{2,k*+1}$ by 90% or more based on its radius ($r_c$).

Preferably, the bending length $fd_{2,k*+1}$ of the uncoated portion 43a' located at the relative radial position $R_{2,k*+1}$, the radius ($r_c$) of the core, and the distance ($d_{2,k*+1}$) from the center of the core C to the relative radial position $R_{2,k*+1}$ may satisfy Formula 3 below.

$$fd_{2,k*+1} + 0.9 * r_c \leq d_{2,k+1} \qquad \text{<Formula 3>}$$

Preferably, in the winding structure of the first electrode 40, the uncoated portion of the second electrode 40' from a second relative radial position $R_{1,k@+1}$ of the preset $k@+1^{th}$ winding turn to the relative radial position 1 is divided into a plurality of segments 61, and the height of the plurality of segments 61 may be substantially the same from the relative radial position $R_{1,k@+1}$ to the relative radial position 1.

Meanwhile, in the winding structure of the first electrode 40, the uncoated portion 43a of a region from the relative radial position $R_{1,k*+1}$ to the second relative radial position $R_{1,k@}$ of a preset $k@^{th}$ winding turn is divided into a plurality of segments 61, whose heights may increase stepwise or gradually toward the outer circumference. Therefore, the region from the relative radial position $R_{1,k^*+1}$ to the relative radial position $R_{1,k@}$ corresponds to the height variable region.

For example, in the winding structure of the first electrode 40 with a radius of 22 mm, when the radial length of the height variable region of the segment is defined as $H_1$ and the ratio of $H_1$ to the radius $(R-r_c)$ of the winding structure of the first electrode 40 except for the core C is defined as a height variable region ratio $(H_1/(R-r_c))$, the ratio of the height variable region may be calculated as follows by rounding off to the zero decimal place.

In Example 1, R may be 22 mm, the core radius $(r_c)$ may be 5 mm, and $R-r_c$ may be 17 mm. The height of the segment 61 may be changed in 8 steps from 2 mm to 10 mm in the radius region of 7 mm to 15 mm. After radius 15 mm, the height of the segment 61 is maintained at 10 mm. Since $H_1$ is 8 mm, the height variable region ratio may be 47% (8 mm/17 mm).

In Example 2, R and $r_c$ are the same as in Example 1. The height of the segment 61 may be changed in 7 steps from 2 mm to 9 mm in the radius region of 7 mm to 14 mm. After radius 14 mm, the height of the segment 61 is maintained at 9 mm. Since $H_1$ is 7 mm, the height variable region ratio may be 41% (7 mm/17 mm).

In Example 3, R and $r_c$ are the same as in Example 1. The height of the segment 61 may be changed in 6 steps from 2 mm to 8 mm in the radius region of 7 mm to 13 mm. After radius 13 mm, the height of the segment 61 is maintained at 8 mm. Since $H_1$ is 6 mm, the height variable region ratio may be 35% (6 mm/17 mm).

In Example 4, R and $r_c$ are the same as in Example 1. The height of the segment 61 may be changed in 5 steps from 2 mm to 7 mm in the radius region of 7 mm to 12 mm. After radius 12 mm, the height of the segment 61 is maintained at 7 mm. Since $H_1$ is 5 mm, the height variable region ratio may be 29% (5 mm/17 mm).

In Example 5, R and $r_c$ are the same as in Example 1. The height of the segment 61 may be changed in 4 steps from 2 mm to 6 mm in the radius region of 7 mm to 11 mm. After radius 11 mm, the height of the segment 61 is maintained at 6 mm. Since $H_1$ is 4 mm, the height variable region ratio may be 24% (4 mm/17 mm).

In Example 6, R and $r_c$ are the same as in Example 1. The height of the segment 61 may be changed in 3 steps from 2 mm to 5 mm in the radius region of 7 mm to 10 mm. After radius 10 mm, the height of the segment 61 is maintained at 5 mm. Since $H_1$ is 3 mm, the height variable region ratio may be 18% (3 mm/17 mm).

In Example 7, R and $r_c$ are the same as in Example 1. The height of the segment 61 may be changed in 2 steps from 2 mm to 4 mm in the radius region of 7 mm to 9 mm. After radius 9 mm, the height of the segment 61 is maintained at 4 mm. Since $H_1$ is 2 mm, the height variable region ratio may be 12% (2 mm/17 mm).

In Example 8, R and $r_c$ are the same as in Example 1. The height of the segment 61 may be changed stepwise in 1 step from 2 mm to 3 mm in the radius region of 7 mm to 8 mm. After radius 8 mm, the height of the segment 61 is maintained at 3 mm. Since $H_1$ is 1 mm, the height variable region ratio may be 6% (1 mm/17 mm).

In summary, when R is 22 mm and $r_c$ is 5 mm, if the height of the segment in the radius region of 7 mm to 15 mm changes in the range of 2 mm to 10 mm in any one of one to eight steps, the height variable region ratio may be 6% to 47%.

The numerical range of the height variable region ratio may be changed according to the size of the radius $(r_c)$ of the core C. Since the calculation method is similar to the above, only the results are disclosed.

In an example, when R is 22 mm and $r_c$ is 4 mm, if the height of the segment in the radius region of 6 mm to 14 mm changes stepwise in the range of 2 mm to 10 mm in any one of one to eight steps, the height variable region ratio may be 6% to 44%.

In another example, when R is 22 mm and $r_c$ is 3 mm, if the height of the segment in the radius region of 5 mm to 13 mm changes stepwise in the range of 2 mm to 10 mm in any one of one to eight steps, the height variable region ratio may be 5% to 42%.

In still another example, when R is 22 mm and $r_c$ is 2 mm, if the height of the segment in the radius region of 4 mm to 12 mm changes stepwise in the range of 2 mm to 10 mm in any one of one to eight steps, the height variable region ratio may be 5% to 40%.

From the above calculation examples, when the radius $(r_c)$ of the core C is changed in the range of 2 mm to 5 mm, the height variable region ratio is 5% to 47%. When the radius of the electrode assembly 80 is constant, the lower and upper limits of the height variable region ratio decrease accordingly as the radius $(r_c)$ of the core C decreases.

Meanwhile, the upper and lower limits of the height variable region ratio may be changed by the height change amount of the segment 61 per 1 mm increase in radius and the number of height changes.

In one example, when the height of the segment 61 changes by 0.2 mm per 1 mm increase in radius, the lower and upper limits of the height variable region ratio are 1% and 9%, respectively.

In another example, when the height of the segment 61 changes by 1.2 mm per 1 mm increase in radius, the lower and upper limits of the height variable region ratio are 6% and 56%, respectively.

From the above examples, the height variable region ratio may be 1% to 56%. If the height variable region ratio of the segment 61 satisfies the above numerical range, the ratio of relative radial positions where the number of stacked layers of the uncoated portion 40 is 10 or more may be at least 30% of the radial length $(R_1)$ of the winding turns including the segment 61. As will be described later, this configuration provides useful effects in terms of welding strength and resistance of the current collector.

Referring to FIGS. 4 and 7b again, in the winding structure of the second electrode 40', the uncoated portion of the region from the relative radial position $R_{2,k^*+1}$ to a second relative radial position $R_{2,k@}$ of the preset $k@^{th}$ winding turn is also divided into a plurality of segments 61, the height of the plurality of segments 61 may increase stepwise or progressively toward the outer circumference. Therefore, the region from the relative radial position $R_{2,k^*+1}$ to the relative radial position $R_{2,k@}$ corresponds to the height variable region.

In the winding structure of the second electrode 40', when the radial length of the height variable region is defined as $H_2$ and the ratio of $H_2$ to the radius $(R-r_c)$ of the winding structure of the second electrode 40' except for the core C is defined as the height variable region ratio $(H_2/(R-r_c))$, the height variable region ratio may be 1% to 56%, like the first electrode.

If the height variable region ratio for the segment 61 of the uncoated portion 43a' satisfies the above numerical range, the ratio of the radial length of the relative radial positions where the number of stacked layers of the uncoated portion 40 is 10 or more may be at least 30% compared to the radial length $(R_2)$ of the winding turns including the segment 61.

In the winding structure of the second electrode 40', the uncoated portion of the second electrode 40' from the second relative radial position $R_{2,k@+1}$ of the preset $k@+1^{th}$ winding turn to the relative radial position 1 is divided into a plurality of segments 61, and the height of the plurality of segments 61 may be substantially the same from the relative radial position $R_{2,k@+1}$ to the relative radial position 1.

Preferably, in the winding structure of the first electrode 40, the uncoated portion 43a bent toward the core is divided into a plurality of segments 61, and at least one of a height in a winding axis direction and a width in the winding direction of the plurality of segments 61 may increase gradually or stepwise from the core toward the outer circumference individually or in groups.

Similarly, in the winding structure of the second electrode 40', the uncoated portion 43a' bent toward the core is divided into a plurality of segments 61, and at least one of a height in the winding axis direction and a width in the winding direction of the plurality of segments 61 may increase gradually or stepwise from the core toward the outer circumference individually or in groups.

Preferably, when the bending part of the uncoated portions 43a, 43a' is divided into a plurality of segments 61, each of the plurality of segments 61 may satisfy at least one condition among a width (D1 in FIG. 5) condition of 1 mm to 11 mm in the winding direction; a height (D2 in FIG. 5) condition of 2 mm to 10 mm in the winding axis direction; and a separation pitch (D3) condition of 0.05 mm to 1 mm in the winding direction.

Preferably, a predetermined gap may be provided between the bottom portion of the cut groove of the segment 61 (a portion indicated by D4 in FIG. 5) and the active material layer 42. Preferably, the gap may be 0.2 mm to 4 mm.

Referring to FIG. 4, when the bending part of the uncoated portions 43a, 43a' is divided into a plurality of segments 61, the plurality of segments 61 may form a plurality of segment groups from the core to the outer circumference, and segments belonging to the same segment group may be the same as each other in terms of at least one of the width in the winding direction, the height in the winding axis direction, and the separation pitch in the winding direction.

Preferably, at least a part of the plurality of segment groups may be disposed at the same winding turn of the electrode assembly 80. In one example, the segments included in each group may constitute at least one winding turn in the winding structure of the electrode assembly 80. In another example, the segments included in each group may constitute two or more winding turns in the winding structure of the electrode assembly 80.

Figure 9A:
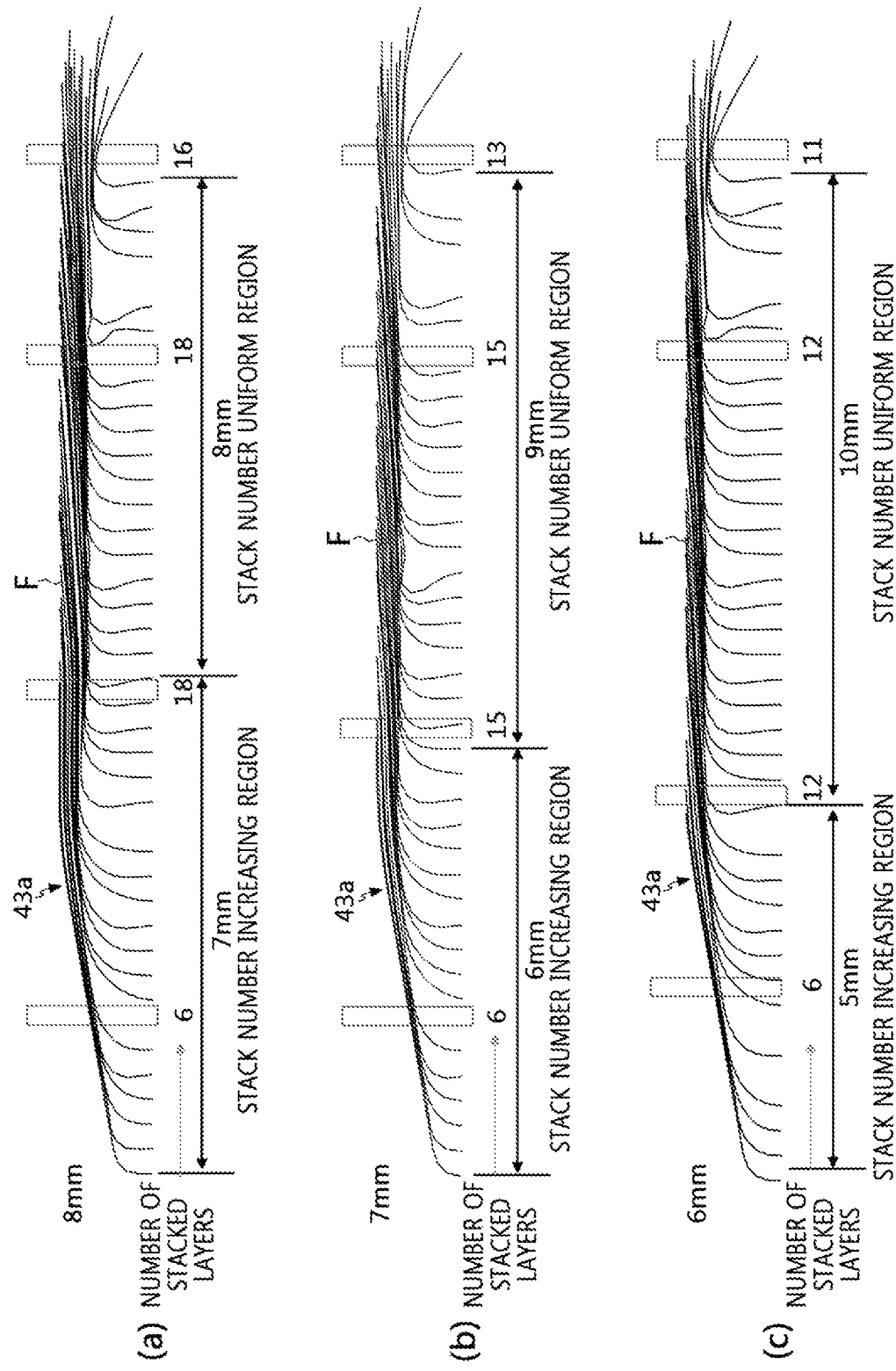
FIG. 9a is a sectional view showing an electrode assembly with a radius of 22 mm included in a cylindrical battery with a form factor of 4680, in which segments of a first electrode are overlapped in a radial direction to form a bending surface region when the segments are bent from the outer circumference toward the core without being overlapped in a circumferential direction.

FIG. 9a is a partially sectioned view showing an electrode assembly having a radius of 22 mm and included in a cylindrical battery having a form factor of 4680, where the uncoated portion 43a of the first electrode 40 divided into a plurality of segments 61 is bent from the outer circumference toward the core to form a bending surface region F, in a part of the bending surface region F, the uncoated portion 43a is overlapped into 10 or more layers along the radial direction, and the stack number increasing region and the stack number uniform region appear along the radial direction of electrode assembly 80.

Referring to FIG. 9a, the number of stacked layers of the uncoated portion 43a in the bending surface region F sequentially increases from the outer circumference of the electrode assembly 80 toward the core and reaches a maximum value, and the maximum value is maintained in a predetermined radius region and then decreases by 1 or 2 near the core.

Hereinafter, the radius region in which the number of stacked layers of the uncoated portion 43a increases sequentially from the outer circumference of the electrode assembly 80 toward the core up to the maximum value is defined as the stack number increasing region, and the region in which the number of stacked layers of the uncoated portion 43a is maintained at the maximum value and the remaining region near the core are defined as the stack number uniform region together. Since the stack number uniform region includes the region in which the number of stacked layers of the uncoated portion 43a is maintained at the maximum value, the bending surface region F is flatter than the other regions, which corresponds to an optimal welding region.

In FIG. 9a, the uncoated portion 43a is divided into segments of a trapezoidal shape as shown in FIG. 5, and only the upper portion of the uncoated portion 43a is depicted based on the bottom portion 63a of the cut groove 63. The uncoated portion 43a is not shown in a portion corresponding to the cross section of the cut groove 63.

The points where the segments 61 are actually bent are not exactly the same, and are spaced apart from the lower end of the cut groove 63 by a predetermined distance. As the number of stacked layers of the uncoated portion 43a increases toward the core, resistance to the overlapping occurs, so it is preferable to perform bending at a point spaced apart from the lower end of the cut groove 63 by a predetermined distance. The separation distance is 2 mm or less, preferably 1 mm or less. If there is a separation distance, the segments 61 are overlapped better in the radial direction.

The bending surface region F is formed as the segments located at different winding turns are overlapped in the radial direction of the electrode assembly 80. In the embodiment shown in FIG. 9a, the segments 61 are not overlapped in the circumferential direction. That is, a gap exists between the sides of the segments 61 as shown in FIG. 6(*a*). The condition of the gap may be satisfied by adjusting width, height, separation pitch, lower internal angle, or the like of the segments. The bending surface region F when the segments are overlapped in the circumferential direction will be described later with reference to FIG. 9b.

In this embodiment, the radius ($r_c$) of the core of the electrode assembly 80 is 4 mm. Also, the height of the segment starts from 3 mm. There is no segment in the uncoated portion 43a from 4 mm to 7 mm based on the radius of the electrode assembly. That is, segments exist in the region with a radius of 7 mm to 22 mm among the total radius of 22 mm of the electrode assembly, and the width of the radius region where segment 61 exists is 15 mm. If the core is covered by the segment by 10% at maximum based on the radius ($r_c$) of the core, the point where segments start to be disposed may be moved toward the core.

In the winding structure, a segment with a height of 3 mm is disposed from the winding turn with a radius of approximately 7 mm. The height of the segment increases from the radius 7 mm of the winding structure by 1 mm per 1 mm increase in radius from the core toward the outer circumference. The period for the height increment of the segment may be changed in the range of 0.2 mm to 1.2 mm per unit radius (1 mm).

FIG. 9a-(a) is a case where the maximum height of the segment is 8 mm. In this case, the segment is disposed from the point where the radius of the electrode assembly becomes 7 mm from the core center. Only then, when the segment with a height of 3 mm is bent toward the core, the segment does not cover the core with a radius of 4 mm. The height of the segment increases in 5 steps from 3 mm to 8 mm when the radius increases from 7 mm to 12 mm. In addition, the height of the segment is maintained at 8 mm from 12 mm to 22 mm in radius. In this embodiment, the height variable region of the segment is in the radius range of 7 mm to 12 mm, and the height variable region ratio is 28% (5/18, rounded to zero decimal place, this will be applied identically below).

FIG. 9a-(b) is a case where the maximum height of the segment is 7 mm. Also in this case, the segment is disposed from the point where the radius of the electrode assembly becomes 7 mm from the core center. Only then, when the segment with a height of 3 mm is bent toward the core, the segment does not cover the core with a radius of 4 mm. The height of the segment increases in 4 steps from 3 mm to 7 mm when the radius increases from 7 mm to 11 mm. In addition, the height of the segment is maintained at 7 mm from 11 mm to 22 mm in radius. In this embodiment, the height variable region of the segment is in the radius region of 7 mm to 11 mm, and the height variable region ratio is 22% (4/18).

FIG. 9a-(c) is a case where the maximum height of the segment is 6 mm. Also in this case, the segment is disposed from the point where the radius of the electrode assembly becomes 7 mm from the core center. Only then, when the segment with a height of 3 mm is bent toward the core, the segment does not cover the core with a radius of 4 mm. The height of the segment increases in 3 steps from 3 mm to 6 mm when the radius increases from 7 mm to 10 mm. In addition, the height of the segment is maintained at 6 mm from 10 mm to 22 mm in radius. In this embodiment, the height variable region of the segment is in the radius region of 7 mm to 10 mm, and the height variable region ratio is 17% (3/18).

In the embodiments shown in (a), (b) and (c) of FIG. 9a, the height variable region of the segment starts from a radius of 7 mm. In addition, the ratio of the height variable region is 17% to 28%. This ratio range is included in the range of 1% to 56% described above.

Referring to FIG. 9a, the number of stacked layers of the uncoated portion 43a sequentially increases from the outer circumference toward the core. Also, it may be found that even though the minimum length of the segment is the same as 3 mm, the maximum value of the number of stacked layers increases to 12, 15, 18 as the maximum length of the segment increases to 6 mm, 7 mm, and 8 mm. In addition, the thickness of the bending surface region F increases proportionally according to the number of stacked layers.

For example, when the maximum height of the segment is 8 mm, the number of stacked layers of the uncoated portion 43a increases up to 18 from the outer circumference of the electrode assembly 80 to the core in the 7 mm radius region and, in the 8 mm radius region toward the core from the radial location where the increasing of the number of stacked layers stops, the number of stacked layers of the uncoated portion 43a is maintained uniformly at the level of 18. In this example, in the stack number uniform region, the number of stacked layers is at least 16, and its radial width is 8 mm. The width of the stack number uniform region is 53% (8/15, rounded to zero decimal place, this will be applied identically below) compared to the radial length (15 mm) of the winding turns including the segment.

As another example, when the maximum height of the segment is 7 mm, the number of stacked layers of the uncoated portion 43a increases up to 15 from the outer circumference of the electrode assembly 80 to the core in the 6 mm radius region and, in the 9 mm radius region toward the core from the radial location where the increasing of the number of stacked layers stops, the number of stacked layers of the uncoated portion 43a is maintained uniformly at the level of 15. Therefore, the radial width of the stack number uniform region is 9 mm, and the number of stacked layers is at least 13 in the stack number uniform region. The width of the stack number uniform region is 60% (9/15) compared to the radial length (15 mm) of the winding turns including the segment.

As another example, when the maximum height of the segment is 6 mm, the number of stacked layers of the uncoated portion 43a increases up to 12 from the outer circumference of the electrode assembly 80 to the core in the 5 mm radius region, and in the 10 mm radius region toward the core from the radial location where the increasing of the number of stacked layers stops, the number of stacked layers of the uncoated portion 43a is maintained uniformly at the level of 12. Therefore, the radial width of the stack number uniform region is 10 mm, and the number of stacked layers is at least 11 in the stack number uniform region. The width of the stack number uniform region is 67% (10/15) compared to the radial length (15 mm) of the winding turns including the segment.

According to the embodiment, it may be understood that when the minimum length of the segment is 3 mm and the maximum length of the segment is 6 mm, 7 mm and 8 mm, the length of the stack number increasing region in which the number of stacked layers gradually increases is increased to 5 mm, 6 mm and 7 mm, respectively, and the ratio of the stack number uniform region in which the number of stacked layers of the uncoated portion 43a is 10 or more is 53% to 67%.

Meanwhile, the thickness of the bending surface region F increases in proportion to the number of stacked layers of the uncoated portion 43a. Depending on the minimum height and the maximum height of the segment in the height variable region, the number of stacked layers of the uncoated portion 43a may be lowered to 10 and thus the number of stacked layers of the uncoated portion 43a may be 10 to 18. In one example, when the uncoated portion 43a is aluminum and its thickness is 10 μm to 25 μm, the thickness of the bending surface region F may be 100 μm to 450 μm. In another example, when the uncoated portion 43a is copper and its thickness is 5 μm to 20 μm, the thickness of the bending surface region F may be 50 μm to 360 μm. If the thickness of the bending surface region F satisfies the condition of the above numerical range, when the current collector is welded to the bending surface region F using a laser, the bending surface region F absorbs the laser energy sufficiently. As a result, welding beads are formed in a sufficient volume on the bending surface region F to increase the welding strength. In addition, it is possible to prevent the separator or the like located under the bending surface region F from being damaged since the welding portion is perforated by the laser.

Preferably, the current collector may be welded to the bending surface region F. The welding region of the current collector may at least partially overlap with the stack number uniform region based on the radial direction.

Preferably, 50% to 100% of the welding region of the current collector may overlap with the stack number uniform region in the radial direction of the electrode assembly. As the overlapping ratio of the welding region increases, it is preferable in terms of improving the welding strength and increasing the volume of welding beads. In the welding region of the current collector, the remaining region that does not overlap with the stack number uniform region may overlap with the stack number increasing region.

Meanwhile, as described with reference to FIG. 6, when the segments 61 of the uncoated portion 43a are bent to form the bending surface region F, if the lower internal angle of the segment included in each segment group satisfies the condition of Formula 1, adjacent segments 61 located at the same winding turn may overlap with each other in the circumferential direction while the sides of the adjacent segments 61 intersect. In this case, the number of stacked layers of the uncoated portion 43a may be further increased in the radial direction of the electrode assembly.

FIG. 9b is a cross-sectional view of the bending surface region F exemplarily showing the stack number increasing region and the stack number uniform region when segments are overlapped in the circumferential direction.

Referring to FIG. 9b, the number of stacked layers of the uncoated portion 43a sequentially increases from the outer circumference toward the core. The height variable region of the segment starts from the radius of 7 mm as in the embodiment of FIG. 9a. The height of the segment starts from 3 mm and increases by 1 mm per 1 mm increase in radius. As the maximum value of the segment height is increased to 6 mm, 7 mm, 8 mm, 9 mm and 10 mm, the number of stacked layers at the radial position where the stack number uniform region starts increases to 18, 22, 26, 30 and 34. Under the same conditions where the maximum value of the segment height is 6 mm, 7 mm and 8 mm, the number of stacked layers is greater by 6 to 8 than that of the embodiment of FIG. 9a. This is because the segments are overlapped in the circumferential direction.

Specifically, when the maximum value of the segment height is 10 mm, the number of stacked layers of the uncoated portion 43a increases from the outer circumference of the electrode assembly 80 to the core in the 9 mm radius region (the stack number increasing region) up to 34, and, in the 6 mm radius region toward the core from the radial location where the increasing of the number of stacked layers stops, the number of stacked layers of the uncoated portion 43a is maintained as 34, and the number of stacked layers further increases to 39 near the core. The number of stacked layers is increased near the core because the segments are overlapped more in the circumferential direction as being closer to the core. In this example, in the stack number uniform region, the number of stacked layers is 34 or more, and its radial width of 6 mm. The stack number uniform region starts from the radius of 7 mm and the stack number uniform region ratio is 40% (6/15, rounded to zero decimal place, this will be applied identically below) compared to the radial length (15 mm) of the winding turns including the segment.

As another example, when the maximum value of the segment height is 9 mm, the number of stacked layers of the uncoated portion 43a increases up to 30 from the outer circumference of the electrode assembly 80 to the core in the 8 mm radius region, and, in the 7 mm radius region toward the core from the radial location where the increasing of the number of stacked layers stops, the number of stacked layers of the uncoated portion 43a is maintained as 30, and then further increases to 36 near the core. Therefore, the radial width of the stack number uniform region is 7 mm, and the number of stacked layers is 30 or more in the stack number uniform region. The stack number uniform region starts from the radius of 7 mm and the stack number uniform region ratio is 47% (7/15) compared to the radial length (15 mm) of the winding turns including the segment.

As still another example, when the maximum value of the segment height is 8 mm, the number of stacked layers of the uncoated portion 43a increases up to 26 from the outer circumference of the electrode assembly 80 to the core in the 7 mm radius region, and, in the 8 mm region toward the core from the radial location where the increasing of the number of stacked layers stops, the number of stacked layers of the uncoated portion 43a is maintained as 26, and then further increased to 28 near the core. Therefore, the radial width of the stack number uniform region is 8 mm, and the number of stacked layers is 26 or more in the stack number uniform region. The stack number uniform region starts from the radius of 7 mm and the stack number uniform region ratio is 53% (8/15) compared to the radial length (15 mm) of the winding turns including the segment.

As still another example, when the maximum value of the segment height is 7 mm, the number of stacked layers of the uncoated portion 43a increases up to 22 from the outer circumference of the electrode assembly 80 to the core in the 6 mm radius region, and, in the 9 mm radius region toward the core from the radial location where the increasing of the number of stacked layers stops, the number of stacked layers of the uncoated portion 43a is maintained as 22, and then further increased to 23 near the core. Therefore, the radial width of the stack number uniform region is 9 mm, and the number of stacked layers is 22 or more in the stack number uniform region. The stack number uniform region starts from the radius of 7 mm and the stack number uniform region ration is 60% (9/15) compared to the radial length (15 mm) of the winding turns including the segment.

As still another example, when the maximum value of the segment height is 6 mm, the number of stacked layers of the uncoated portion 43a increases up to 18 from the outer circumference of the electrode assembly 80 to the core in the 5 mm radius region, and, in the 10 mm radius region toward the core from the radial location where the increasing of the number of stacked layers stops, the number of stacked layers of the uncoated portion 43a is maintained at 18, and then further increased to 20 near the core. Therefore, the radial width of the stack number uniform region is 10 mm, and the number of stacked layers is 18 or more in the stack number uniform region. The stack number uniform region starts from the radius of 7 mm and the stack number uniform region ratio is 67% (10/15) compared to the radial length (15 mm) of the winding turns including the segment.

According to the embodiment shown in FIG. 9b, when the minimum value of the segment height is 3 m and the maximum value of the segment height is 6 mm, 7 mm, 8 mm, 9 mm and 10 mm, the length of the stack number increasing region in which the number of stacked layers gradually increases is increased to 5 mm, 6 mm, 7 mm, 8 mm and 9 mm. In addition, it may be found that the ratio of the stack number uniform region in which the number of stacked layers is 10 or more is 40% to 67%.

Meanwhile, in the embodiment of FIG. 9b, the thickness of the bending surface region F increases in proportion to the number of stacked layers of the uncoated portion 43a. The number of stacked layers of the uncoated portion 43a is 18 to 39. In one example, when the uncoated portion 43a is aluminum and its thickness is 10 μm to 25 μm, the thickness of the bending surface region F may be 180 μm to 975 μm. In another example, when the uncoated portion 43a is copper and its thickness is 5 μm to 20 μm, the thickness of the bending surface region F may be 90 μm to 780 μm. If the thickness of the bending surface region F satisfies the condition of the above numerical range, when the current collector is welded to the bending surface region F using a laser, the bending surface region F absorbs the laser energy sufficiently. As a result, welding beads are formed in a sufficient volume on the bending surface region F to increase the welding strength. In addition, it is possible to prevent the separator and the like located under the bending surface region F from being damaged since the welding portion is perforated by the laser.

Preferably, the welding region of the current collector may at least partially overlap with the stack number uniform region based on the radial direction. Preferably, 50% to 100% of the welding region of the current collector may overlap with the stack number uniform region in the radial direction of the electrode current collector 80. As the overlapping ratio of the welding region increases, it is preferable in terms of welding strength. A region of the welding region of the current collector that does not overlap the stack number uniform region may overlap with the stack number increasing region.

In the embodiment illustrated in FIGS. 9a and 9b, it will be apparent to those skilled in the art that the stack number uniform region of the uncoated portion 43a may be increased or decreased according to the radius (R) of the electrode assembly, the radius ($r_c$) of the core, the minimum and maximum values of the segment height in the segment height variable region, the height increase amount of the segment in the radial direction of the electrode assembly.

The ratio of the stack number uniform region is inversely proportional to the radius of the core ($r_c$). Also, when the minimum height of the segment is the same, the ratio of the stack number uniform region increases as the radial width of the height variable region decreases. Also, when the maximum height of the segment is the same, the ratio of the stack number uniform region increases as the radial width of the height variable region decreases.

In one example, when the diameter (R) of the electrode assembly is 22 mm, the radius ($r_c$) of the core is 2 mm and the height of the segment is changed from 7 mm to 10 mm in the radius of 9 mm to 12 mm, which is the height variable region of the segment, the ratio of the stack number uniform region may be decreased to the level of 30%.

In another example, when the diameter (R) of the electrode assembly is 22 mm, the radius ($r_c$) of the core is 2 mm and the height of the segment is change from 3 mm to 4 mm in the radius of 5 mm to 6 mm, which is the height variable region of the segment, the ratio of the stack number uniform region may be increased to the level of 85%.

Accordingly, the radial length of the stack number uniform region may be 30% or more, preferably 30% to 85%, compared to the radial length of the winding turns including the segment.

Meanwhile, as described by referring to FIGS. 9a and 9b, when the maximum height of the segment in the height uniform region of the segment is 6 mm to 10 mm, the number of stacked layers of the uncoated portion 43a in the stack number uniform region may be adjusted in the range of 10 to 39 by changing the minimum height of segment and the height increment amount of segment in a radial direction. The stack number uniform region of the bending surface region F includes a region formed by bending the segments included in the height uniform region. The thickness of the bending surface region F varies depending on the thickness of the material constituting the uncoated portion 43a. When the uncoated portion 43a is made of aluminum and its thickness is 10 μm to 25 μm, the stack thickness of the uncoated portion in the bending surface region F is 100 μm (0.1 mm) to 975 μm (0.975 mm). In this case, the ratio of the stack thickness of the uncoated portion in the bending surface region F to the height of the segment in the bending surface region F formed by bending the segments having height of 6 mm to 10 mm included in the height uniform region is 1.0% (0.1 mm/10 mm) to 16.3% (0.975 mm/6 mm). In another example, when the uncoated portion 43a is made of copper and its thickness is 5 μm to 20 μm, the stack thickness of the uncoated portion in the bending surface region F is 50 μm (0.05 mm) to 780 μm (0.780 mm). In this case, the ratio of the stack thickness of the uncoated portion in the bending surface region F to the height of the segment in the bending surface region F formed by bending the segments having height of 6 mm to 10 mm included in the height uniform region is 0.5% (0.05 mm/10 mm) to 13.0% (0.780 mm/6 mm). If the thickness ratio of the bending surface region (F) to the height of the segments included in the height uniform region satisfies the above numerical range, the desired welding strength may be achieved when the current collector is welded to the bending surface region F.

Various electrode assembly structures according to the embodiments (modifications) of the present disclosure may be applied to a cylindrical battery or any other batteries well known in the art.

Preferably, the cylindrical battery may be, for example, a cylindrical battery whose form factor ratio (defined as a value obtained by dividing the diameter of the cylindrical battery by height, namely a ratio of diameter (1) to height (H)) is greater than about 0.4.

Here, the form factor means a value indicating the diameter and height of a cylindrical battery. The form factor of the cylindrical battery according to an embodiment of the present disclosure may be, for example, 46110, 4875, 48110, 4880, 4680, or the like. In the numerical value representing the form factor, first two numbers indicate the diameter of the battery, and the remaining numbers indicate the height of the battery.

When an electrode assembly having a tab-less structure is applied to a cylindrical battery having a form factor ratio of more than 0.4, the stress applied in the radial direction when the uncoated portion is bent is large, so that the uncoated portion may be easily torn. In addition, when welding the current collector to the bending surface region of the uncoated portion, it is necessary to sufficiently increase the number of stacked layers of the uncoated portion in order to sufficiently secure the welding strength and lower the resistance. This requirement may be achieved by the electrode and the electrode assembly according to the embodiments (modifications) of the present disclosure.

A battery according to an embodiment of the present disclosure may be a cylindrical battery having an approximately cylindrical shape, whose diameter is approximately 46 mm, height is approximately 110 mm, and form factor ratio is 0.418.

A battery according to another embodiment may be a cylindrical battery having a substantially cylindrical shape, whose diameter is about 48 mm, height is about 75 mm, and form factor ratio is 0.640.

A battery according to still another embodiment may be a cylindrical battery having an approximately cylindrical shape, whose diameter is approximately 48 mm, height is approximately 110 mm, and form factor ratio is 0.436.

A battery according to still another embodiment may be a cylindrical battery having an approximately cylindrical shape, whose diameter is approximately 48 mm, height is approximately 80 mm, and form factor ratio is 0.600.

A battery according to still another embodiment may be a cylindrical battery having an approximately cylindrical shape, whose diameter is approximately 46 mm, height is approximately 80 mm, and form factor ratio is 0.575.

Conventionally, batteries having a form factor ratio of about 0.4 or less have been used. That is, conventionally, for example, 1865 battery, 2170 battery, etc. were used. The 1865 battery has a diameter of approximately 18 mm, height of approximately 65 mm, and a form factor ratio of 0.277. The 2170 battery has a diameter of approximately 21 mm, a height of approximately 70 mm, and a form factor ratio of 0.300.

Hereinafter, the cylindrical battery according to an embodiment of the present disclosure will be described in detail.

Figure 10:
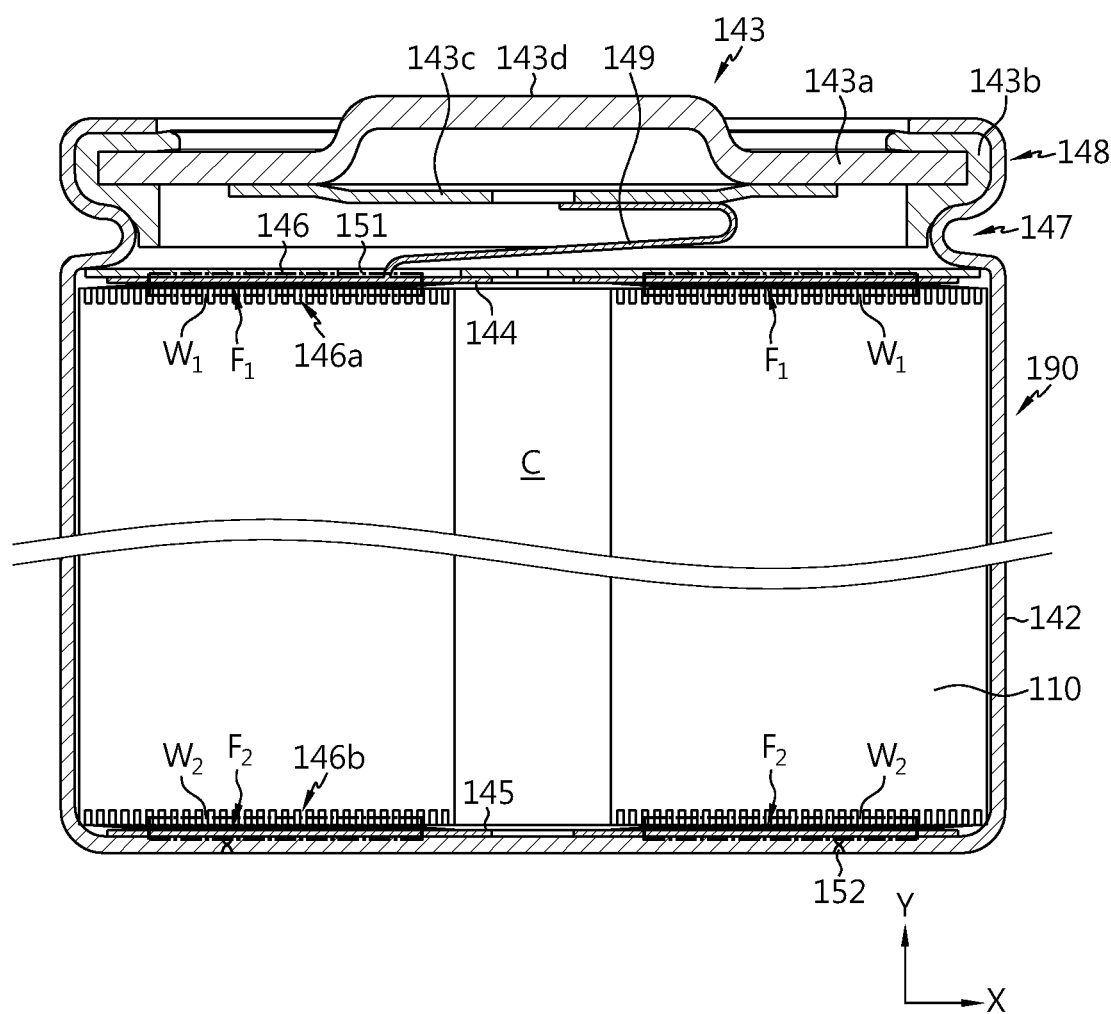
FIG. 10 is a sectional view showing a cylindrical battery according to an embodiment of the present disclosure, taken along the Y-axis direction.

FIG. 10 is a sectional view showing a cylindrical battery 190 according to an embodiment of the present disclosure, taken along the Y-axis direction.

Referring to FIG. 10, the cylindrical battery 190 according to an embodiment of the present disclosure includes an electrode assembly 110 having a first electrode, a separator and a second electrode, a battery housing 142 for accommodating the electrode assembly 110, and a sealing body 143 for sealing an open end of the battery housing 142.

The battery housing 142 is a cylindrical container with an opening at the top. The battery housing 142 is made of a conductive metal material such as aluminum or steel. The battery housing 142 accommodates the electrode assembly 110 in the inner space through the top opening and also accommodates the electrolyte.

The electrolyte may be a salt having a structure like $A^+B^-$. Here, $A^+$ includes an alkali metal cation such as $Li^+$, $Na^+$, or $K^+$, or a combination thereof and $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $ASF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may also be dissolved in an organic solvent. The organic solvent may employ propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

The electrode assembly 110 may have a jelly-roll shape or any other rolled shapes well known in the art. The electrode assembly 110 may be manufactured by winding a laminate formed by sequentially laminating a lower separator, a first electrode, an upper separator, and a second electrode at least once, based on the winding center C, as shown in FIG. 2.

The first electrode and the second electrode have different polarities. That is, if one has positive polarity, the other has negative polarity. At least one of the first electrode and the second electrode may have an electrode structure according to the above embodiments (modifications). In addition, the other of the first electrode and the second electrode may have a conventional electrode structure or an electrode structure according to embodiments (modifications).

An uncoated portion 146a of the first electrode and an uncoated portion 146b of the second electrode protrude from the upper and lower portions of the electrode assembly 110, respectively.

The sealing body 143 may include a cap 143a, a first gasket 143b for providing airtightness between the cap 143a and the battery housing 142 and having insulation, and a connection plate 143c electrically and mechanically coupled to the cap 143a.

The cap 143a is a component made of a conductive metal material, and covers the top opening of the battery housing 142. The cap 143a is electrically connected to the uncoated portion 146a of the first electrode, and is electrically insulated from the battery housing 142 by means of the first gasket 143b. Accordingly, the cap 143a may function as a first electrode terminal of the cylindrical battery 140.

The cap 143a is placed on the beading portion 147 formed on the battery housing 142, and is fixed by a crimping portion 148. Between the cap 143a and the crimping portion 148, the first gasket 143b may be interposed to secure the airtightness of the battery housing 142 and the electrical insulation between the battery housing 142 and the cap 143a. The cap 143a may have a protrusion 143d protruding upward from the center thereof.

The battery housing 142 is electrically connected to the uncoated portion 146b of the second electrode. Therefore, the battery housing 142 has the same polarity as the second electrode. If the second electrode has negative polarity, the battery housing 142 also has negative polarity.

The battery housing 142 includes the beading portion 147 and the crimping portion 148 at the top thereof. The beading portion 147 is formed by press-fitting the periphery of the outer circumferential surface of the battery housing 142. The beading portion 147 prevents the electrode assembly 110 accommodated inside the battery housing 142 from escaping through the top opening of the battery housing 142, and may function as a support portion on which the sealing body 143 is placed.

The crimping portion 148 is formed on the beading portion 147. The crimping portion 148 has an extended and bent shape to cover the outer circumference of the cap 143a disposed on the beading portion 147 and a part of the upper surface of the cap 143a.

The cylindrical battery 140 may further include a first current collector 144 and/or a second current collector 145 and/or an insulator 146.

The first current collector 144 is coupled to the upper portion of the electrode assembly 110. The first current collector 144 is made of a conductive metal material such as aluminum, copper, nickel and so on, and is electrically connected to the bending surface region $F_1$ that is formed as the uncoated portion 146a of the first electrode is bent.

A lead 149 may be connected to the first current collector 144. The lead 149 may extend upward above the electrode assembly 110 and be coupled to the connection plate 143c or directly coupled to the lower surface of the cap 143a. The lead 149 may be connected to other components by welding.

Preferably, the first current collector 144 may be integrally formed with the lead 149. In this case, the lead 149 may have an elongated plate shape extending outward near the center of the first current collector 144.

The bending surface region ($F_1$) of the uncoated portion 146a and the first current collector 144 may be coupled, for example, by laser welding. Laser welding may be performed in a manner that partially melts a base material of the current collector. Laser welding may be replaced by resistance welding, ultrasonic welding, or the like.

Preferably, the uncoated portion 146a is divided into a plurality of segments, and the bending surface region ($F_1$) is formed by bending the plurality of segments toward the core C. In the bending surface region ($F_1$), the radial length of a region where the number of stacked layers of the uncoated portion 146a is 10 or more may be 30% or more, more particularly, 30% to 85%, compared to the radial length of the winding turns including the segment.

The welding area between the bending surface region ($F_1$) of the uncoated portion 146a and the first current collector 144 may overlap with the stack number uniform region ($W_1$) of the bending surface region ($F_1$) by 50% or more, and the overlapping ratio may be higher.

When the bending surface region ($F_1$) of the uncoated portion 146a and the first current collector 144 are welded with a laser, the welding strength may be 2 kgf/cm$^2$ or more, more particularly, 4 kgf/cm$^2$ or more. The upper limit of the welding strength may be dependent on a specification of a laser welding equipment. As one example, the welding strength may be set to 8 kgf/cm$^2$ or less, or 6 kgf/cm$^2$ or less. The laser power for realizing the welding strength varies depending on the laser welding equipment. In one example, the laser power may be in the range of 250 W to 320 W. In another example, the laser power may be adjusted in the range of 40% to 100% of the maximum power specification of the laser welding equipment.

When the welding strength satisfies the above numerical range, even if severe vibration is applied to the electrode assembly 110 along the winding axis direction and/or the radial direction, the properties of the welding interface do not deteriorate, and since the volume of the welding beads is sufficient, the resistance of the welding interface may also be reduced.

The second current collector 145 may be coupled to the lower surface of the electrode assembly 110. One side of the second current collector 145 may be coupled by welding to the bending surface region ($F_2$) formed as the uncoated portion 146b of the second electrode is bent, and the other side may be coupled to the inner bottom surface of the battery housing 142 by welding.

Preferably, the uncoated portion 146b is divided into a plurality of segments, and the bending surface region ($F_2$) is formed by bending the plurality of segments toward the core C. In the bending surface region ($F_2$), the radial length of a region where the number of stacked layers of the uncoated portion 146b is 10 or more may be 30% or more, more particularly, 30% to 85%, compared to the radial length of the winding turns including the segment.

The coupling structure between the second current collector 145 and the uncoated portion 146b of the second electrode may be substantially the same as the coupling structure between the first current collector 144 and the uncoated portion 146a of the first electrode.

The welding area between the bending surface region ($F_2$) of the uncoated portion 146b and the second current collector 145 may overlap with the stack number uniform region ($W_2$) by 50% or more, and the overlapping ratio may be higher.

When the bending surface region ($F_2$) of the uncoated portion 146b and the second current collector 145 are welded with a laser, the welding strength may be 2 kgf/cm$^2$ or more, more particularly, 4 kgf/cm$^2$ or more. The upper limit of the welding strength may be dependent on a specification of a laser welding equipment. As one example, the welding strength may be set to 8 kgf/cm$^2$ or less, or 6 kgf/cm$^2$ or less. The laser power for realizing the welding strength varies depending on the laser welding equipment. In one example, the laser power may be in the range of 250 W to 320 W. In another example, the laser power may be adjusted in the range of 40% to 100% of the maximum power specification of the laser welding equipment.

When the welding strength satisfies the above numerical range, even if severe vibration is applied to the electrode assembly 110 along the winding axis direction and/or the radial direction, the properties of the welding interface do not deteriorate, and since the volume of the welding beads is sufficient, the resistance of the welding interface may also be reduced.

The insulator 146 may cover the first current collector 144. The insulator 146 may cover the first current collector 144 at the upper surface of the first current collector 144, thereby preventing direct contact between the first current collector 144 and the inner circumference of the battery housing 142.

The insulator 146 has a lead hole 151 so that the lead 149 extending upward from the first current collector 144 may be withdrawn therethrough. The lead 149 is drawn upward through the lead hole 151 and coupled to the lower surface of the connection plate 143c or the lower surface of the cap 143a.

A peripheral region of the edge of the insulator 146 may be interposed between the first current collector 144 and the beading portion 147 to fix the coupled body of the electrode assembly 110 and the first current collector 144. Accordingly, the movement of the coupled body of the electrode assembly 110 and the first current collector 144 may be restricted in the height direction of the battery 140, thereby improving the assembly stability of the battery 140.

The insulator 146 may be made of an insulating polymer resin. In one example, the insulator 146 may be made of polyethylene, polypropylene, polyimide, or polybutylene terephthalate.

The battery housing 142 may further include a venting portion 152 formed at a lower surface thereof. The venting portion 152 corresponds to a region having a smaller thickness compared to the peripheral region of the lower surface of the battery housing 142. The venting portion 152 is structurally weak compared to the surrounding area. Accordingly, when an abnormality occurs in the cylindrical battery 190 and the internal pressure increases to a predetermined level or more, the venting portion 152 may be ruptured so that the gas generated inside the battery housing 142 is discharged to the outside.

The venting portion 152 may be formed continuously or discontinuously while drawing a circle at the lower surface of the battery housing 142. In a modification, the venting portion 152 may be formed in a straight pattern or other patterns.

Figure 11:
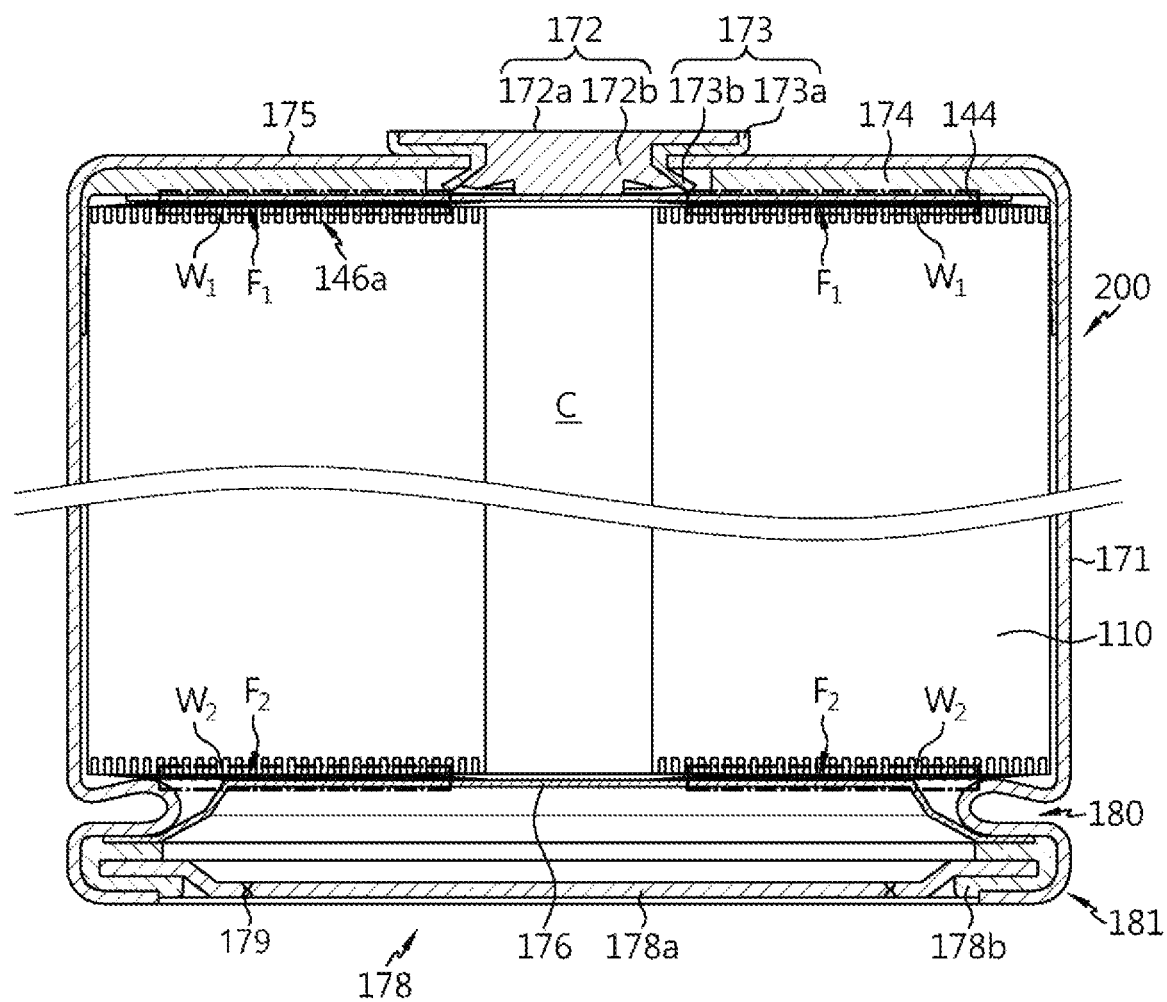
FIG. 11 is a sectional view showing a cylindrical battery according to another embodiment of the present disclosure, taken along the Y-axis direction.

FIG. 11 is a sectional view showing a cylindrical battery 200 according to still another embodiment of the present disclosure, taken along the Y-axis.

Referring to FIG. 11, the structure of the electrode assembly of the cylindrical battery 200 is substantially the same as that of the cylindrical battery 190 of in FIG. 10, and the other structure except for the electrode assembly is changed.

Specifically, the cylindrical battery 200 includes a battery housing 171 through which a terminal 172 is installed. The terminal 172 is installed on the closed surface (the upper surface in the drawing) of the battery housing 171. The terminal 172 is riveted to a perforation hole of the battery housing 171 in a state where a second gasket 173 made of an insulating material is interposed therebetween. The terminal 172 is exposed to the outside in a direction opposite to the direction of gravity.

The terminal 172 includes a terminal exposing portion 172a and a terminal insert portion 172b. The terminal exposing portion 172a is exposed to the outside of the closed surface of the battery housing 171. The terminal exposing portion 172a may be located approximately at a central portion of the closed surface of the battery housing 171. The maximum diameter of the terminal exposing portion 172a may be larger than the maximum diameter of the perforation hole formed in the battery housing 171. The terminal insert portion 172b may be electrically connected to the uncoated portion 146a of the first electrode through approximately the central portion of the closed surface of the battery housing 171. The terminal insert portion 172b may be riveted onto the inner surface of the battery housing 171. That is, the lower edge of the terminal insert portion 172b may have a shape curved toward the inner surface of the battery housing 171. The maximum diameter of the end of the terminal insert portion 172b may be larger than the maximum diameter of the perforation hole of the battery housing 171.

The lower surface of the terminal insert portion 172b is substantially flat and may be welded to the center portion of the first current collector 144 connected to the uncoated portion 146a of the first electrode. An insulator 174 made of an insulating material may be interposed between the first current collector 144 and the inner surface of the battery housing 171. The insulator 174 covers the upper portion of the first current collector 144 and the top edge of the electrode assembly 110. Accordingly, it is possible to prevent the uncoated portion 146a exposed at the outer circumference of the electrode assembly 110 from contacting the inner surface of the battery housing 171 having a different polarity to cause a short circuit.

The insulator 174 is in contact with the inner surface of the closed portion of the battery housing 171 and in contact with the upper surface of the first current collector 144. To this end, the insulator 174 has a thickness corresponding to the separation distance between the inner surface of the closed portion of the battery housing 171 and the upper surface of the first current collector 144, or a thickness slightly larger than the separation distance.

Preferably, the first current collector 144 may be laser-welded to the bending surface region $F_1$ of the uncoated portion 146a. At this time, welding is performed in a region including the stack number uniform region where the number of stacked layers of the uncoated portion 146a is 10 or more in the bending surface region $F_1$ of the uncoated portion 146a.

The radial length of the stack number uniform region in which the number of stacked layers of the uncoated portion 146a is 10 or more may be 30% or more, more particularly, 30% to 85%, compared to the radial length of the winding turns including the segment.

The welding area between the bending surface region ($F_1$) of the uncoated portion 146a and the first current collector 144 may overlap with the stack number uniform region ($W_1$) by 50% or more, and the overlapping ratio may be higher.

When the bending surface region ($F_1$) of the uncoated portion 146a and the first current collector 144 are welded with a laser, the welding strength may be 2 kgf/cm² or more, more particularly, 4 kgf/cm² or more. The upper limit of the welding strength may be dependent on a specification of a laser welding equipment. As one example, the welding strength may be set to 8 kgf/cm² or less, or 6 kgf/cm² or less. The laser power for realizing the welding strength varies depending on the laser welding equipment. In one example, the laser power may be in the range of 250 W to 320 W. In another example, the laser power may be adjusted in the range of 40% to 100% of the maximum power specification of the laser welding equipment.

When the welding strength satisfies the above numerical range, even if severe vibration is applied to the electrode assembly 110 along the winding axis direction and/or the radial direction, the properties of the welding interface do not deteriorate, and since the volume of the welding beads is sufficient, the resistance of the welding interface may also be reduced.

The second gasket 173 is interposed between the battery housing 171 and the terminal 172 to prevent the battery housing 171 and the terminal 172 having opposite polarities from electrically contacting each other. Accordingly, the upper surface of the battery housing 171 having an approximately flat shape may function as a second electrode terminal of the cylindrical battery 200.

The second gasket 173 includes a gasket exposing portion 173a and a gasket insert portion 173b. The gasket exposing portion 173a is interposed between the terminal exposing portion 172a of the terminal 172 and the battery housing 171. The gasket insert portion 173b is interposed between the terminal insert portion 172b of the terminal 172 and the battery housing 171. The gasket insert portion 173b may be deformed together when the terminal insert portion 172b is riveted, so as to be in close contact with the inner surface of the battery housing 171. The second gasket 173 may be made of, for example, a polymer resin having insulation.

The gasket exposing portion 173a of the second gasket 173 may have an extended shape to cover the outer circumference of the terminal exposing portion 172a of the terminal 172. When the second gasket 173 covers the outer circumference of the terminal 172, it is possible to prevent a short circuit from occurring while an electrical connection part such as a bus bar is coupled to the upper surface of the battery housing 171 and/or the terminal 172. Although not shown in the drawings, the gasket exposing portion 173a may have an extended shape to cover not only the outer circumference surface of the terminal exposing portion 172a but also a part of the upper surface thereof.

When the second gasket 173 is made of a polymer resin, the second gasket 173 may be coupled to the battery housing 171 and the terminal 172 by thermal fusion. In this case, airtightness at the coupling interface between the second gasket 173 and the terminal 172 and at the coupling interface between the second gasket 173 and the battery housing 171 may be enhanced. Meanwhile, when the gasket exposing portion 173a of the second gasket 173 has a shape extending to the upper surface of the terminal exposing portion 172a, the terminal 172 may be integrally coupled with the second gasket 173 by insert injection molding.

In the upper surface of the battery housing 171, a remaining area 175 other than the area occupied by the terminal 172 and the second gasket 173 corresponds to the second electrode terminal having a polarity opposite to that of the terminal 172.

The second current collector 176 is coupled to the lower portion of the electrode assembly 110. The second current collector 176 is made of a conductive metal material such as aluminum, steel, copper or nickel, and is electrically connected to the uncoated portion 146b of the second electrode.

Preferably, the second current collector 176 is electrically connected to the battery housing 171. To this end, at least a portion of the edge of the second current collector 176 may be interposed and fixed between the inner surface of the battery housing 171 and a first gasket 178b.

In one example, at least a portion of the edge of the second current collector 176 may be fixed to the beading portion 180 by welding in a state of being supported on the lower surface of the beading portion 180 formed at the bottom of the battery housing 171. In a modification, at least a portion of the edge of the second current collector 176 may be directly welded to the inner wall surface of the battery housing 171.

Preferably, the second current collector 176 and the bending surface region ($F_2$) of the uncoated portion 146b may be coupled by welding, for example, laser welding. At this time, welding is performed in an area including a stack number uniform region where the number of stacked layers of the uncoated portion 146b is 10 or more in the bending surface region ($F_2$) of the uncoated portion 146b.

The radial length of the region where the number of stacked layers of the uncoated portion 146b is 10 or more may be 30% or more, more particularly, 30% to 85%, compared to the radial length of the winding turns including the segment.

The welding area between the bending surface region ($F_2$) of the uncoated portion 146b and the second current collector 176 may overlap with the stack number uniform region ($W_2$) by 50% or more, and the overlapping ratio may be higher.

When the bending surface region ($F_2$) of the uncoated portion 146b and the second current collector 176 are welded with a laser, the welding strength may be 2 kgf/cm$^2$ or more, more particularly, 4 kgf/cm$^2$ or more.

When the welding strength satisfies the above numerical range, even if severe vibration is applied to the electrode assembly 110 along the winding axis direction and/or the radial direction, the properties of the welding interface do not deteriorate, and since the volume of the welding beads is sufficient, the resistance of the welding interface may also be reduced.

A sealing body 178 for sealing the lower open end of the battery housing 171 includes a cap 178a and a first gasket 178b. The first gasket 178b electrically separates the cap 178a and the battery housing 171. A crimping portion 181 fixes the edge of the cap 178a and the first gasket 178b together. The cap 178a has a venting portion 179. The configuration of the venting portion 179 is substantially the same as the above embodiment (modification).

Preferably, the cap 178a is made of a conductive metal material. However, since the first gasket 178b is interposed between the cap 178a and the battery housing 171, the cap 178a does not have electrical polarity. The sealing body 178 seals the open end of the lower portion of the battery housing 171 and functions to discharge gas when the internal pressure of the battery 200 increases over a critical value.

Preferably, the terminal 172 electrically connected to the uncoated portion 146a of the first electrode is used as the first electrode terminal. In addition, in the upper surface of the battery housing 171 electrically connected to the uncoated portion 146b of the second electrode through the second current collector 176, a part 175 except for the terminal 172 is used as the second electrode terminal having a different polarity from the first electrode terminal. If two electrode terminals are located at the upper portion of the cylindrical battery 200 as above, it is possible to arrange electrical connection components such as bus bars at only one side of the cylindrical battery 200. This may bring about simplification of the battery pack structure and improvement of energy density. In addition, since the part 175 used as the second electrode terminal has an approximately flat shape, a sufficient bonding area may be secured for bonding electrical connection components such as bus bars. Accordingly, the cylindrical battery 200 may reduce the resistance at the bonding portion of the electrical connection components to a desirable level.

In the present disclosure, even when the uncoated portions 146a, 146b are bent toward the core, the core C of the electrode assembly 110 may be opened upward without being blocked.

That is, as shown in FIG. 4, the height of the uncoated portion of the first and second electrodes, particularly the height of the core-side uncoated portion A, is designed to be low, and the height variable region of the segment 61 is disposed adjacent to the core-side uncoated portion A, so that by adjusting the height of the segment 61 closest to the core-side uncoated portion A, the core C of the electrode assembly 110 is not blocked even if the uncoated portion near the core of the electrode assembly 110 is bent.

If the core C is not blocked, there is no difficulty in the electrolyte injection process and the electrolyte injection efficiency is improved. In addition, by inserting a welding jig through the core C, the welding process between the current collector 145 and the bottom of the battery housing 142 or the welding process between the current collector 144 and the terminal 172 may be easily performed.

When the uncoated portions 146a, 146b have a segment structure, if the width and/or height and/or separation pitch of the segments are adjusted to satisfy the numerical ranges of the above embodiment, the segments are overlapped in multiple layers to sufficiently secure welding strength when the segments are bent, and an empty space (gap) is not formed on the bending surface region ($F_1$, $F_2$).

Figure 12:
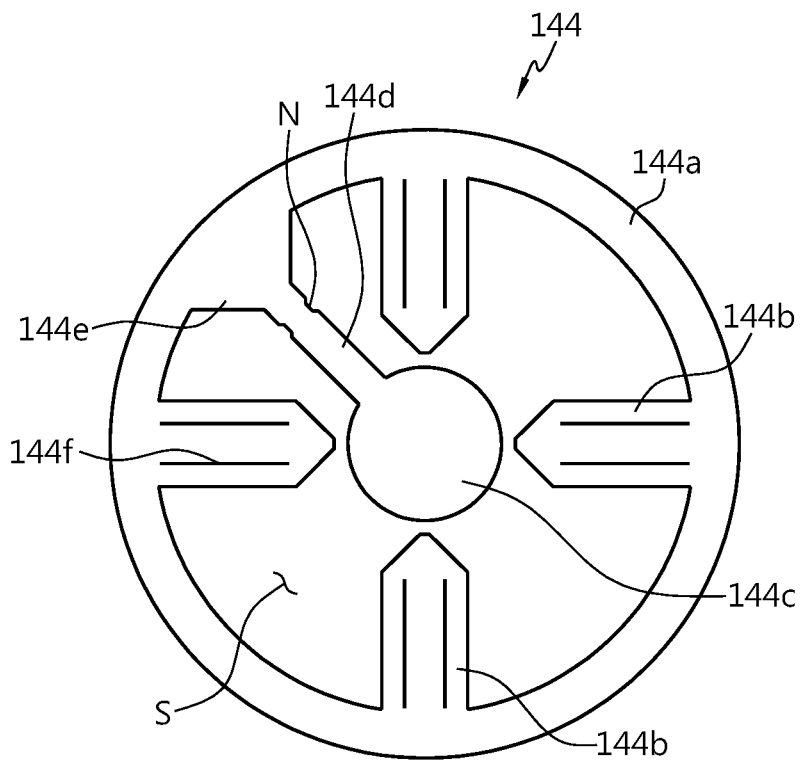
FIG. 12 is a plan view showing a structure of a first current collector according to an embodiment of the present disclosure.
Figure 13:
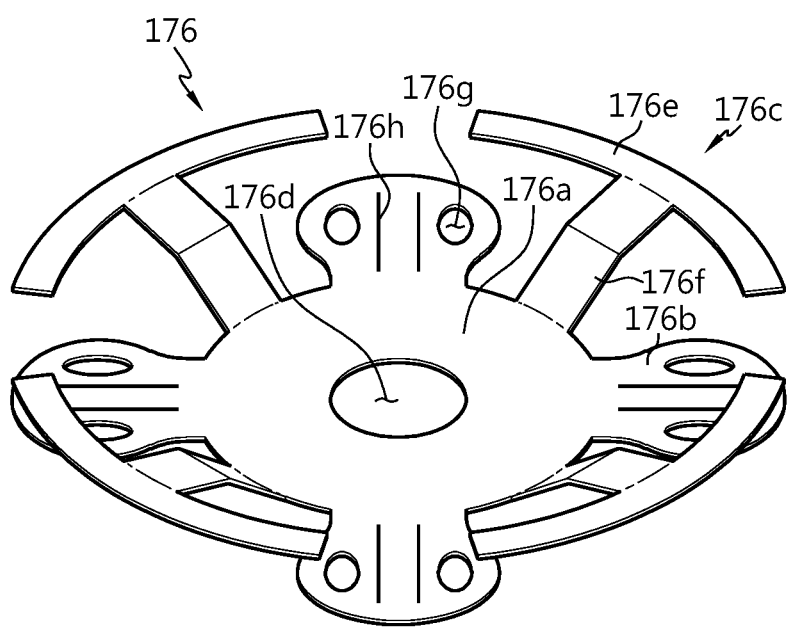
FIG. 13 is a perspective view showing a structure of a second current collector according to an embodiment of the present disclosure.

Meanwhile, the first current collector 144 and the second current collector 176 may have a new structure as shown in FIGS. 12 and 13.

FIG. 12 is a top plan view showing the structure of the first current collector 144 according to an embodiment of the present disclosure.

Referring to FIG. 12, the first current collector 144 may include an edge portion 144a, a first uncoated portion coupling portion 144b, and a terminal coupling portion 144c. The edge portion 144a is disposed on the electrode assembly 110. The edge portion 144a may have a substantially rim shape having an empty space S formed therein. In the drawings of the present disclosure, only a case in which the edge portion 144a has a substantially circular rim shape is illustrated, but the present disclosure is not limited thereto. The edge portion 144a may have a substantially rectangular rim shape, a hexagonal rim shape, an octagonal rim shape, or other rim shapes, unlike the illustrated one.

The terminal coupling portion 144c may have a diameter equal to or greater than the diameter of the flat portion formed on the bottom surface of the terminal 172 in order to secure a welding area for coupling with the flat portion formed on the bottom surface of the terminal 172.

The first uncoated portion coupling portion 144b extends inward from the edge portion 144a and is coupled to the uncoated portion 146a. The terminal coupling portion 144c is spaced apart from the first uncoated portion coupling portion 144b and is positioned inside the edge portion 144a. The terminal coupling portion 144c may be coupled to the terminal 172 by welding. The terminal coupling portion 144c may be located, for example, approximately at the center of the inner space surrounded by the edge portion 144a. The terminal coupling portion 144c may be provided at a position corresponding to the hole formed in the core C of the electrode assembly 110. The terminal coupling portion 144c may be configured to cover the hole formed in the core C of the electrode assembly 110 so that the hole formed in the core C of the electrode assembly 110 is not exposed out of the terminal coupling portion 144c. To this end, the terminal coupling portion 144c may have a larger diameter or width than the hole formed in the core C of the electrode assembly 110.

The first uncoated portion coupling portion 144b and the terminal coupling portion 144c may not be directly connected, but may be disposed to be spaced apart from each other and indirectly connected by the edge portion 144a. Since the first current collector 144 has a structure in which the first uncoated portion coupling portion 144b and the terminal coupling portion 144c are not directly connected to each other but are connected through the edge portion 144c as above, when shock and/or vibration occurs at the cylindrical battery 200, it is possible to disperse the shock applied to the coupling portion between the first uncoated portion coupling portion 144b and the first uncoated portion 146a and the coupling portion between the terminal coupling portion 144c and the terminal 172. In the drawings of the present disclosure, only a case in which four first uncoated portion coupling portions 144b are provided is illustrated, but the present disclosure is not limited thereto. The number of the first uncoated portion coupling portions 144b may be variously determined in consideration of manufacturing difficulty according to the complexity of the shape, electric resistance, the space inside the edge portion 144a considering electrolyte impregnation, and the like.

The first current collector 144 may further include a bridge portion 144d extending inward from the edge portion 144a and connected to the terminal coupling portion 144c. At least a part of the bridge portion 144d may have a smaller sectional area compared to the first uncoated portion coupling portion 144b and the edge portion 144a. For example, at least a part of the bridge portion 144d may be formed to have a smaller width and/or thickness compared to the first uncoated portion coupling portion 144b. In this case, the electric resistance increases in the bridge portion 144d, and thus, when a current flows through the bridge portion 144d, the relatively large resistance causes a part of the bridge portion 144d to be melted due to overcurrent heating, thereby irreversibly blocking the overcurrent. The sectional area of the bridge portion 144d may be adjusted to an appropriate level in consideration of the overcurrent blocking function.

The bridge portion 144d may include a taper portion 144e whose width is gradually decreased from the inner surface of the edge portion 144a toward the terminal coupling portion 144c. When the taper portion 144e is provided, the rigidity of the component may be improved at the connection portion between the bridge portion 144d and the edge portion 144a. When the taper portion 144e is provided, in the process of manufacturing the cylindrical battery 200, for example, a transfer device and/or a worker may easily and safely transport the first current collector 144 and/or a coupled body of the first current collector 144 and the electrode assembly 110 by gripping the taper portion 144e. That is, when the taper portion 144e is provided, it is possible to prevent product defects that may occur by gripping a portion where welding is performed with other components such as the first uncoated portion coupling portion 144b and the terminal coupling portion 144c.

The first uncoated portion coupling portion 144b may be provided in plural. The plurality of first uncoated portion coupling portions 144b may be disposed substantially at regular intervals from each other in the extending direction of the edge portion 144a. An extension length of each of the plurality of first uncoated portion coupling portions 144b may be substantially equal to each other. The first uncoated portion coupling portion 144b may be coupled to the bending surface region ($F_1$) of the uncoated portion 146a by laser welding. The welding pattern 144f formed by welding between the first uncoated portion coupling portion 144b and the bending surface region ($F_1$) may have a structure to extend along the radial direction of the electrode assembly 110. The welding pattern 144f may be a line pattern or a dot array pattern.

The terminal coupling portion 144c may be disposed to be surrounded by the plurality of first uncoated portion coupling portions 144b. The terminal coupling portion 144c may be coupled to the terminal 172 by welding. The bridge portion 144d may be positioned between a pair of first uncoated portion coupling portions 144b adjacent to each other. In this case, the distance from the bridge portion 144d to any one of the pair of first uncoated portion coupling portions 144b along the extending direction of the edge portion 144a may be substantially equal to the distance from the bridge portion 144d to the other one of the pair of first uncoated portion coupling portions 144b along the extending direction of the edge portion 144a. The plurality of first uncoated portion coupling portions 144b may be formed to have substantially the same sectional area. The plurality of first uncoated portion coupling portions 144b may be formed to have substantially the same width and thickness.

Although not shown in the drawings, the bridge portion 144d may be provided in plural. Each of the plurality of bridge portions 144d may be disposed between a pair of first uncoated portion coupling portions 144b adjacent to each other. The plurality of bridge portions 144d may be disposed substantially at regular intervals to each other in the extending direction of the edge portion 144a. A distance from each of the plurality of bridge portions 144d to one of the pair of first uncoated portion coupling portions 144b adjacent to each other along the extending direction of the edge portion 144a may be substantially equal to a distance from each of the plurality of the bridge portion 144d to the other first uncoated portion coupling portion 144b.

In the case where the first uncoated portion coupling portion 144b and/or the bridge portion 144d is provided in plural as described above, if the distance between the first uncoated portion coupling portions 144b and/or the distance between the bridge portions 144d and/or the distance between the first uncoated portion coupling portion 144b and the bridge portion 144d is uniformly formed, a current flowing from the first uncoated portion coupling portion 144b toward the bridge portion 144d or a current flowing from the bridge portion 144d toward the first uncoated portion coupling portion 144b may be smoothly and uniformly formed.

Meanwhile, the first current collector 144 and the bending surface region ($F_1$) of the uncoated portion 146a may be coupled by welding. In this case, laser welding, ultrasonic welding, spot welding, or the like may be applied, for example. Preferably, the welding region may overlap with the stack number uniform region ($W_1$) of the bending surface region ($F_1$) by 50% or more.

The bridge portion 144d may include a notching portion N formed to partially reduce a sectional area of the bridge portion 144d. The sectional area of the notching portion N may be adjusted, for example, by partially reducing the width and/or thickness of the bridge portion 144d. When the notching portion N is provided, electric resistance is increased in the region where the notching portion N is formed, thereby enabling rapid current interruption when overcurrent occurs.

The notching portion N may be provided in a region corresponding to the overlapping layer number uniform region of the electrode assembly 110 in order to prevent foreign substances generated during rupturing from flowing into the electrode assembly 110. This is because, in this region, the number of stacked layers of the segments of the uncoated portion 146a is maintained to the maximum and thus the overlapped segments may function as a mask. For example, the notching portion N may be provided in a region in which the number of stacked layers of the uncoated portion 146a is maximum in the stack number uniform region.

FIG. 13 is a perspective view showing the structure of the second current collector 176 according to an embodiment of the present disclosure.

Referring to FIG. 13, the second current collector 176 is disposed below the electrode assembly 110. In addition, the second current collector 176 may be configured to electrically connect the uncoated portion 146b of the electrode assembly 110 and the battery housing 171. The second current collector 176 is made of a metal material with conductivity and is electrically connected to the uncoated portion 146b. In addition, the second current collector 176 is electrically connected to the battery housing 171. The second current collector 176 may be interposed and fixed between the inner surface of the battery housing 171 and the first gasket 178b. Specifically, the second current collector 176 may be interposed between the lower surface of the beading portion 180 of the battery housing 171 and the first gasket 178b. However, the present disclosure is not limited thereto, and the second current collector 176 may be welded to the inner wall surface of the battery housing 171 in a region where the beading portion 180 is not formed.

The second current collector 176 may include a support portion 176a disposed below the electrode assembly 110, a second uncoated portion coupling portion 176b extending from the support portion 176a approximately along the radial direction of the electrode assembly 110 and coupled to the bending surface region ($F_2$) of the uncoated portion 146b, and a housing coupling portion 176c extending from the support portion 176a approximately along the radial direction of the electrode assembly 110 and coupled to the inner surface of the battery housing 171. The second uncoated portion coupling portion 176b and the housing coupling portion 176c are indirectly connected through the support portion 176a, and are not directly connected to each other. Therefore, when an external shock is applied to the cylindrical battery 200 of the present disclosure, it is possible to minimize the possibility of damage to the coupling portion of the second current collector 176 and the electrode assembly 110 and the coupling portion of the second current collector 176 and the battery housing 171. However, the second current collector 176 of the present disclosure is not limited to the structure where the second uncoated portion coupling portion 176b and the housing coupling portion 176c are only indirectly connected. For example, the second current collector 176 may have a structure that does not include the support portion 176a for indirectly connecting the second uncoated portion coupling portion 176b and the housing coupling portion 176c and/or a structure in which the uncoated portion 146b and the housing coupling portion 176c are directly connected to each other.

The support portion 176a and the second uncoated portion coupling portion 176b are disposed below the electrode assembly 110. The second uncoated portion coupling portion 176b is coupled to the bending surface region ($F_2$) of the uncoated portion 146b. In addition to the second uncoated portion coupling portion 176b, the support portion 176a may also be coupled to the uncoated portion 146b. The second uncoated portion coupling portion 176b and the uncoated portion 146b may be coupled by welding. The support portion 176a and the second uncoated portion coupling portion 176b are located higher than the beading portion 180 when the beading portion 180 is formed on the battery housing 171.

The support portion 176a has a current collector hole 176d formed at a location corresponding to the hole formed at the core C of the electrode assembly 110. The core C of the electrode assembly 110 and the current collector hole 176d communicating with each other may function as a passage for inserting a welding rod for welding between the terminal 172 and the terminal coupling portion 144c of the first current collector 144 or for irradiating a laser beam. The current collector hole 176d may have a diameter substantially equal to or greater than the hole formed in the core C of the electrode assembly 110. When the second uncoated portion coupling portion 176b is provided in plural, the plurality of second uncoated portion coupling portions 176b may have a shape extending approximately radially from the support portion 176a of the second current collector 176 toward the sidewall of the battery housing 171. The plurality of second uncoated portion coupling portions 176b may be positioned to be spaced apart from each other along the periphery of the support portion 176a.

The housing coupling portion 176c may be provided in plural. In this case, the plurality of housing coupling portions 176c may have a shape extending approximately radially from the center of the second current collector 176 toward the sidewall of the battery housing 171. Accordingly, the electrical connection between the second current collector 176 and the battery housing 171 may be made at a plurality of points. Since the coupling for electrical connection is made at a plurality of points, the coupling area may be maximized, thereby minimizing electric resistance. The plurality of housing coupling portions 176c may be positioned to be spaced apart from each other along the periphery of the support portion 176a. At least one housing coupling portion 176c may be positioned between the second uncoated portion coupling portions 176b adjacent to each other. The plurality of housing coupling portions 176c may be coupled to, for example, the beading portion 180 in the inner surface of the battery housing 171. The housing coupling portions 176c may be coupled, particularly, to the lower surface of the beading portion 180 by welding. The welding may employ, for example, laser welding, ultrasonic welding, or spot welding. By coupling the housing coupling portions 176c on the beading portion 180 by welding in this way, the resistance level of the cylindrical battery 200 may be limited to about 4 milliohms or less. In addition, as the lower surface of the beading portion 180 has a shape extending in a direction approximately parallel to the upper surface of the battery housing 171, namely in a direction approximately perpendicular to the sidewall of the battery housing 171, and the housing coupling portion 176c also has a shape extending in the same direction, namely in the radial direction and the circumferential direction, the housing coupling portion 176c may be stably in contact with the beading portion 180. In addition, as the housing coupling portion 176c is stably in contact with the flat portion of the beading portion 180, the two components may be welded smoothly, thereby improving the coupling force between the two components and minimizing the increase in resistance at the coupling portion.

The housing coupling portion 176c may include a contact portion 176e coupled onto the inner surface of the battery housing 171 and a connection portion 176f for connecting the support portion 176a and the contact portion 176e.

The contact portion 176e is coupled onto the inner surface of the battery housing 171. In the case where the beading portion 180 is formed on the battery housing 171, the contact portion 176e may be coupled onto the beading portion 180 as described above. More specifically, the contact portion 176e may be electrically coupled to the flat portion formed at the lower surface of the beading portion 180 formed on the battery housing 171, and may be interposed between the lower surface of the beading portion 180 and the first gasket 178b. In this case, for stable contact and coupling, the contact portion 176e may have a shape extending from the beading portion 180 by a predetermined length along the circumferential direction of the battery housing 171.

Meanwhile, the maximum distance from the center of the second current collector 176 to the end of the second uncoated portion coupling portion 176b along the radial direction of the electrode assembly 110 may be equal to or smaller than the inner diameter of the battery housing 171 in a region where the beading portion 180 is formed, namely the minimum inner diameter of the battery housing 171. This is to prevent the second current collector 176 from being interfered by the beading portion 180 during the sizing process of compressing the battery housing 171 along the height direction, and thus to prevent the electrode assembly 110 from being pressed by the second current collector 176.

The second uncoated portion coupling portion 176b includes a hole 176g. The hole 176g may be used as a passage through which the electrolyte may move. The welding pattern 176h formed by welding between the second uncoated portion coupling portion 176b and the bending surface region ($F_2$) may have a structure to extend along the radial direction of the electrode assembly 110. The welding pattern 176h may be a line pattern or a dot array pattern.

The cylindrical battery 200 according to an embodiment of the present disclosure have an advantage in that electrical connection can be performed at the upper portion thereof.

Figure 14:
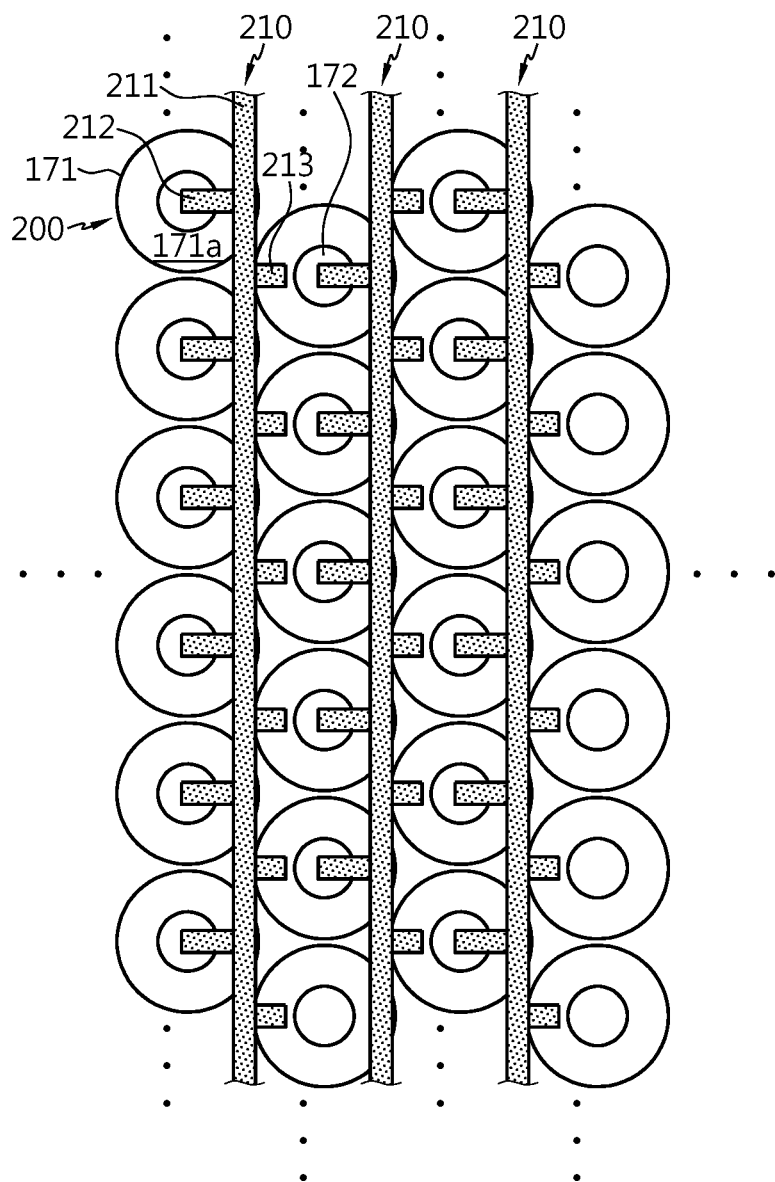
FIG. 14 is a plan view showing a state in which a plurality of cylindrical batteries are electrically connected according to an embodiment of the present disclosure.
Figure 15:
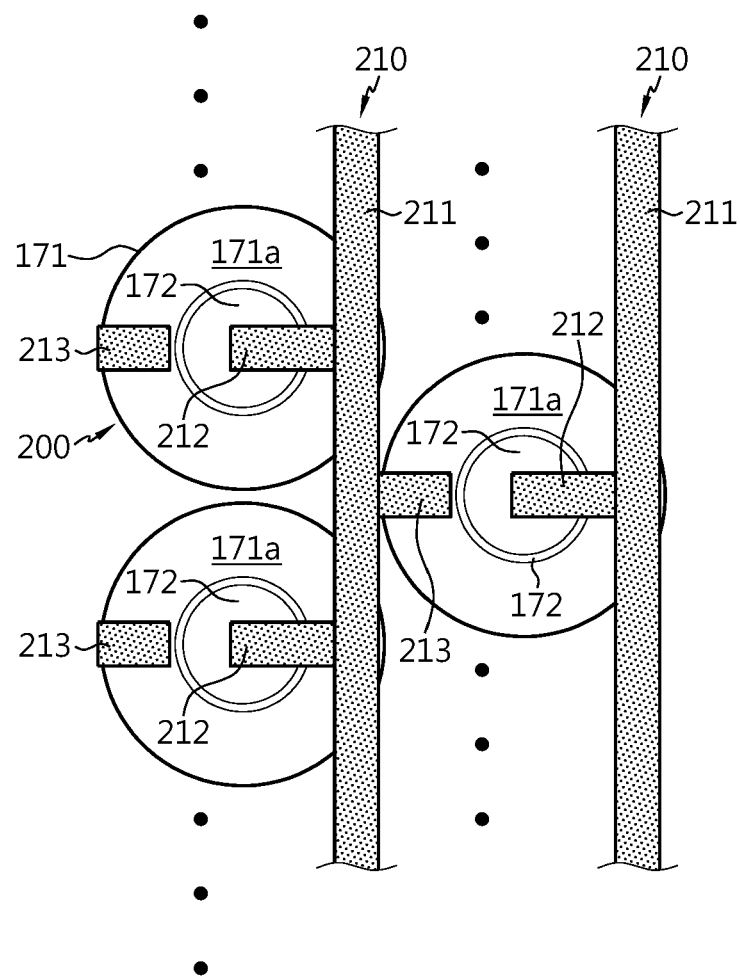
FIG. 15 is a partially enlarged plan view showing the electrical connection of the plurality of cylindrical batteries of FIG. 14 in detail.

FIG. 14 is a top plan view illustrating a state in which a plurality of cylindrical batteries 200 are electrically connected, and FIG. 15 is a partially enlarged view of FIG. 14.

Referring to FIGS. 14 and 15, a plurality of cylindrical batteries 200 may be connected in series and in parallel at an upper portion of the cylindrical batteries 200 using a bus bar 210. The number of cylindrical batteries 200 may be increased or decreased in consideration of the capacity of the battery pack.

In each cylindrical battery 200, the terminal 172 may have a positive polarity, and the flat surface 171a around the terminal 172 of the battery housing 171 may have a negative polarity, or vice versa.

Preferably, the plurality of cylindrical batteries 200 may be arranged in a plurality of columns and rows. Columns are provided in a vertical direction with respect to the drawing, and rows are provided in a left and right direction with respect to the drawing. In addition, in order to maximize space efficiency, the cylindrical batteries 200 may be arranged in a closest packing structure. The closest packing structure is formed when an equilateral triangle is formed by connecting the centers of the terminals 172 exposed out of the battery housing 171 to each other. Preferably, the bus bar 210 connects the cylindrical batteries 200 arranged in the same column in parallel to each other, and connects the cylindrical batteries 200 arranged in two neighboring columns in series with each other.

Preferably, the bus bar 210 may include a body portion 211, a plurality of first bus bar terminals 212 and a plurality of second bus bar terminals 213 for serial and parallel connection. The body portion 211 may extend along the column of the cylindrical battery 200 between neighboring terminals 172. Alternatively, the body portion 211 may extend along the row of the cylindrical batteries 1 and may be regularly bent like a zigzag shape.

The plurality of first bus bar terminals 212 may extend from one side of the body portion 211 and may be electrically coupled to the terminal 172 of the cylindrical battery 200 located in the extending direction. The electrical connection between the first bus bar terminal 212 and the terminal 172 may be achieved by laser welding, ultrasonic welding, or the like.

The plurality of second bus bar terminals 213 may extend from the other side of the body portion 211 and may be electrically coupled to the flat surface 171a around the terminal 172 located in the extending direction. The electrical coupling between the second bus bar terminal 213 and the flat surface 171a may be performed by laser welding, ultrasonic welding, or the like.

Preferably, the body portion 211, the plurality of first bus bar terminals 212 and the plurality of second bus bar terminals 213 may be made of one conductive metal plate. The metal plate may be, for example, an aluminum plate or a copper plate, but the present disclosure is not limited thereto. In a modified example, the body portion 211, the plurality of first bus bar terminals 212 and the second bus bar terminals 213 may be manufactured as separate pieces and then coupled to each other by welding or the like.

The cylindrical battery 200 of the present disclosure as described above has a structure in which resistance is minimized by enlarging the welding area by means of the bending surface region $F_1$ and $F_2$, multiplexing current paths by means of the second current collector 176, minimizing a current path length, or the like. The AC resistance of the cylindrical battery 200 measured through a resistance meter between the positive electrode and the negative electrode, namely between the terminal 172 and the flat surface 171a around the terminal 172, may be about 4 milliohms or below, but greater than 0 milliohms, such as 0.01 milliohms, suitable for fast charging.

In the cylindrical battery 200 according to the present disclosure, since the terminal 172 having a positive polarity and the flat surface 171a having a negative polarity are located in the same direction, it is easy to electrically connect the cylindrical batteries 200 using the bus bar 210.

In addition, since the terminal 172 of the cylindrical battery 200 and the flat surface 171a around the terminal 172 have a large area, the coupling area of the bus bar 210 may be sufficiently secured to sufficiently reduce the resistance of the battery pack including the cylindrical battery 200.

The cylindrical battery according to the above embodiments (modifications) may be used to manufacture a battery pack.

Figure 16:
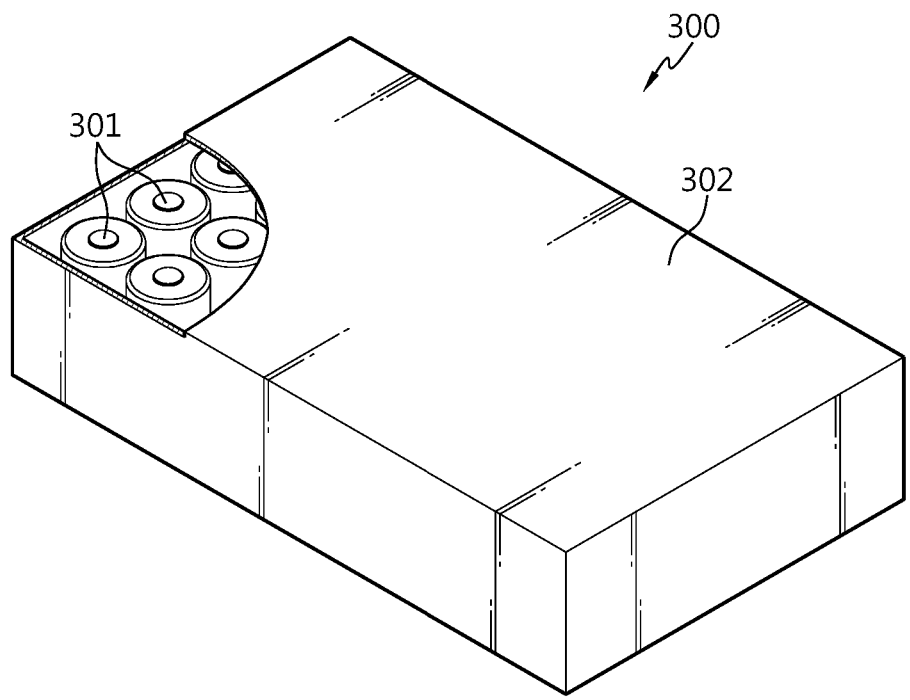
FIG. 16 is a diagram schematically showing a battery pack including the cylindrical battery according to an embodiment of the present disclosure.

FIG. 16 is a diagram schematically showing a battery pack according to an embodiment of the present disclosure.

Referring to FIG. 16, a battery pack 300 according to an embodiment of the present disclosure includes an aggregate in which cylindrical batteries 301 are electrically connected, and a pack housing 302 for accommodating the aggregate. The cylindrical battery 301 may be any one of the batteries according to the above embodiments (modifications). In the drawing, components such as a bus bar, a cooling unit, and an external terminal for electrical connection of the cylindrical batteries 301 are not depicted for convenience of illustration.

The battery pack 300 may be mounted to a vehicle. The vehicle may be, for example, an electric vehicle, a hybrid electric vehicle, or a plug-in hybrid vehicle. The vehicle includes a four-wheeled vehicle or a two-wheeled vehicle.

Figure 17:
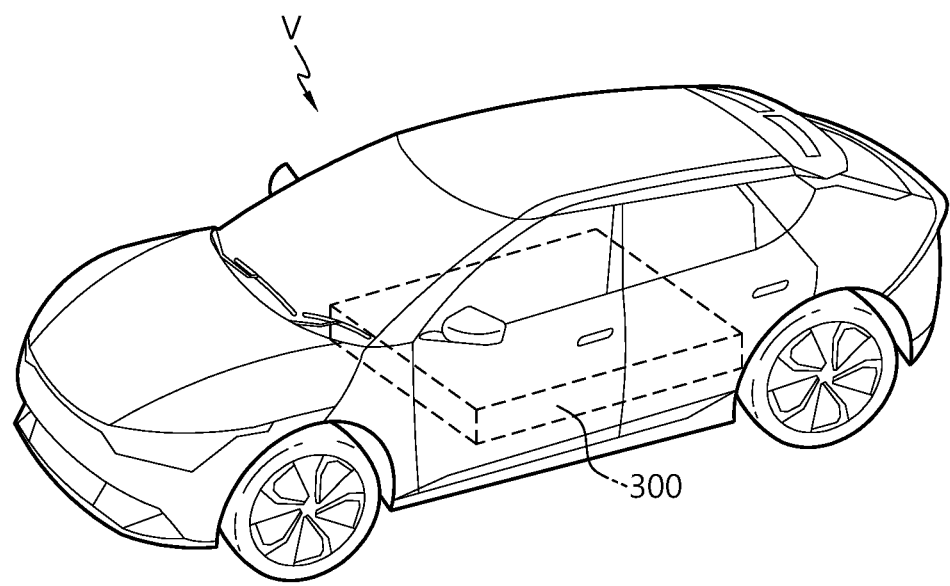
FIG. 17 is a diagram showing a vehicle including the battery pack according to an embodiment of the present disclosure.

FIG. 17 is a diagram schematically showing a vehicle including the battery pack 300 of FIG. 16.

Referring to FIG. 17, a vehicle V according to an embodiment of the present disclosure includes the battery pack 300 according to an embodiment of the present disclosure. The vehicle V operates by receiving power from the battery pack 300 according to an embodiment of the present disclosure.

According to an embodiment of the present disclosure, when bending the uncoated portions exposed at both ends of the electrode assembly, it is possible to prevent the separator or the active material layer from being damaged when welding the current collector by sufficiently securing an area where the uncoated portion is overlapped into 10 or more layers in the radial direction of the electrode assembly.

According to still another embodiment of the present disclosure, since the structure of the uncoated portion adjacent to the core of the electrode assembly is improved, it is possible to prevent the cavity in the core of the electrode assembly from being blocked when the uncoated portion is bent. Thus, the electrolyte injection process and the process of welding the battery housing and the current collector may be carried out easily.

According to still another embodiment of the present disclosure, since the bending surface region of the uncoated portion is directly welded to the current collector instead of a strip-shaped electrode tab, it is possible to provide an electrode assembly with improved energy density and reduced resistance.

According to still another embodiment of the present disclosure, it is possible to provide a cylindrical battery having a structure that has a low internal resistance and improves welding strength between the current collector and the uncoated portion, and a battery pack and a vehicle including the cylindrical battery.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An electrode assembly, comprising:
   a first electrode;
   a second electrode; and
   a separator between the first electrode and the second electrode, the first electrode, the second electrode, and the separator wound about an axis defining a core and an outer circumference of the electrode assembly,
   wherein the first electrode includes a first portion coated with an active material and a second portion at a first side and adjacent the first portion, the second portion being exposed beyond the separator along a first axial direction of the electrode assembly,
   wherein a part of the second portion is bent in a radial direction of the electrode assembly forming a first surface region including stacked layers of the second portion,
   wherein, in a partial region of the first surface region, a number of the stacked layers of the second portion is 10 or more in the first axial direction,
   wherein the second portion includes a plurality of segments, and
   wherein segments immediately adjacent each other in the radial direction of the electrode assembly are offset in a circumferential direction of the electrode assembly.

2. The electrode assembly according to claim 1,
   wherein a number of total winding turns of the first electrode is defined as $n_1$,
   wherein a relative radial position $R_{1,k}$ is defined by dividing a winding turn index k at a $k^{th}$ winding turn location of the first electrode by the number of total winding turns $n_1$, k being a natural number of 1 to $n_1$, and
   wherein a ratio between a length of a radial region including the relative radial position $R_{1,k}$ having 10 or more stacked layers of the second portion and a length of the first surface region is 30% or more.

3. The electrode assembly according to claim 2,
   wherein the ratio is 30% to 85%.

4. The electrode assembly according to claim 1,
   wherein the second electrode includes a third portion coated with an active material and a fourth portion at a second side and adjacent the third portion, the fourth portion being exposed beyond the separator along a second axial direction of the electrode assembly,
   wherein a part of the fourth portion is bent in the radial direction of the electrode assembly forming a second surface region including stacked layers of the fourth portion, and
   wherein, in a partial region of the second surface region, a number of the stacked layers of the fourth portion is 10 or more in the second axial direction of the electrode assembly.

5. The electrode assembly according to claim 4,
   wherein a number of total winding turns of the second electrode is defined as $n_2$,
   wherein a relative radial position $R_{2,k}$ is defined by dividing a winding turn index k at a $k^{th}$ winding turn location of the second electrode by the number of total winding turns $n_2$, k being a natural number of 1 to $n_2$, and
   wherein a ratio between a length of a radial region including the relative radial position $R_{2,k}$ having 10 or more stacked layers of the fourth portion and a length of the second surface region is 30% or more.

6. The electrode assembly according to claim 5,
   wherein the ratio is 30% to 85%.

7. The electrode assembly according to claim 2,
   wherein a region of the second portion from a relative radial position $R_{1,1}$ of a $1^{st}$ winding turn of the first electrode to a relative radial position $R_{1,k}*$ of a $k^{*th}$ winding turn of the first electrode has a smaller height than a region of the second portion from a relative radial position $R_{1,k*+1}$ of a $k*+1^{th}$ winding turn of the first electrode to a relative radial position of a $n_1^{th}$ winding turn of the first electrode.

8. The electrode assembly according to claim 2,
   wherein a region of the second portion from a relative radial position $R_{1,1}$ of $1^{st}$ winding turn of the first electrode to a relative radial position $R_{1,k}*$ of a $k^{*th}$ winding turn of the first electrode has a smaller height than the first surface region.

9. The electrode assembly according to claim 2,
   wherein a region of the second portion from a relative radial position $R_{1,1}$ of a $1^{st}$ winding turn of the first electrode to a relative radial position $R_{1,k}*$ of a $k^{*th}$ winding turn includes one or more layers of the second portion not bent toward the core of the electrode assembly.

10. The electrode assembly according to claim 5,
    wherein a region of the fourth portion from a relative radial position $R_{2,1}$ of $1^{st}$ winding turn of the second electrode to a relative radial position $R_{2,k}{}^*$ of a $k^{*th}$ winding turn of the second electrode has a smaller height than a region of the fourth portion from a relative radial position $R_{2,k^*+1}$ of a $k^*+1^{th}$ winding turn of the second electrode to a relative radial position of a $n_2{}^{th}$ winding turn of the second electrode.

11. The electrode assembly according to claim 5, wherein a region of the fourth portion from a relative radial position $R_{2,1}$ of a $1^{st}$ winding turn of the second electrode to a relative radial position $R_{2,k}{}^*$ of a $k^{*th}$ winding turn of the second electrode has a smaller height than the second surface region.

12. The electrode assembly according to claim 5, wherein a region of the fourth portion from a relative radial position $R_{2,1}$ of a $1^{st}$ winding turn of the second electrode to a relative radial position $R_{2,k}{}^*$ of a $k^{*th}$ winding turn of the second electrode includes one or more layers of the fourth portion not bent toward the core of the electrode assembly.

13. The electrode assembly according to claim 4, wherein the fourth portion includes a plurality of segments, each of the plurality of segments being bendable.

14. The electrode assembly according to claim 13, wherein each of the plurality of segments has a geometric shape including a base at a bending line of each of the plurality of the segments, and wherein the geometric shape includes one or more straight lines, one or more curves, or a combination thereof.

15. The electrode assembly according to claim 14, wherein the geometric shape has a width decreasing stepwise or gradually from the base to a top of the geometric shape.

16. The electrode assembly according to claim 15, wherein a lower internal angle of the geometric shape between the base and a side of at least one of the plurality of segments intersecting the base is 60 degrees to 85 degrees.

17. The electrode assembly according to claim 16, wherein the plurality of segments has a plurality of lower internal angles, the plurality of lower internal angles increasing stepwise or gradually along a direction parallel to a winding direction of the electrode assembly.

18. The electrode assembly according to claim 14, wherein each of the plurality of segments has a geometric shape having a base at a bending line of each of the plurality of segments, and wherein a lower internal angle $\theta_{assumption}$ and a lower internal angle $\theta_{real}$ of each of the plurality of segments satisfies the following formula:

$$\theta_{real} > \theta_{assumption}; \text{ and}$$

$$\theta_{assumption} = 90° - 360° * (L_{arc}/2\pi r) * 0.5,$$

wherein $\theta_{assumption}$ is a lower internal angle of each of the plurality of segments at a winding turn based on adjacent sides of a pair of the plurality of segments being parallel, wherein $\theta_{real}$ is an actual lower internal angle at the winding turn, wherein r is a radius of the winding turn from a core center of the electrode assembly to each of the plurality of segments at the winding turn, and wherein $L_{arc}$ is an arc length corresponding to a lower portion of each of the plurality of segments at the winding turn.

19. The electrode assembly according to claim 18, wherein a circumferential angle corresponding to the $L_{arc}$ is 45 degrees or less.

20. The electrode assembly according to claim 18, wherein an overlapping ratio of the adjacent sides of the pair of the plurality of segments at the winding turn satisfies the following formula:

$$\theta_{real}/\theta_{assumption} - 1,$$

wherein the overlapping ratio of the pair of the plurality of segments is greater than 0 and less than 0.05.

21. The electrode assembly according to claim 14, wherein a virtual circle passing through an adjacent pair of the plurality of segments at a winding turn having a radius from a core center of the electrode includes a pair of arcs passing through each segment of the adjacent pair of the plurality of segments overlapping with each other.

22. The electrode assembly according to claim 21, wherein a ratio between a length of an overlapping arc of the pair of arcs to a length of each arc of the pair of arcs passing through each of the pair of the plurality segments is defined as an overlapping ratio, and wherein the overlapping ratio is greater than 0 and less than 0.05.

23. The electrode assembly according to claim 2, wherein a region of the second portion from a relative radial position $R_{1,1}$ of a $1^{st}$ winding turn of the first electrode to a relative radial position $R_{1,k}{}^*$ of a $k^{*th}$ winding turn of the first electrode has a smaller height than a region of the second portion from a relative radial position $R_{1,k^*+1}$ of a $k^*+1^{th}$ winding turn of the first electrode to a relative radial position of a $n_1{}^{th}$ winding turn of the first electrode, and wherein the region from the relative radial position $R_{1,1}$ of the $1^{st}$ winding turn to the relative radial position $R_{1,k}{}^*$ of the $k^{*th}$ winding turn is not bent toward the core.

24. The electrode assembly according to claim 23, wherein a length of the first electrode corresponding to the region from the relative radial position $R_{1,1}$ to the relative radial position $R_{1,k}{}^*$ is 1% to 30% compared to a length of the first electrode corresponding to the region from the relative radial position $R_{1,k^*+1}$ to the relative radial position of the $n_1{}^{th}$ winding turn of the first electrode.

25. The electrode assembly according to claim 2, wherein a bending length $fd_{1,k^*+1}$ of the second portion at a relative radial position $R_{1,k^*+1}$ of a $k^*+1^{th}$ winding turn of the first electrode is shorter than a radial length from a relative radial position $R_{1,1}$ of $1^{st}$ winding turn of the first electrode to a relative radial position $R_{1,k}{}^*$ of a $k^{*th}$ winding turn of the first electrode.

26. The electrode assembly according to claim 2, wherein a radius of the core of the electrode assembly is defined as $r_c$, and wherein a region from a center of the core to $0.90r_c$ is not blocked by a bent portion of the second portion located in a region from a relative radial position $R_{1,k^*+1}$ of a $k^*+1^{th}$ winding turn of the first electrode to a relative radial position of a $n_1{}^{th}$ winding turn of the first electrode.

27. The electrode assembly according to claim 26, wherein a bending length $fd_{1,k^*+1}$ of the second portion at the relative radial position $R_{1,k^*+1}$ of the $k^*+1^{th}$ winding turn, the radius $r_c$ of the core, and a distance $d_{1,k^*+1}$ from a center of the electrode assembly to the relative radial position $R_{1,k^*+1}$ satisfy the following formula:

$$fd_{1,k^*+1} + 0.90 * r_c \leq d_{1,k^*+1}.$$

28. The electrode assembly according to claim 5,
wherein a region of the fourth portion from a relative radial position $R_{2,1}$ of a $1^{st}$ winding turn of the second electrode to a relative radial position $R_{2,k}*$ of a $k*^{th}$ winding turn has a smaller height than a region of the fourth portion from a relative radial position $R_{2,k*+1}$ of a $k*+1^{th}$ winding turn of the second electrode to a relative radial position of $n_2^{th}$ winding turn of the second electrode, and
wherein the region from the relative radial position $R_{2,1}$ of the $1^{st}$ winding turn to the relative radial position $R_{2,k}*$ of a $k*^{th}$ winding turn is not bent toward the core.

29. The electrode assembly according to claim 28,
wherein a length of the second electrode corresponding to the region from the relative radial position $R_{2,1}$ to the relative radial position $R_{2,k}*$ is 1% to 30% compared to a length of the second electrode corresponding to the region from the relative radial position $R_{2,k*+1}$ to the relative radial position of $n_2^{th}$ winding turn of the second electrode.

30. The electrode assembly according to claim 5,
wherein a bending length $fd_{2,k*+1}$ of the fourth portion at a relative radial position $R_{2,k*+1}$ of a $k*+1^{th}$ winding turn of the second electrode is shorter than a radial length from a relative radial position $R_{2,1}$ of a $1^{st}$ winding turn of the second electrode to a relative radial position $R_{1,k}*$ of a $k*^{th}$ winding turn of the second electrode.

31. The electrode assembly according to claim 5,
wherein a radius of the core of the electrode assembly is defined as $r_c$, and
wherein a region from a center of the core to $0.90r_c$ is not blocked by a bent portion of the fourth portion of the second electrode located in a region from a relative radial position $R_{2,k*+1}$ of a $k*+1^{th}$ winding turn of the second electrode to a relative radial position of a $n_2^{th}$ winding turn of the first electrode.

32. The electrode assembly according to claim 31,
wherein a bending length $fd_{2,k*+1}$ of the fourth portion at the relative radial position $R_{2,k*+1}$ of a $k*+1^{th}$ winding turn, the radius $r_c$ of the core, and a distance $d_{2,k*+1}$ from a center of the electrode assembly to the relative radial position $R_{2,k*+1}$ satisfy the following formula:

$$fd_{2,k*+1}+0.90*r_c \leq d_{2,k*+1}.$$

33. The electrode assembly according to claim 2,
wherein a region of the second portion from a relative radial position $R_{1,k*+1}$ of a $k*+1^{th}$ winding turn of the first electrode to a relative radial position $R_{1,k@}$ of a $k@^{th}$ winding turn of the first electrode is divided into the plurality of segments, heights of the plurality of segments increasing gradually or stepwise along a direction parallel to a winding direction of the first electrode.

34. The electrode assembly according to claim 33,
wherein a radial length of the region from the relative radial position $R_{1,k*+1}$ to the relative radial position $R_{1,k@}$ is 1% to 56% compared to a radial length of a region from a relative radial position $R_{1,1}$ of a $1^{st}$ winding turn of the first electrode to a relative radial position of a $n_1^{th}$ turn of the first electrode.

35. The electrode assembly according to claim 2,
wherein a region of the second portion from a relative radial position $R_{1,k@+1}$ of a $k@+1^{th}$ winding turn of the first electrode to a relative radial position of a $n_1^{th}$ turn of the first electrode is divided the plurality of segments, the plurality of segments having substantially a same height from the relative radial position $R_{1,k@+1}$ to the relative radial position of the $n_1^{th}$ turn of the first electrode.

36. The electrode assembly according to claim 5,
wherein a region of the fourth portion from a relative radial position $R_{2,k*+1}$ of a $k*+1^{th}$ winding turn of the second electrode to a relative radial position $R_{2,k@}$ of a $k@^{th}$ winding turn of the second electrode is divided into the plurality of segments, heights of the plurality of segments increasing stepwise or gradually along a direction parallel to a winding direction of the second electrode.

37. The electrode assembly according to claim 36,
wherein a radial length of the region from the relative radial position $R_{2,k*+1}$ to the relative radial position $R_{2,k@}$ is 1% to 56% compared to a radial length of a region from a relative radial position $R_{2,1}$ of a $1^{st}$ winding turn of the second electrode to a relative radial position of a $n_2^{th}$ turn of the second electrode.

38. The electrode assembly according to claim 5,
wherein a region of the fourth portion from a relative radial position $R_{2,k@+1}$ of a $k@+1^{th}$ winding turn of the second electrode to a relative radial position of a $n_2^{th}$ turn of the second electrode is divided into the plurality of segments, the plurality of segments having substantially a same height from the relative radial position $R_{2,k@+1}$ to the relative radial position of the $n_2^{th}$ turn of the second electrode.

39. The electrode assembly according to claim 1,
wherein, a region of the second portion is divided into the plurality of segments that are independently bendable, and
wherein one or more heights of the plurality of segments in the first axial direction or one or more widths of the plurality of segments in a winding direction of the first electrode increases gradually or stepwise along a direction parallel to the winding direction of the first electrode individually or in groups.

40. The electrode assembly according to claim 4,
wherein a region of the fourth portion is divided into a plurality of segments that are independently bendable, and
wherein one or more heights of the plurality of segments in the second axial direction or one or more widths of the plurality of segments in a winding direction of the second electrode increases gradually or stepwise along a direction parallel to the winding direction of the second electrode individually or in groups.

41. The electrode assembly according to claim 13,
wherein each of the plurality of segments of the second portion or the fourth portion has a width condition of 1 mm to 11 mm in the radial direction, a height condition of 2 mm to 10 mm in the first axial direction or the second axial direction, or a separation pitch condition of 0.05 mm to 1 mm in the winding direction.

42. The electrode assembly according to claim 13, further comprising:
a cut groove between the plurality of segments of the second portion or the fourth portion; and
a predetermined gap between a bottom of the cut groove.

43. The electrode assembly according to claim 42,
wherein the predetermined gap has a length of 0.2 mm to 4 mm.

44. The electrode assembly according to claim 13,
wherein the plurality of segments of the second portion or the fourth portion includes a plurality of segment groups along a winding direction of the first electrode or the second electrode, and wherein segments belonging to a same segment group of the plurality of segment groups have a substantially the same width in the winding direction, height in the first axial direction or the second axial direction, or separation pitch in the winding direction.

45. The electrode assembly according to claim 44, wherein the segments belonging to the same segment group are formed with the width in the winding direction, the height in the first axial direction or the second axial direction, or the separation pitch in the winding direction increasing gradually or stepwise along a direction parallel to the winding direction of the first electrode or the second electrode.

46. The electrode assembly according to claim 44, wherein at least a part of the plurality of segment groups are disposed at a same winding turn of the electrode assembly.

47. The electrode assembly according to claim 1, wherein the first surface region includes a stack number increasing region and a stack number uniform region from the outer circumference of the electrode assembly to the core, wherein the stack number increasing region is a region having an increasing number of the stacked layers of the second portion toward to the core of the electrode assembly, wherein the stack number uniform region is a region from a radial position where the increasing number of the stacked layers of the second portion stops to a radial position where the second portion starts to bend, and wherein a radial length of the stack number uniform region is 30% or more compared to a radial length from a winding turn where the second portion starts bending to a winding turn where the second portion stops bending.

48. The electrode assembly according to claim 5, wherein the second surface region includes a stack number increasing region and a stack number uniform region from the outer circumference of the electrode assembly to the core, wherein the stack number increasing region is a region having an increasing number of stacked layers of the fourth portion toward to the core of the electrode assembly, wherein the stack number uniform region is a region from a radial position where the increasing number of the stacked layers of the fourth portion stops to a radial position where a number of stacked layers of the fourth portion starts to bend, and wherein a radial length of the stack number uniform region is 30% or more compared to a radial length from a winding turn where the fourth portion starts bending to a winding turn where the fourth portion stops bending.

49. The electrode assembly according to claim 4, wherein the first electrode and the second electrode have a thickness of 80 μm to 250 μm, and wherein an interval of the second portion and the fourth portion at adjacent winding turns in the radial direction of the electrode assembly is 200 μm to 500 μm.

50. The electrode assembly according to claim 1, wherein the second portion of the first electrode has a thickness of 10 μm to 25 μm.

51. The electrode assembly according to claim 4, wherein the fourth portion of the second electrode has a thickness of 5 μm to 20 μm.

52. The electrode assembly according to claim 1, wherein, in the partial region of the first surface region, a total stack thickness of the stacked layers of the second portion is 100 μm to 975 μm.

53. The electrode assembly according to claim 52, wherein the second portion includes the plurality of segments that are independently bendable, wherein the first electrode includes a height variable region having the plurality of segments with variable heights and a height uniform region having the plurality of segments with a substantially uniform height, and wherein a ratio of a stack thickness of the second portion in the first surface region to the substantially uniform height of the plurality of segments in the height uniform region is 1.0% to 16.3%.

54. The electrode assembly according to claim 4, wherein, in the partial region of the second surface region, a total stack thickness of stacked layers of the fourth portion is 50 μm to 780 μm.

55. The electrode assembly according to claim 54, wherein the fourth portion includes a plurality of segments that are independently bendable, wherein the second electrode includes a height variable region having the plurality of segments with variable heights and a height uniform region having the plurality of segments with a substantially uniform height, and wherein a ratio of a stack thickness of the fourth portion of the second surface region to the substantially uniform height of the plurality of segments in the height uniform region is 0.5% to 13.0%.

56. An electrode assembly, comprising:
a first electrode;
a second electrode; and
a separator between the first electrode and the second electrode, the first electrode, the second electrode, and the separator wound about an axis defining a core and an outer circumference, wherein the first electrode includes a first portion coated with an active material and a second portion at a first side and adjacent to the first portion, the second portion being exposed beyond the separator along a first axial direction of the electrode assembly, wherein a part of the second portion is bent in a radial direction of the electrode assembly forming a first surface region, wherein, in a partial region of the first surface region, a stack thickness of the second portion is 100 μm to 975 μm, wherein the second portion includes a plurality of segments, and wherein segments immediately adjacent each other in the radial direction of the electrode assembly are offset in a circumferential direction of the electrode assembly.

57. The electrode assembly according to claim 56, wherein the second portion of the first electrode includes the plurality of segments that are independently bendable, wherein the first electrode includes a height variable region having the plurality of segments with variable heights and a height uniform region with the plurality of segments having a substantially uniform height, and wherein a ratio of a stack thickness of the second portion in the first surface region to the substantially uniform height of the plurality of segments in the height uniform region is 1.0% to 16.3%.

58. An electrode assembly, comprising:

a first electrode;

a second electrode; and a separator between the first electrode and the second electrode, the first electrode, the second electrode, and the separator wound about an axis defining a core and an outer circumference, wherein the first electrode includes a first portion coated with an active material and a second portion at a first side and adjacent to the first portion, the second portion being exposed beyond the separator along a first axial direction of the electrode assembly, wherein the second electrode includes a third portion coated with an active material and a fourth portion at a second side and adjacent to the third portion, and the fourth portion being exposed beyond the separator along a second axial direction of the electrode assembly, wherein a part of the fourth portion is bent in a radial direction of the electrode assembly forming a second surface region, wherein, in a partial region of the second surface region, a stack thickness of the fourth portion is 50 μm to 780 μm, wherein the fourth portion includes a plurality of segments, and wherein segments immediately adjacent each other in the radial direction of the electrode assembly are offset in a circumferential direction of the electrode assembly.

59. The electrode assembly according to claim 58, wherein the fourth portion includes a plurality of segments that are independently bendable, wherein the second electrode includes a height variable region having the plurality of segments with variable heights and a height uniform region having the plurality of segments with a substantially uniform height, and wherein a ratio of a stack thickness of the fourth portion of the second surface region to the substantially uniform height of the segment is 0.5% to 13.0%.

60. A battery, comprising:

an electrode assembly comprising:

a first electrode;

a second electrode; and a separator between the first electrode and the second electrode, the first electrode, the second electrode, and the separator wound about an axis defining a core and an outer circumference, wherein at least one of the first electrode or the second electrode includes a first portion coated with an active material and a second portion at a first side and adjacent to the first portion, the second portion being exposed beyond the separator along a first axial direction of the electrode assembly, wherein at least a part of the second portion is bent in a radial direction of the electrode assembly forming a first surface region including stacked layers of the second portion, wherein, in a partial region of the first surface region, a number of the stacked layers of the second portion is 10 or more, wherein the second portion includes a plurality of segments, and wherein segments immediately adjacent each other in the radial direction of the electrode assembly are offset in a circumferential direction of the electrode assembly;

a battery housing accommodating the electrode assembly and being electrically connected to one of the first electrode or the second electrode to have a first polarity;

a sealing body sealing a first opening of the battery housing;

a terminal electrically connected to the other one of the first electrode or the second electrode to have a second polarity, the terminal having a surface exposed to an outside of the battery housing; and a current collector welded to the first surface region and electrically connected to one of the battery housing or the terminal, wherein a welding region of the current collector overlaps with the first surface region having 10 or more of the stacked layers of the second portion.

61. The battery according to claim 60, wherein a number of total winding turns of the first electrode is defined as $n_1$, wherein a relative radial position $R_{1,k}$ is defined by dividing a winding turn index k at a $k^{th}$ winding turn location of the first electrode by the number of total winding turns $n_1$, k being a natural number of 1 to $n_1$, and wherein a ratio between a length of a radial region including the relative radial position $R_{1,k}$ having 10 or more stacked layers of the second portion and a length of the first surface region is 30% or more.

62. The battery according to claim 60, wherein the second electrode includes a third portion coated with an active material and a fourth portion at a second side and adjacent to the third portion, and the fourth portion being exposed beyond the separator along a second axis direction of the electrode assembly, wherein a number of total winding turns of the second electrode is defined as $n_2$, wherein a relative radial position $R_{2,k}$ is defined by dividing a winding turn index k at a $k^{th}$ winding turn location of the first electrode by the number of total winding turns $n_2$, k being a natural number of 1 to $n_2$, and wherein a ratio between a length of a radial region including the relative radial position $R_{2,k}$ having 10 or more stacked layers of the fourth portion and a length of the second surface region is 30% or more.

63. The battery according to claim 60, wherein 50% or more of the welding region of the current collector overlaps with the first surface region having 10 or more stacked layers of the second portion.

64. The battery according to the claim 63, wherein a welding strength of the current collector is 2 kgf/cm² or more.

65. A battery, comprising:

an electrode assembly including a first electrode, a second electrode, and a separator between the first electrode and the second electrode, wherein the first electrode, the second electrode, and the separator are wound about an axis to define a core and an outer circumference, wherein the first electrode includes a first portion coated with an active material and a second portion at a first side and adjacent to the first portion, the second portion being exposed beyond the separator along a first axial direction of the electrode assembly, wherein a part of the second portion is bent in a radial direction of the electrode assembly to form a first surface region, wherein, in a partial region of the first surface region, a stack thickness of the second portion is 100 μm to 975 μm,
wherein the second portion includes a plurality of segments, and
wherein segments immediately adjacent each other in the radial direction of the electrode assembly are offset in a circumferential direction of the electrode assembly;
a battery housing accommodating the electrode assembly and electrically connected to one of the first electrode or the second electrode to have a first polarity;
a sealing body sealing a first end of the battery housing;
a terminal electrically connected to the other of the first electrode or the second electrode to have a second polarity and configured to have a surface exposed to the outside of the battery housing; and
a first current collector welded to the first surface region and electrically connected to one of the battery housing or the terminal,
wherein a welding region of the first current collector overlaps with the partial region of the first surface region having the stack thickness of the second portion is 100 μm to 975 μm.

66. The battery according to claim 65,
wherein the second portion of the first electrode is divided into the plurality of segments that are independently bendable,
wherein the first electrode includes a height variable region having the plurality of segments with variable heights and a height uniform region having the plurality of segments with a substantially uniform height, and
wherein a ratio of a stack thickness of the second portion in the first surface region to the substantially uniform height of the plurality of segment in the height uniform is 1.0% to 16.3%.

67. The battery according to the claim 65,
wherein a welding strength of the first current collector is 2 kgf/cm² or more.

68. A battery, comprising:
an electrode assembly including a first electrode, a second electrode, and a separator between the first electrode and the second electrode,
wherein the first electrode, the second electrode, and the separator are wound about an axis to define a core and an outer circumference,
wherein the first electrode includes a first portion coated with an active material and a second portion at a first side and adjacent to the first portion, the second portion being exposed beyond the separator along a first axial direction of the electrode assembly,
wherein the second electrode includes a third portion coated with an active material and a fourth portion at a second side and adjacent to the third portion, and the fourth portion being exposed beyond the separator along a second axial direction of the electrode assembly,
wherein a part of the second portion is bent in a radial direction of the electrode assembly to form a first surface region,
wherein a part of the fourth portion is bent in the radial direction of the electrode assembly forming a second surface region,
wherein, in a partial region of the second surface region, a stack thickness of the fourth portion is 50 μm to 780 μm,
wherein the fourth portion includes a plurality of segments, and
wherein segments immediately adjacent each other in the radial direction of the electrode assembly are offset in a circumferential direction of the electrode assembly;
a battery housing accommodating the electrode assembly and electrically connected to one of the first electrode or the second electrode to have a first polarity;
a sealing body sealing a first end of the battery housing;
a terminal electrically connected to the other of the first electrode or the second electrode to have a second polarity and configured to have a surface exposed to the outside of the battery housing; and
a second current collector welded to the second surface region and electrically connected to one of the battery housing or the terminal,
wherein a welding region of the second current collector overlaps with the partial region of the second surface region in which the stack thickness of the fourth portion is 50 μm to 780 μm.

69. The battery according to claim 68,
wherein the fourth portion of the second electrode is divided into the plurality of segments that are independently bendable,
wherein the second electrode includes a height variable region having the plurality of segments with variable heights and a height uniform region having the plurality of segments with a substantially uniform height, and
wherein a ratio of a stack thickness of the fourth portion in the second surface region to the substantially uniform height of the plurality of segments in the height uniform region is 0.5% to 13.0%.

70. The battery according to the claim 68,
wherein a welding strength of the second current collector is 2 kgf/cm² or more.

71. The battery according to claim 68, further comprising a first current collector welded to the first surface region and electrically connected to the other of the battery housing or the terminal,
wherein the welding region of the first current collector overlaps with the partial region of the first surface region in which the stack thickness of the second portion is 100 μm to 975 μm by 50% or more.

72. The battery according to claim 68,
wherein the welding region of the second current collector overlaps with the partial region of the second bending surface region in which the stack thickness of the fourth portion is 50 μm to 780 μm by 50% or more.

73. A battery pack, comprising the battery according to claim 60.

74. A vehicle, comprising the battery pack according to claim 73.

75. A battery pack, comprising the battery according to claim 65.

76. A vehicle, comprising the battery pack according to claim 75.

77. The electrode assembly according to claim 1,
wherein a ratio between a length of a radial region having 10 or more stacked layers of the second portion and a length of the first surface region is 30% or more.

78. A method of making an electrode assembly for a battery, comprising:
providing a first electrode;
providing a second electrode;
providing a separator between the first electrode and the second electrode,
winding the first electrode, the second electrode, and the separator about an axis to define a core and an outer circumference of the electrode assembly;

coating a first portion on the first electrode with an active material;

exposing a second portion on the first electrode beyond the separator along a first axial direction of the electrode assembly;

bending a part of the second portion in a radial direction of the electrode assembly to form a first surface region including stacked layers of the second portion; and forming in a partial region of the first surface region, 10 or more stacked layers of the second portion in the first axial direction, wherein the second portion includes a plurality of segments, and wherein segments immediately adjacent each other in the radial direction of the electrode assembly are offset in a circumferential direction of the electrode assembly.

79. The method of claim 78, further comprising:

coating a third portion on the second electrode with the active material;

exposing a fourth portion on the second electrode beyond the separator along a second axial direction of the electrode assembly;

bending a part of the fourth portion in a radial direction of the electrode assembly to form a second surface region including stacked layers of the fourth portion; and forming in a partial region of the second surface region, 10 or more stacked layers of the fourth portion in the second axial direction.

* * * * *